(12) United States Patent
Lyons et al.

(10) Patent No.: US 11,903,516 B1
(45) Date of Patent: Feb. 20, 2024

(54) SYSTEMS AND METHODS FOR BOTTLE APPARATUSES, CONTAINER ASSEMBLIES, AND DISPENSING APPARATUSES

(71) Applicant: Cirkul, Inc., Tampa, FL (US)

(72) Inventors: Mark Lyons, Ashburn, VA (US); Robert Lawson-Shanks, Reston, VA (US); Abraham Maclean, Arlington, VA (US); Nolan McCann, Oakton, VA (US); Jeffrey Whalley, Falls Church, VA (US); Alexander Mathov, Waterford, VA (US)

(73) Assignee: Cirkul, Inc., Tampa, FL (US)

( * ) Notice: Subject to any disclaimer, the term of this patent is extended or adjusted under 35 U.S.C. 154(b) by 0 days.

(21) Appl. No.: 17/404,928

(22) Filed: Aug. 17, 2021

Related U.S. Application Data

(63) Continuation-in-part of application No. 17/240,231, filed on Apr. 26, 2021.
(Continued)

(51) Int. Cl.
*A47J 31/40* (2006.01)
*A47J 31/44* (2006.01)
(Continued)

(52) U.S. Cl.
CPC ........... *A47J 31/407* (2013.01); *A47J 31/002* (2013.01); *A47J 31/005* (2013.01);
(Continued)

(58) Field of Classification Search
CPC .... A47J 31/4492; A47J 31/005; A47J 31/407; A47J 31/002; A47J 31/00; A61J 9/0653;
(Continued)

(56) References Cited

U.S. PATENT DOCUMENTS

| D95,559 S | 5/1935 | Vogel |
|---|---|---|
| D97,347 S | 10/1935 | Gambell |

(Continued)

FOREIGN PATENT DOCUMENTS

| CN | 1942392 | 4/2007 |
|---|---|---|
| CN | 100575206 | 12/2009 |

(Continued)

OTHER PUBLICATIONS

Space Linear Acceleration Mass Measurement Device (SLAMMD); NASA Life Sciences Data Archive; https://lsda.jsc.nasa.gov/Hardware/hardw/963? / Date Jul. 15, 2004. (1 page).
(Continued)

*Primary Examiner* — John K Fristoe, Jr.
*Assistant Examiner* — Jennifer Castriotta
(74) *Attorney, Agent, or Firm* — Wolf, Greenfield & Sacks, P.C.

(57) ABSTRACT

Bottle apparatuses, storage containers used in bottle apparatuses, beverage dispensing apparatuses, and methods of making and using the same are disclosed. A bottle apparatus can include a vessel defining a chamber, and a neck portion attached to an upper end of the vessel; a base portion attached to a lower end of the vessel; a pouch support attached to the neck portion; a pod mounted within and supported by the pouch support, the pod including a pouch top having an inlet and a pouch mounted onto the pouch top, and the pouch support and the pouch top collectively forming a well such that liquid can be deposited into the well and flow into the pouch through the inlet; a pump controlled by a controller for pumping air in and out of the chamber; and a pressure sensor in communication with the controller for measuring pressure in the chamber.

8 Claims, 29 Drawing Sheets

Related U.S. Application Data

(60) Provisional application No. 63/066,482, filed on Aug. 17, 2020, provisional application No. 63/015,553, filed on Apr. 25, 2020.

(51) Int. Cl.

| | | |
|---|---|---|
| *A61J 9/06* | (2006.01) | |
| *A47J 31/00* | (2006.01) | |
| *A47J 31/46* | (2006.01) | |
| *B65D 85/816* | (2006.01) | |
| *A61J 9/00* | (2006.01) | |

(52) U.S. Cl.
CPC .......... *A47J 31/4492* (2013.01); *A47J 31/468* (2018.08); *A61J 9/001* (2013.01); *A61J 9/0653* (2015.05); *B65D 85/816* (2013.01); *A61J 2200/70* (2013.01); *A61J 2200/76* (2013.01); *A61J 2205/60* (2013.01)

(58) Field of Classification Search
CPC ............... A61J 2200/70; A61J 2200/76; A61J 2205/60; A61J 9/001; B65D 85/816; A23L 33/40; B01F 35/2206; B01F 35/2209; B01F 35/221; B01F 35/2211; B01F 35/2212; B01F 35/2213
See application file for complete search history.

(56) References Cited

U.S. PATENT DOCUMENTS

| | | |
|---|---|---|
| 2,071,399 A | 2/1937 | Gambell |
| D157,486 S | 2/1950 | Glowacki |
| 2,682,355 A | 6/1954 | Robbins |
| 2,876,113 A * | 3/1959 | Barton .................... A61J 9/001 426/117 |
| D192,814 S | 5/1962 | Edwin |
| 3,319,637 A | 5/1967 | Gore |
| 3,533,807 A * | 10/1970 | Wakefield ............ B65D 85/816 426/123 |
| 3,548,657 A | 12/1970 | Panerai |
| D225,364 S | 12/1972 | Antoni |
| 3,727,803 A | 4/1973 | Cobb |
| D242,132 S | 11/1976 | Hasegawa |
| 4,051,726 A | 10/1977 | Hastbacka |
| 4,087,024 A | 5/1978 | Martin |
| 4,125,187 A | 11/1978 | Vecchiotti |
| 4,133,457 A | 1/1979 | Klassen |
| 4,252,253 A | 2/1981 | Shannon |
| 4,278,186 A | 7/1981 | Williamson |
| 4,316,409 A | 2/1982 | Adams |
| 4,450,722 A | 5/1984 | Keyes, IV |
| 4,481,986 A | 11/1984 | Meyers |
| D279,621 S | 7/1985 | Richer |
| 4,610,282 A | 9/1986 | Brooks |
| 4,688,701 A | 8/1987 | Sedam |
| 4,728,006 A | 3/1988 | Drobish |
| D295,954 S | 5/1988 | Kirchhoff |
| D296,302 S | 6/1988 | Weber |
| 4,800,492 A | 1/1989 | Johnson |
| 4,827,426 A | 5/1989 | Patton |
| 4,840,291 A | 6/1989 | Merlin |
| 4,898,306 A | 2/1990 | Pardes |
| 4,938,387 A | 7/1990 | Kervefors |
| 4,964,541 A | 10/1990 | Gueret |
| 5,080,260 A | 1/1992 | Doring |
| 5,119,279 A | 6/1992 | Makowsky |
| 5,139,169 A | 8/1992 | Boyer |
| 5,174,458 A | 12/1992 | Segati |
| 5,182,084 A | 1/1993 | Plester |
| D336,216 S | 6/1993 | Rohrbeck |
| 5,282,131 A | 1/1994 | Rudd |
| 5,325,765 A | 7/1994 | Sylvan |
| 5,344,034 A | 9/1994 | Eagan |
| D352,204 S | 11/1994 | Hayes |
| 5,377,877 A | 1/1995 | Brown et al. |
| 5,379,916 A | 1/1995 | Martindale |
| 5,398,853 A | 3/1995 | Latham |
| 5,474,211 A | 12/1995 | Hellenberg |
| 5,531,254 A | 7/1996 | Rosenbach |
| D372,867 S | 8/1996 | Lambelet |
| 5,588,557 A | 12/1996 | Topar |
| D382,808 S | 8/1997 | Fenton |
| D383,383 S | 9/1997 | Prestia |
| D387,992 S | 12/1997 | Kotoucek |
| 5,725,125 A | 3/1998 | Bessette |
| 5,747,824 A | 5/1998 | Jung |
| D396,603 S | 8/1998 | Gasser |
| 5,810,062 A | 9/1998 | Bonora |
| D399,098 S | 10/1998 | Yang |
| D400,050 S | 10/1998 | Littmann |
| D404,253 S | 1/1999 | Littmann |
| 5,938,080 A | 8/1999 | Haaser |
| 5,960,701 A | 10/1999 | Reese |
| 5,967,367 A | 10/1999 | Orsborn |
| 6,077,579 A | 6/2000 | De Laforcade |
| 6,140,932 A | 10/2000 | Frank |
| 6,142,063 A | 11/2000 | Beaulieu |
| 6,170,712 B1 | 1/2001 | Kasboske |
| 6,230,884 B1 | 5/2001 | Coory |
| 6,372,270 B1 | 4/2002 | Denny |
| 6,422,422 B1 | 7/2002 | Forbes |
| 6,424,884 B1 | 7/2002 | Brooke, Jr. |
| 6,446,049 B1 | 9/2002 | Janning |
| 6,504,481 B2 | 1/2003 | Teller |
| 6,517,878 B2 * | 2/2003 | Heczko ................ B65D 85/816 426/115 |
| 6,520,070 B1 * | 2/2003 | Heczko .................... A23L 2/39 426/115 |
| 6,529,446 B1 | 3/2003 | de la Huerga |
| 6,574,575 B2 | 6/2003 | Deng |
| D477,791 S | 7/2003 | Wells |
| D478,073 S | 8/2003 | Topinka |
| 6,615,881 B2 | 9/2003 | Bartholomew |
| 6,644,471 B1 | 11/2003 | Anderson |
| 6,703,935 B1 | 3/2004 | Chung |
| 6,722,530 B1 | 4/2004 | King |
| 6,761,318 B2 | 7/2004 | Dudek |
| D499,603 S | 12/2004 | Nikkhah |
| D500,936 S | 1/2005 | Nikkhah |
| 6,889,872 B2 | 5/2005 | Herman |
| 6,921,911 B2 | 7/2005 | Siepmann |
| 6,925,871 B2 | 8/2005 | Frank |
| 6,935,493 B2 | 8/2005 | Cho |
| D514,385 S | 2/2006 | Smith |
| 7,004,213 B2 | 2/2006 | Hansen |
| D517,852 S | 3/2006 | Jalet |
| 7,009,519 B2 | 3/2006 | Leonard |
| 7,032,818 B2 | 4/2006 | Thomas |
| D522,860 S | 6/2006 | LaFortune |
| D523,332 S | 6/2006 | McEldowney |
| D525,135 S | 7/2006 | Bakic |
| 7,104,184 B2 | 9/2006 | Biderman |
| 7,107,838 B2 | 9/2006 | Chai |
| D529,340 S | 10/2006 | Laib |
| D530,968 S | 10/2006 | Bodum |
| D533,018 S | 12/2006 | Berg |
| 7,172,095 B2 | 2/2007 | Marshall |
| 7,196,624 B2 | 3/2007 | Teller |
| D541,106 S | 4/2007 | Spiegel |
| D541,596 S | 5/2007 | Hicks |
| 7,228,879 B2 | 6/2007 | Miller |
| 7,319,523 B2 | 1/2008 | Chiarello |
| D565,350 S | 4/2008 | Gauger |
| 7,387,239 B2 | 6/2008 | Thomas |
| D572,588 S | 7/2008 | Osborn |
| D573,464 S | 7/2008 | Kogure |
| 7,439,859 B2 | 10/2008 | Humphrey |
| D582,767 S | 12/2008 | Batton |
| 7,464,811 B2 | 12/2008 | Patterson |
| 7,501,933 B2 | 3/2009 | Rousso |
| D591,599 S | 5/2009 | Okin |
| D593,411 S | 6/2009 | Bizzell |
| D596,487 S | 7/2009 | Batton |

(56) References Cited

U.S. PATENT DOCUMENTS

| | | |
|---|---|---|
| 7,612,675 B2 | 11/2009 | Miller |
| 7,614,496 B2 | 11/2009 | Dvorak |
| D608,637 S | 1/2010 | Getsy |
| D611,298 S | 3/2010 | Freeman |
| D613,183 S | 4/2010 | Overgaard |
| 7,710,567 B1 | 5/2010 | Mentzer |
| 7,715,277 B2 | 5/2010 | de la Huerga |
| D618,963 S | 7/2010 | Freeman |
| 7,762,181 B2 | 7/2010 | Boland |
| D621,283 S | 8/2010 | Overgaard |
| 7,798,373 B1 | 9/2010 | Wroblewski |
| 7,825,804 B2 | 11/2010 | Malik |
| D634,157 S | 3/2011 | Hoff |
| D635,823 S | 4/2011 | Mauffette |
| D635,864 S | 4/2011 | Lee |
| D639,607 S | 6/2011 | Bracq |
| RE42,937 E | 11/2011 | Lasher |
| 8,083,055 B2 | 12/2011 | Simonian |
| D651,474 S | 1/2012 | Gut |
| 8,091,735 B2 | 1/2012 | Girard |
| 8,141,700 B2 | 3/2012 | Simonian |
| D658,982 S | 5/2012 | Pauser |
| D659,472 S | 5/2012 | D'Amato |
| 8,196,776 B2 | 6/2012 | Doglioni Majer |
| 8,210,396 B2 | 7/2012 | Girard |
| 8,240,508 B2 | 8/2012 | Wegelin |
| 8,302,795 B2 | 11/2012 | Van den Broek |
| 8,361,527 B2 | 1/2013 | Winkler |
| 8,378,830 B2 | 2/2013 | Moran |
| 8,397,519 B2 | 3/2013 | Loibl |
| 8,417,377 B2 | 4/2013 | Rothchild |
| 8,442,674 B2 | 5/2013 | Tilton |
| 8,463,447 B2 | 6/2013 | Newman |
| 8,464,633 B2 | 6/2013 | Anson |
| 8,485,359 B2 | 7/2013 | Anderson |
| D688,531 S | 8/2013 | Ceder |
| 8,515,574 B2 | 8/2013 | Studor |
| 8,519,824 B1 | 8/2013 | Rankin |
| 8,522,968 B2 | 9/2013 | Middleman |
| 8,523,837 B2 | 9/2013 | Wiggins |
| D690,990 S | 10/2013 | Boggs |
| D690,991 S | 10/2013 | Boggs |
| 8,556,127 B2 | 10/2013 | Olson |
| 8,584,691 B2 | 11/2013 | Hammonds |
| 8,584,840 B2 | 11/2013 | Kim |
| 8,590,753 B2 | 11/2013 | Marina |
| D699,106 S | 2/2014 | Glaser |
| D699,996 S | 2/2014 | De Leo |
| D700,008 S | 2/2014 | Ehrenhaus |
| 8,678,183 B2 | 3/2014 | Jones |
| D702,474 S | 4/2014 | Scherer |
| 8,684,231 B2 | 4/2014 | Lane |
| 8,695,420 B1 | 4/2014 | Korman |
| 8,701,906 B1 | 4/2014 | Anderson |
| 8,717,182 B1 | 5/2014 | Brashears |
| 8,718,819 B2 | 5/2014 | Hyde |
| 8,751,037 B2 | 6/2014 | Peters |
| 8,754,769 B2 | 6/2014 | Stein |
| 8,757,227 B2 | 6/2014 | Girard |
| D709,387 S | 7/2014 | Marina |
| 8,794,485 B2 | 8/2014 | Lunn |
| 8,801,688 B2 | 8/2014 | Wiggins |
| 8,808,775 B2 | 8/2014 | Novak |
| 8,833,607 B2 | 9/2014 | Wegelin |
| 8,851,740 B1 | 10/2014 | Mills |
| 8,863,649 B1 | 10/2014 | Rao |
| 8,919,613 B2 | 12/2014 | Mileti |
| 8,940,163 B2 | 1/2015 | Bassett |
| 8,945,374 B2 | 2/2015 | Chase |
| 8,977,389 B2 | 3/2015 | Witchell |
| 8,979,539 B1 | 3/2015 | Snyder |
| 8,985,395 B2 | 3/2015 | Tansey |
| 8,989,673 B2 | 3/2015 | Sandy |
| 8,991,648 B2 | 3/2015 | Smith |
| D727,171 S | 4/2015 | Marina |
| 9,014,846 B2 | 4/2015 | Newman |
| 9,020,635 B2 | 4/2015 | Hortin |
| D729,571 S | 5/2015 | Wilson |
| 9,031,689 B1 | 5/2015 | Fink |
| 9,035,222 B2 | 5/2015 | Alexander |
| 9,035,765 B2 | 5/2015 | Engelhard |
| D731,242 S | 6/2015 | Machovina |
| D731,243 S | 6/2015 | Machovina |
| 9,051,162 B2 | 6/2015 | Peters |
| 9,102,441 B1 | 8/2015 | Orvik |
| 9,111,324 B2 | 8/2015 | Hyde |
| 9,126,738 B2 | 9/2015 | Boggs |
| 9,134,020 B1 | 9/2015 | Wells |
| 9,138,091 B2 | 9/2015 | Zhao |
| 9,151,605 B1 | 10/2015 | Sweeney |
| 9,161,654 B2 | 10/2015 | Belmont |
| 9,169,112 B2 | 10/2015 | Chase |
| D742,691 S | 11/2015 | Zhang |
| D746,046 S | 12/2015 | Lee |
| D748,955 S | 2/2016 | Oliver |
| 9,254,250 B1 | 2/2016 | Orofino |
| D751,865 S | 3/2016 | Harris |
| D752,391 S | 3/2016 | Hatherell |
| D752,396 S | 3/2016 | Tu |
| 9,290,309 B1 | 3/2016 | Pabon |
| D758,868 S | 6/2016 | Bretschneider |
| 9,357,887 B2 | 6/2016 | Wegelin |
| D760,537 S | 7/2016 | Hertaus |
| D768,507 S | 10/2016 | Hotell |
| 9,499,385 B1 | 11/2016 | Studor |
| 9,506,798 B2 | 11/2016 | Saltzgiver |
| 9,511,987 B2 | 12/2016 | Hayakawa |
| D779,881 S | 2/2017 | Lee |
| D813,049 S | 3/2018 | Richmond |
| 9,932,217 B2 | 4/2018 | Perrelli |
| D826,052 S | 8/2018 | Harris |
| 10,095,972 B2 | 10/2018 | Bhatia |
| 10,112,752 B2 | 10/2018 | Tonn |
| D836,385 S | 12/2018 | Arzunyan |
| D837,594 S | 1/2019 | Palese |
| 10,178,925 B2 | 1/2019 | Rithener |
| 10,231,567 B2 | 3/2019 | Perrelli |
| 10,314,320 B2 | 6/2019 | Roberts |
| 10,328,402 B2 | 6/2019 | Kolar |
| 10,363,530 B2 | 7/2019 | Kolar |
| D856,083 S | 8/2019 | Lawson-Shanks |
| 10,413,131 B2 | 9/2019 | Kolar |
| 10,489,868 B2 | 11/2019 | Long, II |
| 10,512,358 B1 | 12/2019 | Perrelli |
| 10,513,424 B2 | 12/2019 | Tansey, Jr. |
| D878,864 S | 3/2020 | Lawson-Shanks |
| 10,621,850 B2 | 4/2020 | Laidlaw |
| D887,769 S | 6/2020 | Lyons |
| 10,674,857 B2 | 6/2020 | Lyons |
| 10,758,077 B1 | 9/2020 | Wilkie |
| 10,765,252 B2 | 9/2020 | Perrelli |
| 10,863,852 B1 | 12/2020 | Lyons |
| 10,881,239 B2 | 1/2021 | Perrelli |
| 10,888,191 B1 | 1/2021 | Lyons |
| 10,889,424 B1 | 1/2021 | Lyons |
| 10,889,425 B1 | 1/2021 | Lyons |
| 10,889,481 B2 | 1/2021 | Perrelli |
| 10,889,482 B1 | 1/2021 | MacLean |
| 10,913,647 B2 | 2/2021 | Lyons |
| 10,934,150 B1 | 3/2021 | MacLean |
| 10,941,030 B1 | 3/2021 | Lyons |
| 10,947,102 B1 | 3/2021 | Lyons |
| 10,981,769 B2 | 4/2021 | Lyons |
| 10,981,772 B1 | 4/2021 | Lyons |
| 10,994,979 B1 | 5/2021 | Lyons |
| 11,001,487 B2 | 5/2021 | Lyons |
| 11,059,711 B1 | 7/2021 | Lyons |
| 11,337,533 B1 | 5/2022 | Perrelli |
| 2001/0032036 A1 | 10/2001 | Sudolcan |
| 2001/0054083 A1 | 12/2001 | Defosse |
| 2002/0070861 A1 | 6/2002 | Teller |
| 2002/0090426 A1 | 7/2002 | Denny |
| 2002/0129663 A1 | 9/2002 | Hoyt |
| 2003/0090892 A1 | 5/2003 | Su |

(56) References Cited

U.S. PATENT DOCUMENTS

| | | | |
|---|---|---|---|
| 2003/0121937 A1 | 7/2003 | Black | |
| 2003/0191558 A1 | 10/2003 | Arellano | |
| 2004/0112070 A1 | 6/2004 | Schanin | |
| 2005/0284302 A1 | 12/2005 | Levin | |
| 2006/0061985 A1 | 3/2006 | Elkins | |
| 2006/0081653 A1 | 4/2006 | Boland | |
| 2006/0115570 A1 | 6/2006 | Guerrero | |
| 2006/0191824 A1 | 8/2006 | Arett | |
| 2006/0219858 A1 | 10/2006 | Iacovino | |
| 2007/0024465 A1 | 2/2007 | Howell | |
| 2007/0095859 A1 | 5/2007 | Maser | |
| 2007/0114244 A1 | 5/2007 | Gatipon | |
| 2007/0137643 A1 | 6/2007 | Bonney | |
| 2007/0157576 A1 | 7/2007 | Till | |
| 2007/0203587 A1 | 8/2007 | Erlandsson | |
| 2007/0214055 A1 | 9/2007 | Temko | |
| 2008/0023488 A1 | 1/2008 | Guerrero | |
| 2008/0178749 A1 | 7/2008 | Stutman | |
| 2008/0190958 A1 | 8/2008 | Wyner | |
| 2009/0069930 A1 | 3/2009 | Peters | |
| 2009/0069934 A1 | 3/2009 | Newman | |
| 2009/0069947 A1 | 3/2009 | Newman | |
| 2009/0069949 A1 | 3/2009 | Carpenter | |
| 2009/0120815 A1 | 5/2009 | Mitchell | |
| 2009/0205506 A1 | 8/2009 | Lin | |
| 2009/0206084 A1 | 8/2009 | Woolf | |
| 2009/0228367 A1 | 9/2009 | Hughes | |
| 2009/0272274 A1 | 11/2009 | De Graaff | |
| 2010/0024660 A1 | 2/2010 | Wallace | |
| 2010/0040743 A1 | 2/2010 | Drost | |
| 2010/0055252 A1 | 3/2010 | Marina | |
| 2010/0125362 A1 | 5/2010 | Canora | |
| 2010/0133222 A1* | 6/2010 | Mathieu | A47J 31/40 |
| | | | 141/2 |
| 2010/0145522 A1 | 6/2010 | Claesson | |
| 2010/0163567 A1 | 7/2010 | Chiang | |
| 2010/0183776 A1 | 7/2010 | Gruenwald | |
| 2010/0219151 A1 | 9/2010 | Risheq | |
| 2010/0242497 A1 | 9/2010 | Bertone | |
| 2010/0316434 A1 | 12/2010 | Maxwell | |
| 2010/0318221 A1 | 12/2010 | Wiemer | |
| 2011/0006071 A1 | 1/2011 | Koumans | |
| 2011/0024537 A1 | 2/2011 | Gonzalez | |
| 2011/0036803 A1 | 2/2011 | Mejia | |
| 2011/0049161 A1 | 3/2011 | Savinsky | |
| 2011/0049195 A1 | 3/2011 | Russell | |
| 2011/0050431 A1 | 3/2011 | Hood | |
| 2011/0052764 A1 | 3/2011 | Bulgin | |
| 2011/0060457 A1 | 3/2011 | De Vrught | |
| 2011/0166910 A1 | 7/2011 | Marina | |
| 2011/0180563 A1 | 7/2011 | Fitchett | |
| 2011/0220106 A1 | 9/2011 | Ganem | |
| 2011/0301768 A1 | 12/2011 | Hammonds | |
| 2012/0017766 A1 | 1/2012 | Anson | |
| 2012/0035761 A1 | 2/2012 | Tilton | |
| 2012/0088022 A1 | 4/2012 | Carbone | |
| 2012/0094261 A1 | 4/2012 | Hayn | |
| 2012/0097567 A1 | 4/2012 | Zhao | |
| 2012/0100275 A1 | 4/2012 | Bishop | |
| 2012/0104023 A1 | 5/2012 | Anselmino | |
| 2012/0156337 A1 | 6/2012 | Studor | |
| 2012/0173164 A1 | 7/2012 | Steuerwald | |
| 2012/0230149 A1 | 9/2012 | Martin | |
| 2012/0234183 A1 | 9/2012 | Edwards | |
| 2012/0267320 A1 | 10/2012 | Baccigalopi | |
| 2012/0285985 A1 | 11/2012 | Jones | |
| 2012/0298532 A1 | 11/2012 | Woolf | |
| 2013/0001244 A1 | 1/2013 | Wegelin | |
| 2013/0037506 A1 | 2/2013 | Wahlstrom | |
| 2013/0043304 A1 | 2/2013 | Agan | |
| 2013/0068772 A1 | 3/2013 | Durden | |
| 2013/0082022 A1 | 3/2013 | Cronin | |
| 2013/0085599 A1 | 4/2013 | Nicol | |
| 2013/0089645 A1 | 4/2013 | Leung | |
| 2013/0092567 A1 | 4/2013 | Lok | |
| 2013/0127748 A1 | 5/2013 | Vertegaal | |
| 2013/0139703 A1 | 6/2013 | Hogarth | |
| 2013/0156903 A1 | 6/2013 | Bambeck | |
| 2013/0156904 A1 | 6/2013 | Nosler | |
| 2013/0186779 A1 | 7/2013 | Kambouris | |
| 2013/0226337 A1 | 8/2013 | Leech | |
| 2013/0240079 A1 | 9/2013 | Petrini | |
| 2013/0247770 A1 | 9/2013 | Wilder | |
| 2013/0319915 A1 | 12/2013 | Gellibolian | |
| 2013/0325174 A1 | 12/2013 | Crisp, III | |
| 2013/0340453 A1 | 12/2013 | Chan | |
| 2013/0341395 A1 | 12/2013 | Chan | |
| 2014/0034183 A1 | 2/2014 | Gross | |
| 2014/0044837 A1 | 2/2014 | Weisman | |
| 2014/0079856 A1 | 3/2014 | Hatherell | |
| 2014/0110476 A1 | 4/2014 | Sheehan | |
| 2014/0114469 A1 | 4/2014 | Givens | |
| 2014/0150670 A1 | 6/2014 | Green | |
| 2014/0154382 A1 | 6/2014 | Green | |
| 2014/0166694 A1 | 6/2014 | Otto | |
| 2014/0170279 A1 | 6/2014 | Kolls | |
| 2014/0269154 A1 | 9/2014 | Kolar | |
| 2014/0272019 A1 | 9/2014 | Schuh | |
| 2014/0273925 A1 | 9/2014 | Burgett | |
| 2014/0277707 A1 | 9/2014 | Akdogan | |
| 2014/0303790 A1 | 10/2014 | Huang | |
| 2014/0305952 A1 | 10/2014 | Harris | |
| 2014/0312247 A1 | 10/2014 | McKee | |
| 2014/0324585 A1 | 10/2014 | Mederos | |
| 2014/0335490 A1 | 11/2014 | Baarman | |
| 2014/0346063 A1 | 11/2014 | Woolf | |
| 2014/0352843 A1 | 12/2014 | Solera et al. | |
| 2014/0354438 A1 | 12/2014 | Hazen | |
| 2014/0372045 A1 | 12/2014 | Keski-Pukkila | |
| 2014/0374438 A1 | 12/2014 | Carpenter | |
| 2015/0014369 A1 | 1/2015 | Hatton | |
| 2015/0024349 A1 | 1/2015 | Bischoff | |
| 2015/0060481 A1 | 3/2015 | Murray | |
| 2015/0088304 A1 | 3/2015 | Ameye | |
| 2015/0115158 A1 | 4/2015 | Fu | |
| 2015/0060482 A1 | 5/2015 | Murray | |
| 2015/0122688 A1 | 5/2015 | Dias | |
| 2015/0173488 A1 | 6/2015 | Witchell | |
| 2015/0175400 A1 | 6/2015 | Newman | |
| 2015/0182797 A1 | 7/2015 | Wernow | |
| 2015/0183627 A1 | 7/2015 | Tansey, Jr. | |
| 2015/0223623 A1 | 8/2015 | Davis | |
| 2015/0271582 A1 | 9/2015 | Cheng | |
| 2015/0272394 A1 | 10/2015 | Lin | |
| 2015/0284163 A1 | 10/2015 | Manwani | |
| 2016/0055599 A1 | 2/2016 | Illy | |
| 2016/0123786 A1 | 5/2016 | Hanna | |
| 2016/0143474 A1 | 5/2016 | Wessels | |
| 2016/0159632 A1 | 6/2016 | Wheatley | |
| 2016/0174470 A1 | 6/2016 | Shaffer | |
| 2016/0175785 A1 | 6/2016 | Li | |
| 2016/0176696 A1 | 6/2016 | Hecht | |
| 2016/0220973 A1 | 8/2016 | Kolar | |
| 2016/0251234 A1 | 9/2016 | Hayslett | |
| 2016/0257554 A1 | 9/2016 | Manwani | |
| 2016/0286993 A1 | 10/2016 | Pau | |
| 2016/0317985 A1 | 11/2016 | Mutschler | |
| 2016/0325980 A1 | 11/2016 | Sawhney | |
| 2016/0364814 A1 | 12/2016 | Yekutiely | |
| 2016/0367072 A1 | 12/2016 | Boone | |
| 2016/0376140 A1 | 12/2016 | Tansey | |
| 2017/0000295 A1 | 1/2017 | Hanna | |
| 2017/0066638 A1 | 3/2017 | Gatipon | |
| 2017/0087524 A1 | 3/2017 | Deshpande | |
| 2017/0088410 A1 | 3/2017 | Wing | |
| 2017/0101298 A1 | 4/2017 | Renzi | |
| 2017/0121165 A1 | 5/2017 | Gabrieli | |
| 2017/0156540 A1 | 6/2017 | Wheatley | |
| 2017/0186110 A1 | 6/2017 | Carpenter | |
| 2017/0303744 A1 | 10/2017 | Sutton | |
| 2017/0332829 A1 | 11/2017 | Kim | |
| 2017/0335256 A1 | 11/2017 | Park | |
| 2017/0347690 A1 | 12/2017 | Benedetti | |
| 2017/0353820 A1 | 12/2017 | Chiang | |

(56) References Cited

U.S. PATENT DOCUMENTS

| | | |
|---|---|---|
| 2017/0361984 A1 | 12/2017 | Fouad |
| 2017/0367522 A1 | 12/2017 | Ackel |
| 2018/0020875 A1 | 1/2018 | Kolar |
| 2018/0029859 A1 | 2/2018 | Hevia |
| 2018/0042258 A1 | 2/2018 | Roberts |
| 2018/0044157 A1 | 2/2018 | Cohen |
| 2018/0049582 A1 | 2/2018 | Rehfuss |
| 2018/0059790 A1 | 3/2018 | Kolar |
| 2018/0072460 A1 | 3/2018 | Wolfson |
| 2018/0072553 A1 | 3/2018 | Lyons |
| 2018/0099850 A1 | 4/2018 | Lyons |
| 2018/0129360 A1 | 5/2018 | Suh |
| 2018/0129379 A1 | 5/2018 | Suh |
| 2018/0129380 A1 | 5/2018 | Suh |
| 2018/0132507 A1 | 5/2018 | Siegel |
| 2018/0168385 A1 | 6/2018 | Boone |
| 2018/0177325 A1 | 6/2018 | Lyons |
| 2018/0186528 A1 | 7/2018 | Tonn |
| 2018/0208447 A1 | 7/2018 | Perrelli |
| 2018/0344070 A1 | 12/2018 | Perrelli |
| 2019/0001288 A1 | 1/2019 | Ciepiel |
| 2019/0015803 A1 | 1/2019 | Goodson |
| 2019/0060849 A1 | 2/2019 | Waggoner |
| 2019/0185311 A1 | 6/2019 | Karol |
| 2019/0208948 A1 | 7/2019 | Perrelli |
| 2019/0254465 A1 | 8/2019 | Di Maria |
| 2019/0300355 A1 | 10/2019 | Pappas |
| 2020/0010257 A1 | 1/2020 | Lubbe |
| 2020/0031654 A1 | 1/2020 | Wing |
| 2020/0031656 A1 | 1/2020 | Rudick |
| 2020/0079637 A1 | 3/2020 | Kaplita |
| 2020/0095108 A1 | 3/2020 | Cook |
| 2020/0113374 A1 | 4/2020 | Perrelli |
| 2020/0115122 A1 | 4/2020 | Golden |
| 2020/0122992 A1 | 4/2020 | Lyons |
| 2020/0156922 A1 | 5/2020 | Lee |
| 2020/0165550 A1 | 5/2020 | Lee |
| 2020/0181559 A1 | 6/2020 | Kim |
| 2020/0205615 A1 | 7/2020 | Pamplin |
| 2020/0247661 A1 | 8/2020 | Rao |
| 2020/0242910 A1 | 9/2020 | Laidlaw |
| 2021/0007533 A1 | 1/2021 | Lyons |
| 2021/0316978 A1 | 10/2021 | Lyons |
| 2021/0340000 A1 | 11/2021 | Lyons |
| 2021/0347627 A1 | 11/2021 | Maclean |
| 2022/0039586 A1 | 2/2022 | Lyons |
| 2022/0259034 A1 | 8/2022 | Mullenaux |

FOREIGN PATENT DOCUMENTS

| | | |
|---|---|---|
| DE | 3428178 | 2/1986 |
| EP | 0258057 | 3/1988 |
| EP | 1793326 | 6/2007 |
| EP | 1671568 | 1/2008 |
| GB | 860987 | 2/1961 |
| KR | 20110007327 | 1/2011 |
| WO | WO 2008 / 111072 | 9/2008 |
| WO | WO 2016/081387 | 5/2016 |
| WO | WO 2016/090235 | 6/2016 |
| WO | WO 2016201305 | 12/2016 |
| WO | WO 2017/085073 | 5/2017 |
| WO | WO 2020/077137 | 4/2020 |

OTHER PUBLICATIONS

Low-Cost Seltzer Fanatics Hack Their SodaStream Machines, Grind, Kirsten, et al., The Wall Street Journal, Dow Jones Institutional News ; New York [New York] Sep. 21, 2018, (3 pages).

Physiology of nutritive sucking in newborns and infants; Mario Enrique Rendon Macias et al.; Bol Med Hosp Infant Mex 2011;68(4)—pp. 296-303; vol. 68, Jul.-Aug. 2011 (8 pages).

Sucking pressure and its relationship to milk transfer during breastfeeding in humans (Abstract); C R Prieto et al.; https://pubmed.ncbi.nim.nih.gov/8958830; Sep. 1996 (1 page).

A method of measuring sucking behavior of newborn infants; Reuben E. Kron et al. (John Lacey—editor); Psychosomatic Medicine: Journal of Biobehavioral Medicine—vol. XXV, No. 2, 1963, pp. 181-191 (11 pages).

* cited by examiner

Large pod (40cc) - single shot

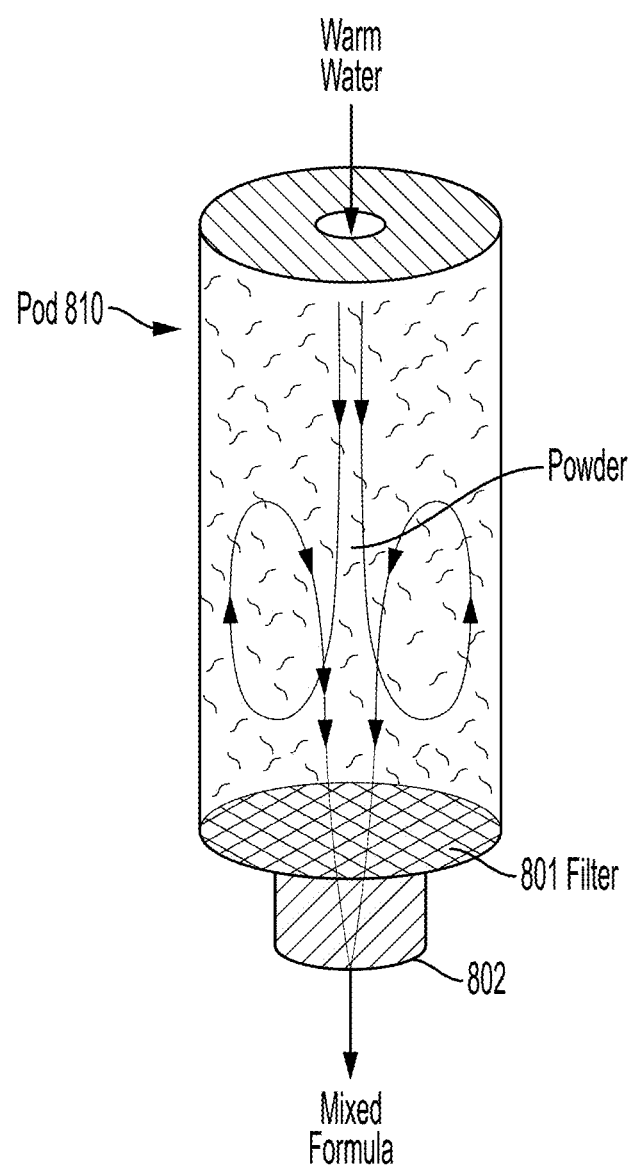

Fig. 21
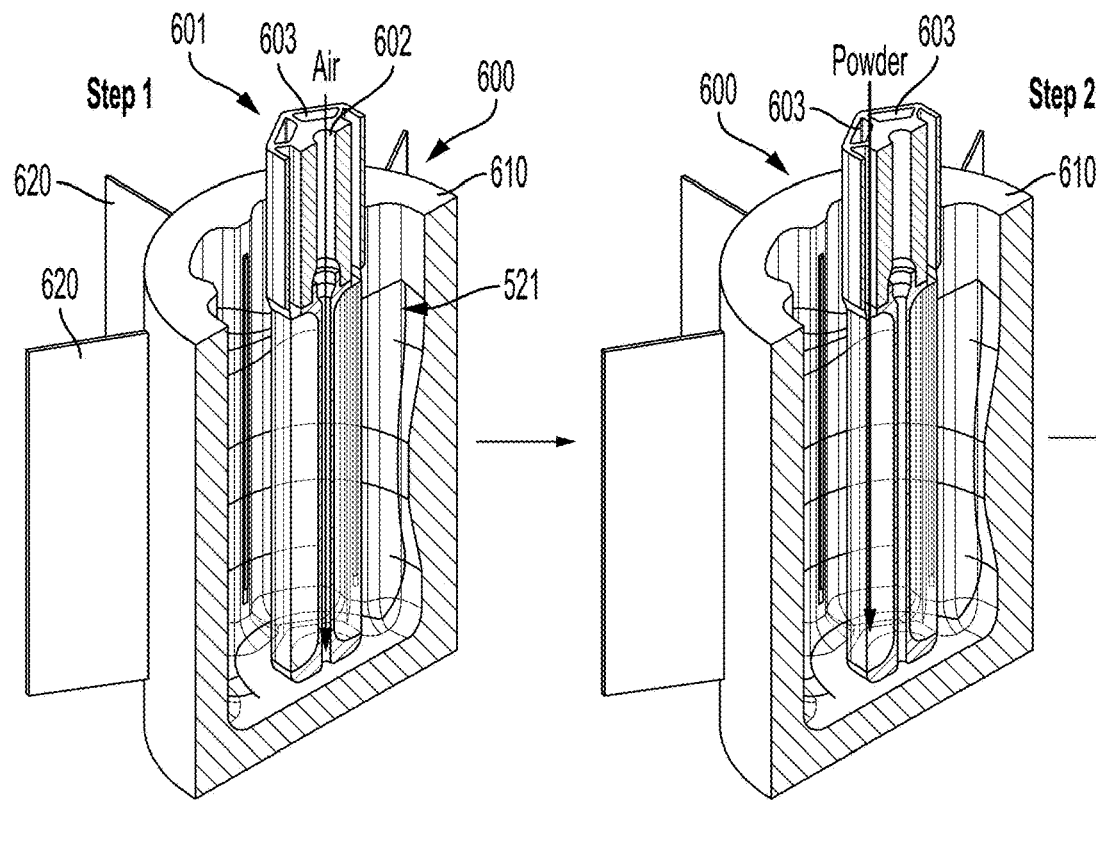
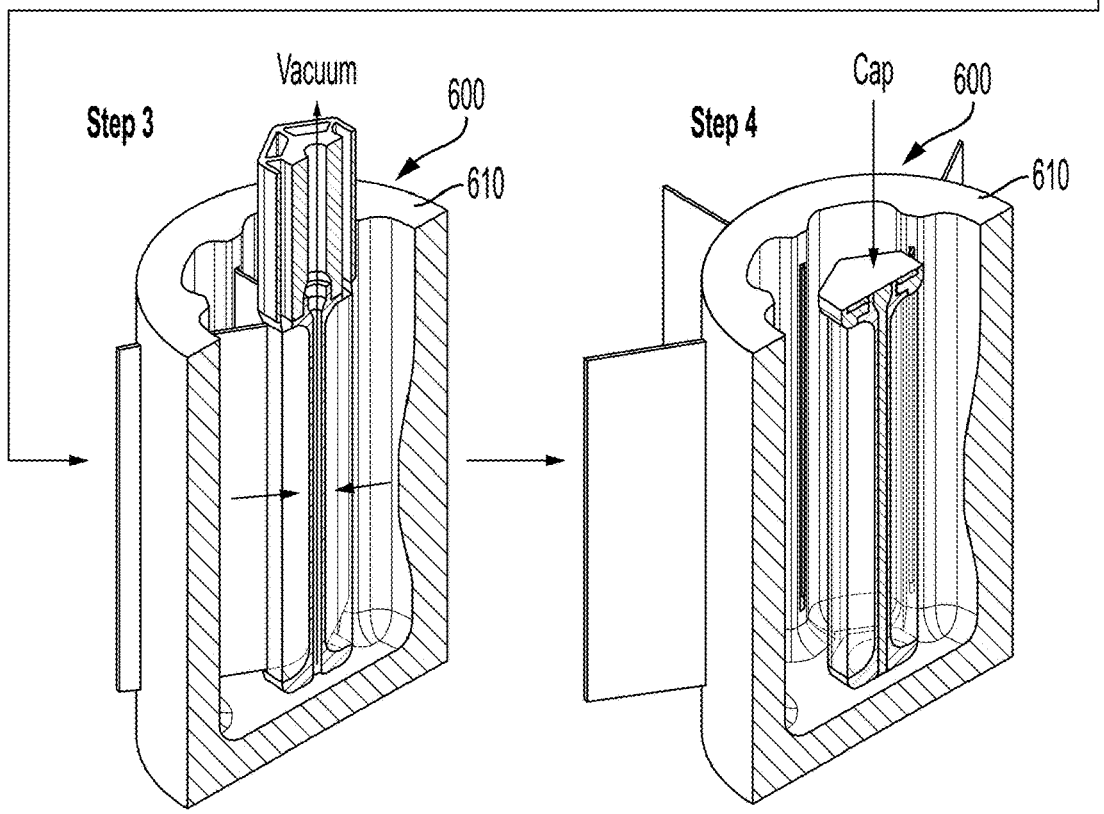

SYSTEMS AND METHODS FOR BOTTLE APPARATUSES, CONTAINER ASSEMBLIES, AND DISPENSING APPARATUSES

RELATED PATENT APPLICATIONS AND PRIORITY

This application claims priority to and is a continuation-in-part (CIP) patent application of U.S. patent application Ser. No. 17/240,231 filed Apr. 26, 2021, the content of which is incorporated herein by reference in its entirety.

This application claims priority to U.S. Provisional Patent Application 63/066,482 filed Aug. 17, 2020, the content of which is incorporated herein by reference in its entirety.

Such U.S. patent application Ser. No. 17/240,231 claims priority to U.S. Provisional Patent Application 63/015,553 filed on Apr. 25, 2020, which is incorporated herein by reference in its entirety.

BACKGROUND OF THE DISCLOSURE

The disclosure relates to bottle apparatuses, pods or other storage containers or container assemblies to be used in bottle apparatuses, beverage dispensing apparatuses, methods of making and using the same, and related features.

A wide variety of beverage containers is known in the art. One specific type of beverage container is a beverage container designed to be used by an infant or baby. Such beverage container can be described as a baby bottle. Such a baby bottle can be designed with functionality, size, and geometry so as to be conducive for use by an infant. For example, a known baby bottle can include a bottle portion and a nipple assembly or nipple. A baby can engage with the nipple assembly so as to consume formula or other consumable liquid that is stored within the baby bottle. The nipple assembly can be attached onto the bottle portion by a collar that is threaded onto the bottle portion.

However, known baby bottles have limitations. For example, known baby bottles have limitations regarding monitoring disposition of the formula or other consumable liquid that is contained within the baby bottle.

The present disclosure addresses this deficiency and other shortcomings of known technology.

SUMMARY OF THE DISCLOSURE

The disclosure provides bottle apparatuses, pods or other storage containers to be used in bottle apparatuses, beverage dispensing apparatuses, and methods of making and using the same in accordance with principles of the disclosed subject matter. A bottle apparatus in accordance with the disclosure can include a neck portion; a bottle portion having an upper end and a lower end, the bottle portion defining an internal volume, and the neck portion attached to the upper end of the bottle portion; a base portion attached to the lower end of the bottle portion; a dispense assembly attached to the neck portion, and the dispense assembly providing for outflow of consumable liquid from the bottle portion; and a flow meter assembly disposed within the base portion, and the flow meter assembly monitoring an amount of the consumable liquid that flows out of the dispense assembly.

A bottle apparatus in accordance with the disclosure can include (a) a neck portion; (b) a vessel having an upper end and a lower end, the vessel defining a chamber, and the neck portion attached to the upper end of the vessel; (c) a base portion attached to the lower end of the bottle portion; (d) a pouch support attached to the neck portion; (e) a pod mounted within and supported by the pouch support, the pod including a pouch top and a pouch mounted onto the pouch top, and the pouch top including an inlet, and the pouch support and the pouch top collectively forming a well such that water or other liquid can be deposited into the well and flow into the pouch through the inlet; (f) a controller that includes a processing portion and a database, and the database including instructions that are executed by the processing portion; (g) a pump for pumping air into and pumping air out of the chamber, the pump controlled by the controller; and (h) a pressure sensor for measuring pressure in the chamber, and the pressure sensor in communication with the controller.

BRIEF DESCRIPTION OF THE DRAWINGS

These and other objects, features, advantages, and characteristics of the present disclosure will become more apparent to those skilled in the art upon consideration of the following Detailed Description, taken in conjunction with the accompanying claims and drawings, all of which form a part of the present disclosure.

In the Drawings:

FIG. 16 is a schematic perspective view of a further pod 810, according to principles of the disclosure.

FIG. 21 is a diagram showing a flow process for use of the manufacturing tool 600 in preparation of a storage assembly 520, according to principles of the disclosure.

Figure 1:
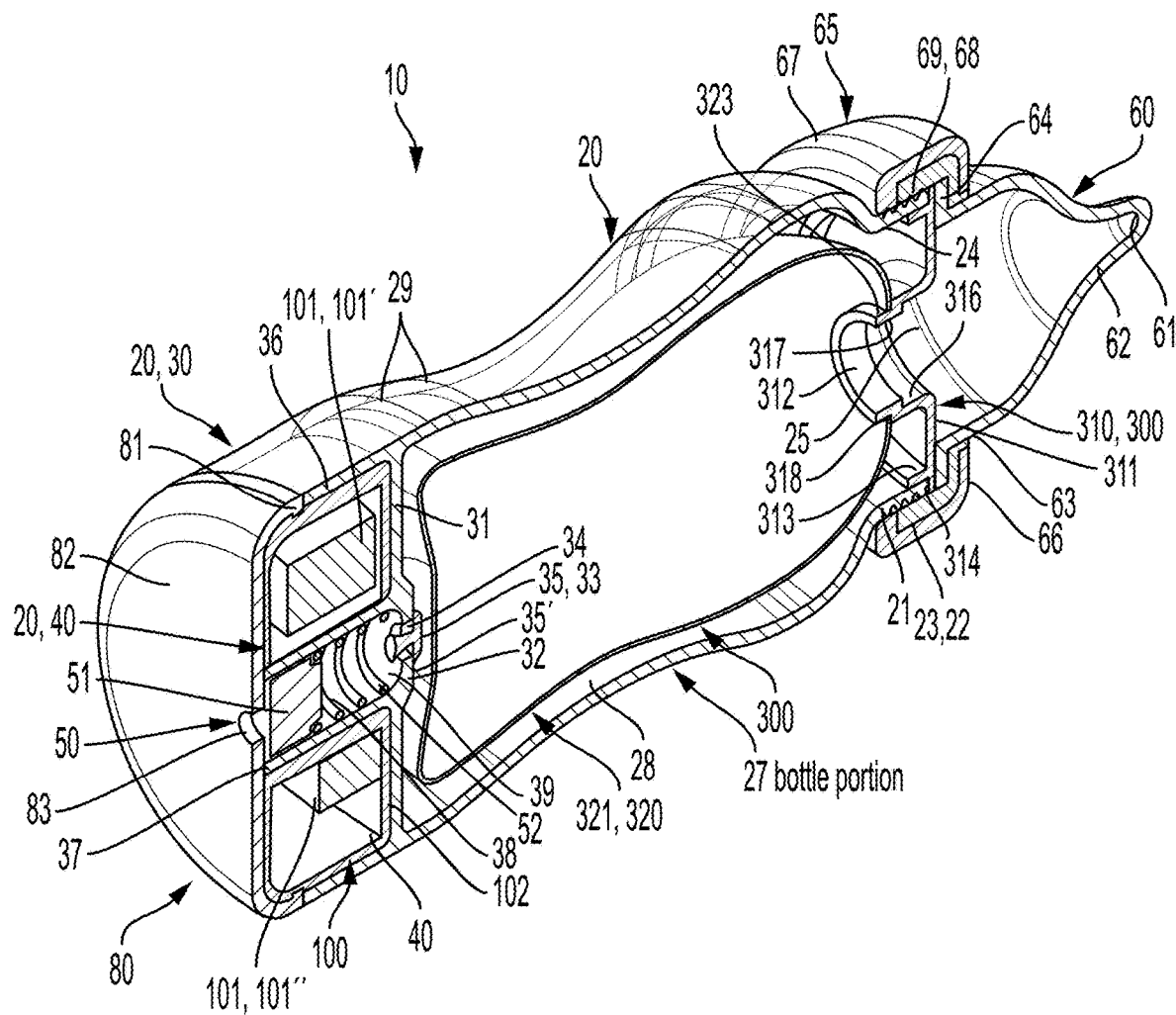
FIG. 1 is a perspective schematic cross-section diagram of a bottle apparatus 10, according to principles of the disclosure.

The headings provided herein are for convenience only and do not necessarily affect the scope or meaning of what is claimed in the present disclosure.

In the drawings, same reference numerals and acronyms have been used to identify same or similar structure, components or functionality for ease of understanding and convenience.

DETAILED DESCRIPTION OF THE DISCLOSURE

A few inventive aspects of the disclosed embodiments are explained in detail below with reference to the various drawing figures. Exemplary embodiments are described to illustrate the disclosed subject matter, not to limit its scope, which is defined by the claims. Those of ordinary skill in the art will recognize a number of equivalent variations of the various features provided in the description that follows.

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. Various examples and embodiments are described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

FIG. 1 is a perspective schematic cross-section diagram of a bottle apparatus 10 according to principles of the disclosure. The bottle apparatus 10 can also be described as a beverage apparatus or bottle 10. In one embodiment and application of the bottle 10, the bottle 10 can be used by an infant or baby for consumption of a consumable contained in the bottle 10. For example, the consumable might be formula intended for consumption by an infant. The formula can be created by a powder mixed with water or milk, for example. It is of course appreciated that various other liquids or compositions can be contained in the bottle 10. Also, the apparatus can be used by a wide variety of users.

The bottle or bottle apparatus 10 can include a housing assembly 20 and a nipple assembly 60. The nipple assembly 60 can be mounted or connected at an end of the housing assembly 20. An attachment collar 65 can be used to attach the nipple assembly 60 onto the housing assembly 20.

As shown in FIG. 1, the nipple assembly 60 can include a nipple portion 62 that includes a flow opening or slit 61. The flow opening or slit 61 can provide flow of liquid out of the bottle 10 upon a baby sucking on the nipple portion 62. The nipple portion 62 can be tapered and of curved construct so as to ergonomically engage with the baby's mouth. The flow opening 61 can be located at a tip or end of the nipple portion 62. The nipple assembly 60 can be constructed of flexible material that is suitable for engagement with the baby. The nipple assembly 60 can include a base side wall that can be ring or annular shaped. The base side wall 63 can be of consistent diameter throughout at least a portion of the height (of the base side wall 63) as illustrated in FIG. 1.

The nipple assembly 60 can also include a securement flange 64. Such securement flange 64 can also be ring or annular shaped. The securement flange 64 can serve to attach the nipple assembly 60 onto the housing assembly 20. In particular, the securement flange 64 can be sandwiched between or clamped between a neck portion 21 (of the housing assembly 20) and the attachment collar 65 and/or between an attachment assembly 310 and the attachment collar 65. As described below, the attachment assembly 310 can be provided so as to attach a pouch, bag, or other container assembly onto the housing assembly 20. In some embodiments, the nipple assembly 60 can be constructed of different material. For example, the securement flange 64 can be constructed of rigid plastic and the nipple portion 62 constructed of pliable rubber that is conducive to be engaged by the mouth of a baby, for example.

The neck portion or neck 21 can include an outer surface 22 or outer diameter (OD). The outer surface 22 can include threads 23. The threads 23 can engage with threads 69 on the attachment collar 65. Other attachment mechanisms can be used instead of threads. For example, a snap fit mechanism can be used to attach the attachment collar on to the housing assembly. The neck portion 21 can also include an inner diameter (ID) or inner diameter surface 24. The inner diameter surface 24 can define an opening 25 of a bottle portion 27.

Accordingly, the housing assembly 20 can also include a bottle portion 27. The bottle portion 27 can be of an ergonomic shape so as to be easily held and manipulated by a user. The bottle portion can have an internal volume 28. The bottle portion 27 can have one or more grip ridges 29 that run around the outer surface of the bottle portion 27. The bottle portion 27 can be constructed of plastic, for example, with grip ridges 29 integrated therein.

The attachment collar 65 can include a collar securement flange 66. The collar securement flange 66 can be an annular ring or collar. A sidewall 67 can be concentric with the collar securement flange 66 and extend downwardly from the collar securement flange 66. The side wall 67 can have an internal surface 68 with threads 69 on such surface. The threads 69 of the attachment collar 65 engage with threads 23 of the neck portion 21. Other engagement or securement mechanisms can be used so as to attach the attachment collar 65 onto the housing assembly 20. As described above, the securement flange 64 of the nipple assembly 60 (along with attachment assembly 310) can be sandwiched or clamped between the attachment collar 65 and the neck portion 21.

Figure 9:
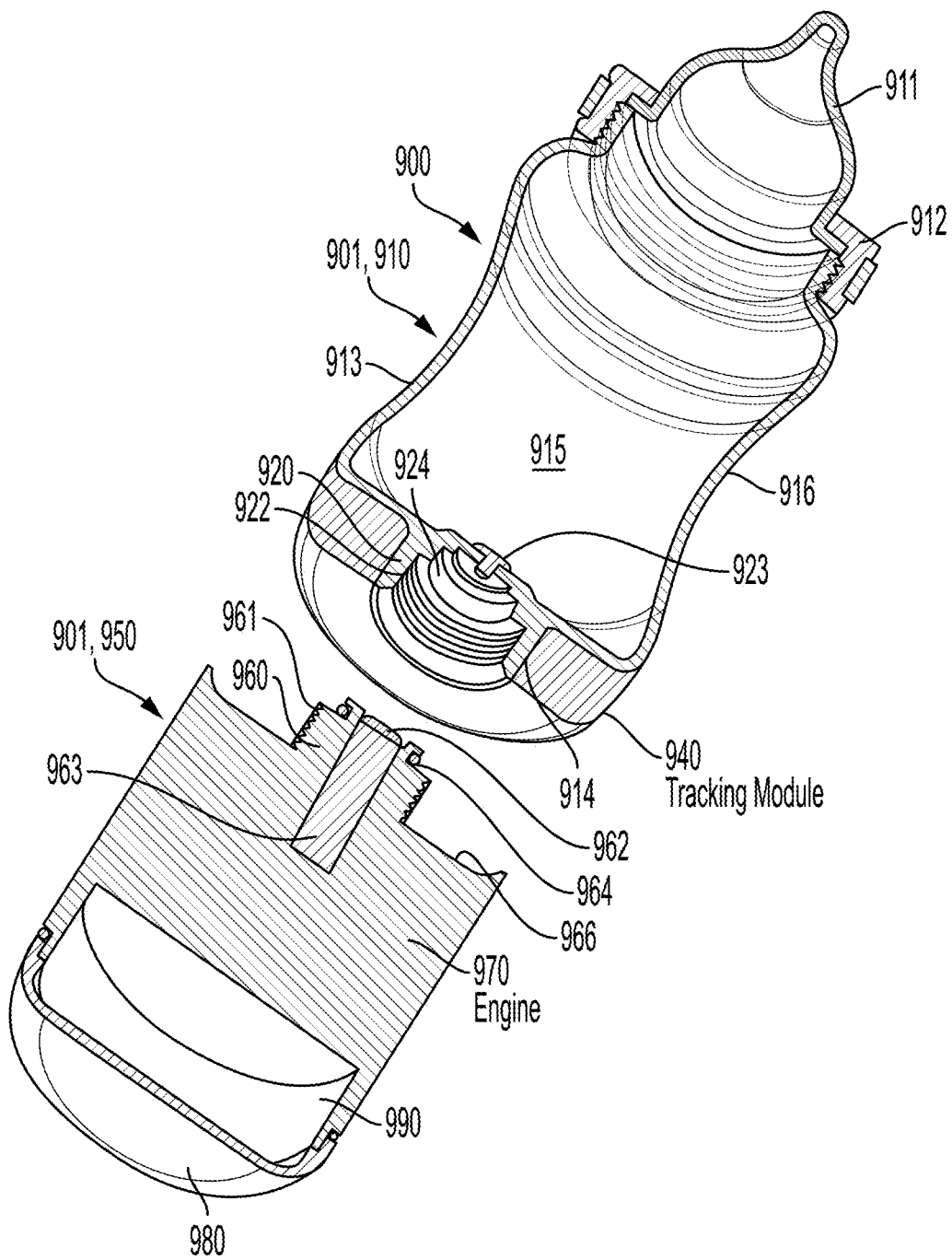
FIG. 9 is a schematic cross-section perspective view of a bottle apparatus 900, according to principles of the disclosure.

The housing assembly 20 can also include a base portion 30. In the embodiment of FIG. 1, the base portion 30 is integrally formed with the bottle portion 27. In other embodiments, the base portion 30 can be a separate component from the bottle portion 27. For example, the base portion can be threadably attached to the bottle portion 27. FIG. 9 illustrates such an illustrative alternative embodiment. The base portion 30 can include a base portion sidewall 36, which can also be described as an outer casing of the base portion 30. The base portion sidewall 36 and the bottle portion 27 can include a continuous outer surface of the bottle apparatus 10. The base portion 30 can include baseplate 31. The baseplate 31 can form a lower surface or portion so as to define the internal volume 28. The baseplate 31 can serve to separate the bottle apparatus 10 into (1) an upper portion in which a consumable liquid is stored and (2) a lower portion in which various components of the bottle apparatus 10 are housed, for example. The baseplate 31 can include and/or be associated with various apertures, attachment elements, accoutrements and other features so as to be integrated with and provide for various operating components as described herein.

The base portion 30 can include a raised center portion 32 and an inner tube or tube 37. The raised center portion 32 can provide structural integrity so that the base portion 30 can support the tube 37. The tube 37 can include an inner surface 38. The inner surface 38 can define an internal cavity 39. In the embodiment of FIG. 1, the internal cavity 39 can accommodate a flow meter assembly 50, i.e. a flow measuring device or mechanism.

The raised center portion 32 of the baseplate 31 can include a valve assembly 33. The valve assembly 33 can be a one-way valve to allow flow from the internal cavity 39 into the internal volume 28. The one-way valve can include a valve member 35. The valve member 35 can include or be in the form of an umbrella valve. The valve member 35 can be attached to the baseplate 31 by extending into a suitable attachment aperture or hole 35'. The valve member 35 can control passage of fluid, such as air, from the internal cavity 39 into the internal volume 28 through a valve aperture or hole 34. Accordingly, under a pressure differential, air can flow from the internal cavity 39 into the internal volume 28, but air is precluded from flowing the opposite way. Such arrangement provides for airflow into the internal volume 28 as the content of a storage assembly 320, that can include pouch 321, is depleted, i.e. and relatedly precludes the buildup of a vacuum in the internal volume 28 that could prevent or hinder consumable content from flowing out of the bottle apparatus 10.

Relatedly, the bottle apparatus 10 can include the flow meter assembly 50. The flow meter assembly 50 can include a plunger member 51. The plunger member or plunger 51 can include an outer periphery that seals with the inner surface 38 (of the tube 37) so as to prevent air from flowing between the inner surface 38 and the plunger 51. Accordingly, as content of a storage assembly 320 or pouch 321 is depleted, the plunger 51 can move toward the valve assembly 33, i.e. as air flows from the internal cavity 39 into the internal volume 28. Such movement or advancement of the plunger 51 corresponds to depletion in content in the internal volume 28. Accordingly, movement of the plunger 51 can be monitored (by a suitable sensor as described below) so as to assess how much content has been depleted from a bag 321. In other words, movement of the plunger 51 can be monitored so as to determine how much a baby has drunk his or her formula. In other words, as liquid or formula is drunk from the bottle apparatus 10, such will create a pressure differential between the internal volume 28 and the internal cavity 39. The valve assembly 33, a one-way valve, can allow airflow from the internal cavity 39, through the valve assembly 33, and into the internal volume 28—so as to relieve such pressure differential between the spaces 39, 28. Such flow of air will move the plunger 51. As shown in FIG. 1, an inlet aperture 83 can be provided so as to allow ambient air to flow into the internal cavity 39 as the plunger member 51 is pulled toward the valve assembly 33.

The flow meter assembly 50 can include the plunger member 51. The assembly 50 can also include a spring 52. The spring 52 can be positioned between the baseplate 31 and the plunger 51. Accordingly, the spring 52 can bias the plunger 51 toward a plate 82, i.e., with the plate 82 forming an end of the bottle apparatus 10. A force exerted by the spring 52 onto the plunger 51 should be sufficient so as to overcome a frictional force of the plunger 51 against the inner surface 38. Accordingly, the plunger 51 can be "fitted" against the inner surface 38 so as to provide an effective seal, so as to prevent air from flowing around the plunger 51. In conjunction, the spring 52 should be able to provide sufficient force so as to move the plunger 51 back to a starting position, with the plunger 51 pressed against the plate 82. Relatedly, the friction force of the plunger 51 in the tube 37 in combination with spring force of the spring 52 should not be enough to hinder effective operation of the bottle apparatus 10. In other words, the friction force in combination with a spring force should not be enough to hinder a baby from effectively and efficiently drinking from the bottle apparatus 10. As illustrated in FIG. 1, the plunger 51 can be provided with an outer shoulder or annular recess so as to "nest" with the spring 52.

In operation of the bottle apparatus 10 and flow meter assembly 50, in one embodiment of the disclosure, as a baby takes a drink from the bottle 10 content in the internal volume 28 is depleted. As a result, air flows from the internal cavity 39 into the internal volume 28, hand-in-hand with movement of the plunger 51, i.e. as volume of the internal cavity 39 is effectively reduced. As described above, such movement of the plunger 51 can be determined by sensors so as to determine how much content has been consumed by the baby.

Figure 2:
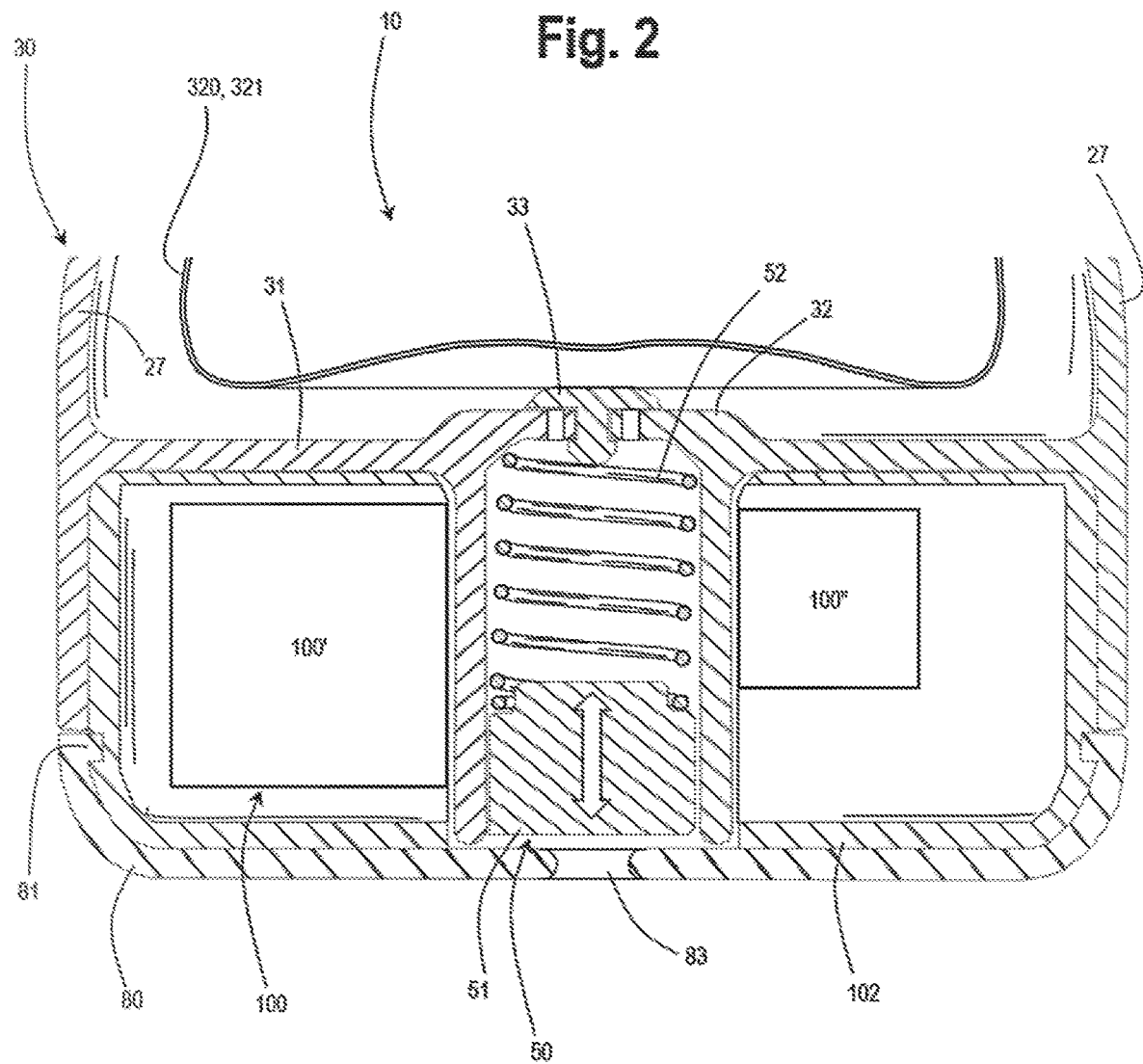
FIG. 2 is a schematic cross-section diagram of a base portion 30, of a bottle apparatus 10 the same as or similar to the bottle apparatus 10 of FIG. 1, according to principles of the disclosure.
Figure 3:
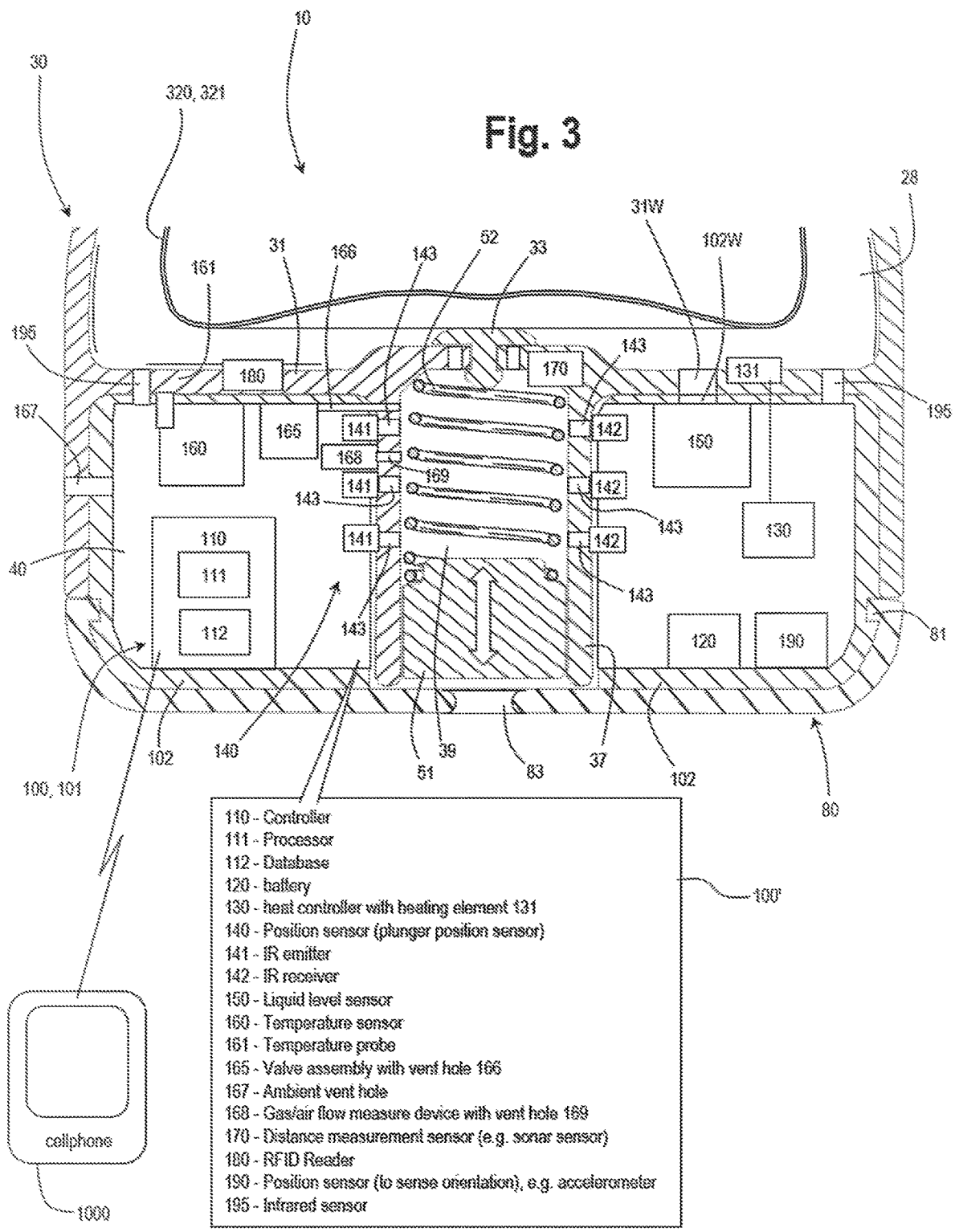
FIG. 3 is a further schematic cross-section diagram showing further details of a base portion 30, of a bottle apparatus 10 the same as or similar to the bottle apparatus 10 of FIG. 1, according to principles of the disclosure.

FIG. 2 is a schematic cross-section diagram of a base portion 30, of a bottle apparatus 10 the same as or similar to the bottle apparatus 10 of FIG. 1, according to principles of the disclosure. FIG. 3 is a further schematic cross-section diagram showing further details of a base portion 30, of a bottle apparatus 10 the same as or similar to the bottle apparatus 10 of FIG. 1, according to principles of the disclosure.

As described above, the plunger 51 can advance upwards, as shown in FIG. 3, in conjunction with formula or other consumable liquid being removed from the internal volume 28. Accordingly, movement of the plunger 51 upwards, in FIG. 3, can be utilized as a measurement of how much consumable liquid has been consumed. For example, if the diameter of the internal cavity is 4 centimeters and the plunger 51 moves 2 centimeters, then the change in volume of the system (such system including the internal cavity 39 and the internal volume 28) can be determined to be around 25 mLs (milliliters). Such change in volume of the system can be attributed to the amount of consumable liquid the user has drunk. Accordingly, in this example, 25 mLs can be determined to have been drunk from the bottle apparatus 10. At a point, the user (in this example a baby) will have drank or sucked an amount of liquid out of the internal volume 28 that will result in the plunger 51 moving as far as the plunger 51 can move toward the baseplate 31. That is, the "travel" of the plunger 51 will be at or near an "end of travel" position. Once the baby completes the particular drink of the bottle, the baby will release the sucking pressure on the nipple portion 62. As a result, air may or may not flow back into the internal volume 28 is a result of any residual vacuum in the internal volume 28. That is, the internal volume 28 may equalize in pressure to the ambient. However, the one-way valve assembly 33, in this embodiment, will not allow air to flow into the internal cavity 39, such that the plunger 51 could move back to the position shown in FIG. 3.

Accordingly, in an embodiment, the apparatus 10 can include a valve assembly 165 that is in communication with the internal cavity 139 via a vent hole 166. The valve assembly 165 can include a valve element that is controlled by a solenoid, for example. The valve element can be positioned, by the solenoid, so as to selectively allow flow of air through the valve assembly 165 and vent hole 166. The valve assembly 165 can include a ball valve or a butterfly valve, for example. An internal cavity or component cavity 40 of the beverage apparatus 10 can also be provided with an ambient vent hole 167.

Accordingly, in the processing, the user/baby can suck or drink from the bottle 10 resulting in a flow of content out of the bottle 10 and a flow of air out of the internal cavity 39 through the one-way valve assembly 33. Such results in the plunger or piston 51 being moved toward the baseplate 31. This movement can be monitored by sensors—and such movement can be translated by processing (as performed by a controller 110) into a determination of how much consumable liquid has been consumed. At a point in the movement of the piston 51, the valve assembly 165 can be opened so as to vent air back into the internal cavity 39. That is, the valve assembly 165 can be opened so as to allow air to flow in from the ambient through ambient vent hole 167, through the component cavity 40, through the opened valve 165, and through the vent hole 166. As a result, the plunger 51 will move or "pop" back to the position shown in FIG. 3. Then, the valve assembly 165 can again be closed, so as to shut off or close the vent hole 166. As such point, movement of the piston 51 can continue to be monitored in a further "cycle" so as to continue to monitor consumption from the bottle 10. In one aspect of such processing, the opening of the valve assembly 165 can signify the end of a cycle, or alternatively can be described as signifying the beginning of a cycle. The opening of the valve assembly 165 can be described as a "reset" of the processing. In an embodiment, the valve assembly or valve 165 can be opened, i.e. the process can be reset, upon the system determining that the plunger 51 has reached the end of its travel towards the baseplate 31. It is appreciated that reset of the process, i.e. opening of the valve 165 and movement of the plunger 51 to its start position against the plate 82 will take a discrete event of time. During such time, the baby may be continuing to drink or suck from the bottle 10. In an aspect of the processing, such amount of time to reset the system can be assumed to be so small so as to not affect the overall calculation. In other words, the amount of consumable liquid consumed during the time to reset the system can be ignored. In other embodiments, a rate of consumption can be determined and extrapolated over the time to reset the system. For example, rate of consumption before a reset might be measured to be 1 mL/second (milliliter/second) and rate of consumption after the reset might be measured to also be one mL/second. If the reset is observed to take 0.1 seconds, then the amount of liquid consumed in the time that the system took to reset might be assumed to be 0.1 mL.

In an embodiment, the bottle apparatus 10 can be provided with a flow measure device 168 and a further vent hole 166. In such embodiment, the plunger 51 can be omitted or not used. That is, the flow measure device 168 can measure the flow of air that flows into the internal cavity 39. Based on the amount of air measured, the controller 110 can determine how much content in the bottle 10 has been consumed by the user/baby. The flow measure device 168 can be utilized in a "bag in bottle" arrangement, as is illustrated in FIG. 1.

In accordance with at least one embodiment of the disclosure, the flow measure device 168 can include two temperature sensing elements in conjunction with at least one heating element. The heating element and temperature sensors can be arranged in sequence along a flow path of the air. The two temperature sensing elements can be spaced a predetermined equal distance from the heating element, for example. When there is no flow of air, both temperature sensing elements can be observed to be the same temperature. However, as air or gas moves past the temperature sensors and the heating element, one of the temperature sensing elements will measure a cooler temperature and one will measure a warmer temperature. The difference of the two temperatures is a calculable function of the airspeed. In turn, the airspeed can be utilized so as to determine the volume of air that has passed through the vent hole 166, for example. Based on the volume of air that has passed, the controller 110 can determine an estimated amount of consumable liquid that has been output from the internal volume 28. That is, the controller can calculate an estimated amount of consumable liquid that has been consumed by the user/baby. In order to effectively perform such processing, it is appreciated that the system of the bottle apparatus 10 is in a sealed state, with airflow (into the system) exclusively via the vent hole 166 and output being exclusively via the nipple assembly 60. Any small leaks in the system can allow air in, bypassing the air measure device 168. Accordingly, such leaks can result in underreporting of consumable liquid consumed. That is, air from a leak can replace consumed liquid in the internal volume 28, as opposed to the "replacement" air flowing through the flow measure device 168 and being measured. In such processing, it can be beneficial to space the airflow measure device 168 from the internal volume 28. Such arrangement can be beneficial in that the contents of the internal volume 28 may be heated. Such heated contents may generate heat gradients that render the flow measure device inaccurate. For example, one temperature sensor of the airflow measure device 168 might be heated by the contents of the internal volume 28 whereas the other temperature sensor is not heated.

The flow measure device 168 can utilize known devices that measure flow of gas or air.

In accordance with a further embodiment of the disclosure, level sensing technology can be utilized in a situation in which there is not a bag or pouch 321 in the bottle apparatus 10. Such further level sensing arrangement can include an infrared approach. The processing can rely on timing of a reflected signal. The pulse of light can be emitted from an infrared device. The pulse of light can be reflected off a surface and reflected back to the infrared sensor. An elapsed time between when the pulse was emitted and when the pulse was received back at the sensor can determine the distance. The arrangement can include a plurality of infrared sensors 195 as illustrated in FIG. 3. The infrared sensors 195 can be in direct communication (i.e. exposed) with the internal volume 28 or can transmit and receive light through a window or lens. It is appreciated that some consumable liquid that may be contained in the internal volume 28 may be murky and resistant to the transfer of light. However, to address such situation, the magnitude of light emitted from the infrared sensor can be provided/emitted to be sufficiently strong so as to pass through such consumable liquid. FIG. 3 shows a pair of infrared sensors 195 on opposing sides and at the bottom of the internal volume 28. In an embodiment, the arrangement can include two or three infrared sensors mounted around the perimeter of the baseplate 31. An accelerometer 190 can be a three axis accelerometer. Accordingly, the bottle inclination angle and rotation could be input and measured (by the controller 110) in conjunction with operation of the infrared sensors 195. The accelerometer 190 can be mounted at an angle to avoid gimbal lock. Liquid level distances reported from each sensor at any level other than totally full can be reported back to the controller 110. Accordingly, such arrangement could allow liquid level, and thus amount of content in the internal volume 28, to be determined even when the bottle apparatus 10 is not level. Indeed, in the situation that the user is a baby, the bottle apparatus 10 may routinely not be level.

As described above, in an embodiment, movement of the plunger 51 can be monitored. From such movement of the plunger, variance in the volume of the internal cavity 39 can be determined by the controller 110. For example, if the diameter of the plunger 51 is 4 cm and the plunger moves 2 centimeters toward the baseplate 31, then the change in volume (specifically decrease in volume) can be calculated to be about 25 milliliters. Such decrease in volume can be used to determine content or formula, for example that has been consumed by the baby. In such processing, a position sensor 140 (or plunger position sensor 140) can be utilized so as to determine the movement of the plunger 51 and the position of the plunger 51. For example, the beverage apparatus 10 can include an infrared (IR) emitter 141 and an IR receiver 142. More generally, the apparatus 10 can include a light emitter 141 and a light receiver 142. Windows 143 can be provided so as to transmit light between the emitter 141 and the receiver 142, i.e. transmit light across the internal cavity 39. It should be appreciated that so long as the receiver 142 senses the light (from the emitter 141) the plunger 51 has not moved from its position as shown in FIG. 3. However, as the volume of the internal cavity 39 is decreased, the plunger 51 will move into position between the receiver 142 and the emitter 141. As result, position of the plunger 51 can be determined. It should be appreciated that a plurality of light receivers or light receiver elements can be provided along the length of the internal cavity 39. In an arrangement, a single light emitter 141 can be utilized in conjunction with the plurality of light receivers 142. As a particular light receiver 142 can be determined by the controller 110 to not sense slight, i.e. as the plunger 51 is positioned over such light receiver 142, the position of the plunger 51 can be ascertained. Accordingly, if all the light receivers 142 are blocked from receiving light, then the controller 110 can assume that the plunger 51 is at the end (FIG. 3) of its travel. In an embodiment were only one light emitter 141 is utilized, such single light emitter can be positioned so as to not be blocked (by the plunger 51) until the last light receiver 142 is also blocked. That is, for example, if a single light emitter 141 is utilized such could be the "top" positioned light emitter 141 as shown in FIG. 3.

As described above, the beverage apparatus or bottle apparatus or bottle 10 can include a variety of operating components. That is, the bottle apparatus 10 can include a collection of control components 101 that form or constitute a component assembly 100. As schematically illustrated in FIG. 1 and FIG. 2, the control components 101 can include control components 101' and control components 101". The control components 101 can include the controller 110, various sensors, control mechanisms that are associated with the sensors, data wires, communication wires to allow communication between the various components, support mechanisms and/or other elements, components or mechanisms, for example. The apparatus of FIG. 3 can include components as reflected at 100'.

The base portion 30 can include a component support structure 102, as shown in FIG. 1 and FIG. 3, for example. The component support structure 102 can form or define a component cavity 40. For example, the component cavity 40 can be in a donut or annular shape. Accordingly, the component cavity 40 can extend around the tube 37. The component cavity 40 can include a variety of structural support elements or attachment mechanisms that serve to accommodate the various electrical components and other components contained in or associated with the component cavity 40.

The control components 101 can include the controller 110. The controller 110 can include one or more processors 111 and can include one or more databases 112. The controller 110, processors 111, and/or database 112 can constitute a processing machine so as to perform the various processing described herein. The processor 111 can process instructions, which are stored in the database 112, so as to perform the various processing as described herein. The control components 101 can further include position sensor 141 that can include one or more IR emitters 141 and the IR receivers 142 (i.e. a light emitter(s) and a light receivers). The control components 101 can include a temperature sensor 160. The temperature sensor 160 can include or be associated with a temperature probe 161. The temperature probe 161 can extend through the component support structure 102 and through the base plate 31 so as to be exposed to the internal volume 28. Thus, temperature probe 161 can input a temperature reading from the internal volume 28. The temperature sensor 160 can include probes in any location of the bottle apparatus 10 so as to input a corresponding temperature. The controller 110 can then use the temperatures so as to perform suitable processing. In one embodiment, the control components 101 can include a heater 131 that can heat the internal cavity 39 and the contents therein. Thus, baby formula in the internal volume 28 could be heated to a desired temperature. With regard to the various components that penetrate the internal volume 28, it should be provided that suitable sealant can be utilized so as to prevent the passage or seepage of air or liquid around such components.

The control components 101 can also include a liquid level sensor 150, as otherwise described herein. The liquid level sensor 150 can be positioned adjacent transparent window 31W and transparent window 102W so that the liquid level sensor 150 can "see into" the internal volume 28. As otherwise described herein, in some embodiments or uses of the bottle apparatus 10, a bag is not used to contain consumable liquid. Rather, the structure of the housing assembly 20 is utilized to contain the consumable liquid. That is, the consumable liquid is contained within the confines of the internal volume 28. In such embodiment, the liquid level sensor 150 can output a light or infrared (IR) beam and measure "time-of-flight" of a reflection of the light beam off a liquid surface of the liquid contained in the internal volume 28. Accordingly, by measuring the time-of-flight, the liquid level sensor 150 can determine an amount of consumable liquid in the bottle apparatus 10. Accordingly, the liquid level sensor 150 can be used in the use scenario that a bag is not used to contain the consumable liquid. On the other hand, the position of the plunger over time (as monitored by position sensor 140) and/or the flow measure device 168 can be used in the use scenario that a bag or pouch 321 is used to contain the consumable liquid.

As shown in FIG. 3, the control components 101 can also include one or more batteries 120. The batteries 120 can be rechargeable from an exterior power source. A battery 120 can be connected to each of the control components 101 that require power. Alternatively, the battery 120 can power the controller 110, and the controller 110 can in turn output power to components as needed so as to power such components.

As otherwise described herein, the control components 101 can include a temperature sensor 160. The control components can also include a heat controller 130 with a heating element 131. The heat controller 130 and/or the controller 110 can input a desired temperature from the user, i.e. as a setting, and heat contents of the internal volume 28 to such desired temperature, using the heating element 131.

The control components 101 can also include a distance measurement sensor 170. The distance measurement sensor 170 can be in the form of or include a sonar sensor or an optical sensor that measures distance. The distance measurement sensor 170 can utilize time of flight processing using laser or ultrasonic energy, for example. As shown in FIG. 3, the distance measurement sensor 170 can be positioned at or adjacent to an upper portion of the internal cavity 39. The distance measurement sensor 170 can output light energy or sound energy so as to be reflected off the plunger 51. The distance measurement sensor 170 can use time-of-flight of such reflected energy so as to determine distance of the plunger 51 from the distance measurement sensor 170. Accordingly, the distance measurement sensor 170 can determine position and movement of the plunger 51. By monitoring position and movement of the plunger 51, the distance measurement sensor 170 (in conjunction with the controller 110) can determine amount of consumable liquid that has been output or dispensed from the internal volume 28.

The control components 101 can also include a position sensor 190. The position sensor 190 can be in the form of or include an accelerometer. The position sensor can sense orientation of the bottle apparatus 10.

As shown in FIG. 1 and FIG. 3, for example, the tube 37, of the base portion 30, can extend down or to an end assembly 80. The end assembly 80 can be described as an end cap. The end assembly 80 can provide an end or cap at a bottom of the bottle apparatus 10. The end assembly can be mechanically attached onto the base portion 30 and/or the component support structure 102. For example, the end assembly 80 can be threadably attached to the base portion 30 and/or the component support structure 102. Other mechanical attachment mechanisms can be utilized instead of threading. For example, an attachment collar 81, of the end assembly 80, can include threads so as to attach the end assembly 80 onto the housing assembly 20, for example. The end assembly 80 can include the plate 82 as described above. The plate 82 can include the inlet aperture 83. The inlet aperture 83, as described above, can expose an outer side of the plunger 51 to the ambient environment. It should be appreciated that the inlet aperture 83 can be in the form of more complex geometrical patterns or shapes so as to avoid a situation that the inlet aperture 83 is blocked. For example, a situation could occur in which a baby places her hand over the inlet aperture 83 or a situation in which the bottle apparatus 10 is otherwise blocked. Accordingly, the inlet aperture 83 can include ridges or surface variances so as to maintain the inlet aperture 83 in communication with the ambient—and thus maintain the outer surface of the plunger 51 in communication with the ambient.

As shown in FIG. 1, the bottle apparatus 10 can include a pouch assembly 300. The pouch assembly 300 can also be described as or be constituted by a container assembly 300 or a pod 300. In use of the bottle apparatus 10, the pouch assembly 300 can be "switched out" for another pouch assembly. Each of the pouch assemblies can be prefilled with powder or formula powder. Accordingly, a user can add water to the formula powder and thus make baby formula that can be consumed by the baby. Accordingly, in an embodiment of the disclosure, the pouch assembly 300 can be the component that is replaced. In other words, a first pouch assembly 300 can be prepared and consumed by a baby. Then, such first pouch assembly 300 can be discarded—and a new pouch assembly prepared.

The pouch assembly 300 can be secured within the bottle apparatus 10 by virtue of a neck shoulder or support shoulder 314 being clamped or "sandwiched" between the attachment collar and the neck portion 21. Thus, to "switch out" a depleted pouch assembly 300 for a new pouch assembly 300, the attachment collar 65 can be unscrewed from the top of the housing assembly 20. The nipple assembly 60 can come off with the attachment collar 65 or be pulled off separately from the attachment collar 65. The pouch assembly 300 can then be removed from the bottle portion 27.

The pouch assembly 300 can include attachment assembly 310 and storage assembly 320. The attachment assembly 310 can include a support plate 311. The support plate 311 can be a core structural component of the attachment assembly 310. The support plate 311 can be annular or donut-shaped so as to surround a central opening or flow opening 312 of the pouch assembly 300. An outer periphery of the support plate 311 can be the part of the pouch assembly 300 that is sandwiched between the attachment collar 65 and the neck portion 21.

The attachment assembly 310 can include an engagement flange 313. The engagement flange 313 can be in the form of a collar that extends down from the support plate 311. The engagement flange 313 can be sized so as to snugly fit against and engage with the inner diameter surface 24 of the neck portion 21. The peripheral portion of the support plate "outboard" of the engagement flange 313 can be described as a neck engagement shoulder or neck shoulder 314. Thus, the neck shoulder 314 is the peripheral part of the support plate 311 that is outside of the engagement flange 313 and that provides a seating structure and stop so as to attach the attachment assembly 310 onto the housing assembly 20. Accordingly, the engagement flange 313 in conjunction with the support plate 311 can effectively "seat" the pouch assembly 300 onto the housing assembly and specifically onto the neck portion 21. Hand-in-hand, the attachment collar 65 can secure the pouch assembly 300 onto the housing assembly 20.

As shown in FIG. 1, a spacer tube 316 can extend downwardly from the support plate 311 so as to define the flow opening 312. The spacer tube 316 can include a vertical collar or tube. The spacer tube 316 can be integrally formed with the support plate 311. In general, the various components of the attachment assembly 310 can be integrally formed and/or formed in pieces and bonded or otherwise attached together. Accordingly, the spacer tube 316 can form or define a flow opening 312. Relatedly, an inner diameter surface 24 of the neck can form or define an opening 25 of the housing assembly 20. The opening 25 can be concentric with the flow opening 312. A pouch collar 317 can be disposed at a lower end of the spacer tube 316, i.e. lower end when the bottle apparatus 10 is set upon the end assembly 80. The pouch collar 317 can be integrally formed with the spacer tube 316. The pouch collar 317 can be of slightly smaller diameter than the spacer tube 316 and define or be connected at a pouch shoulder 318, which provides a seat for the pouch assembly 300 to engage. In an embodiment, a first half of the pouch collar 317 can be bonded to a neck 323 of pouch 321. Thus, for example, the pouch collar 317 and the pouch 321 can be manufactured and integrally formed together. The other half of the pouch collar 317 can be bonded or affixed onto the spacer tube 316. The other half of the pouch collar can be slid into and frictionally secured and/or bonded into the spacer tube 316. Other attachment arrangements or mechanisms can be utilized so as to attach the pouch onto the attachment assembly 310—and the attachment assembly 310 can then be removably secured into the bottle apparatus 10.

The pouch 321 can be of a desired shape and size so as to conform to the geometrical shape of the internal volume 28 and to be able to be slid into the internal volume 28. For example, the pouch 321 can be filled with formula powder. The size and geometrical shape of such pouch 321 should be conducive to be slid into and through the opening 25 of the housing assembly 20. Once the pouch 321, with powder, is slid into the bottle portion 27, the bottle apparatus can be gently shaken so as to distribute and loosen the powder within the internal volume 28. Thus, the pouch 321 can be shaken out so as to expand and "take up" a lower portion of the internal volume 28. Water can then be added into the pouch 321 so as to complete the formula. Then, the nipple assembly 60 and attachment collar 65 can be screwed onto the top of the housing assembly 20. As result, the bottle apparatus 10 is then prepared for use by a user and consumption of the formula by a baby, for example.

Figure 4:
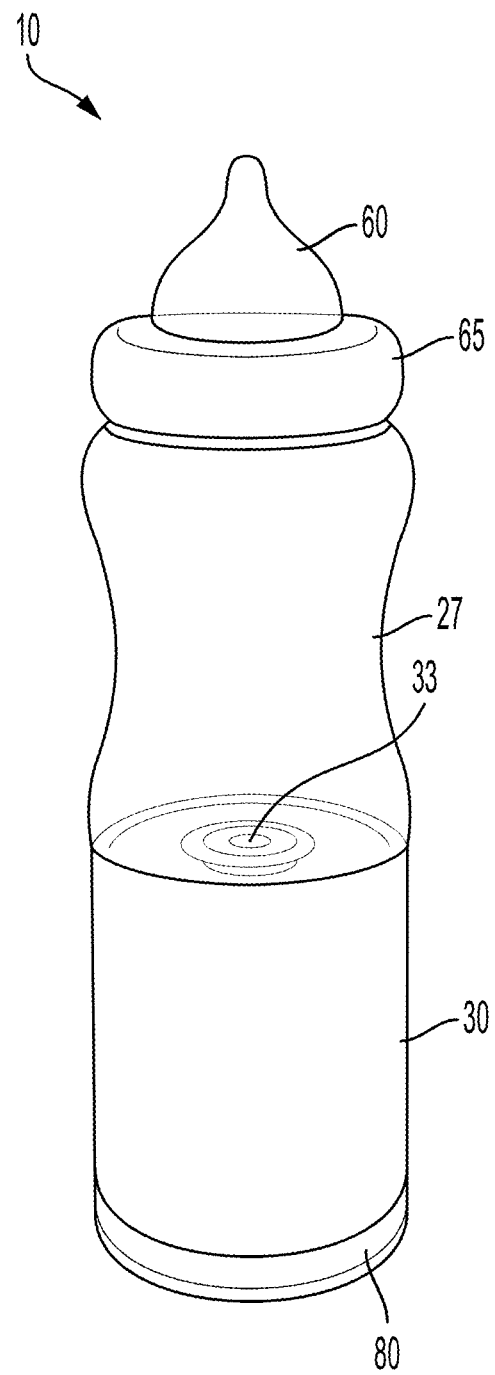
FIG. 4 is a perspective view of a bottle apparatus 10, according to principles of the disclosure.

FIG. 4 is a perspective view of a bottle apparatus 10, according to principles of the disclosure. It should be appreciated that the bottle apparatus 10 can be varied in shape, geometry and size as may be desired. As shown, the bottle apparatus 10 can include the nipple assembly 60, the attachment collar 65, the bottle portion 27, the base portion 30, and the end assembly or end cap 80. The bottle apparatus 10 of FIG. 4 can include the various features of FIG. 1. The bottle apparatus 10 of FIG. 4 shows the valve assembly 33. Additionally, the bottle apparatus 10 of FIG. 4 further shows an ergonomic shape of the bottle portion 27. The bottle portion 27 can be sized in shape so as to be conducive to be held by an infant. The size and geometry of a particular bottle apparatus 10 can be designed based on an intended user. Thus, a bottle designed for an infant of two months can be smaller and of different geometry than a bottle designed for an infant of one year in age.

Figure 5:
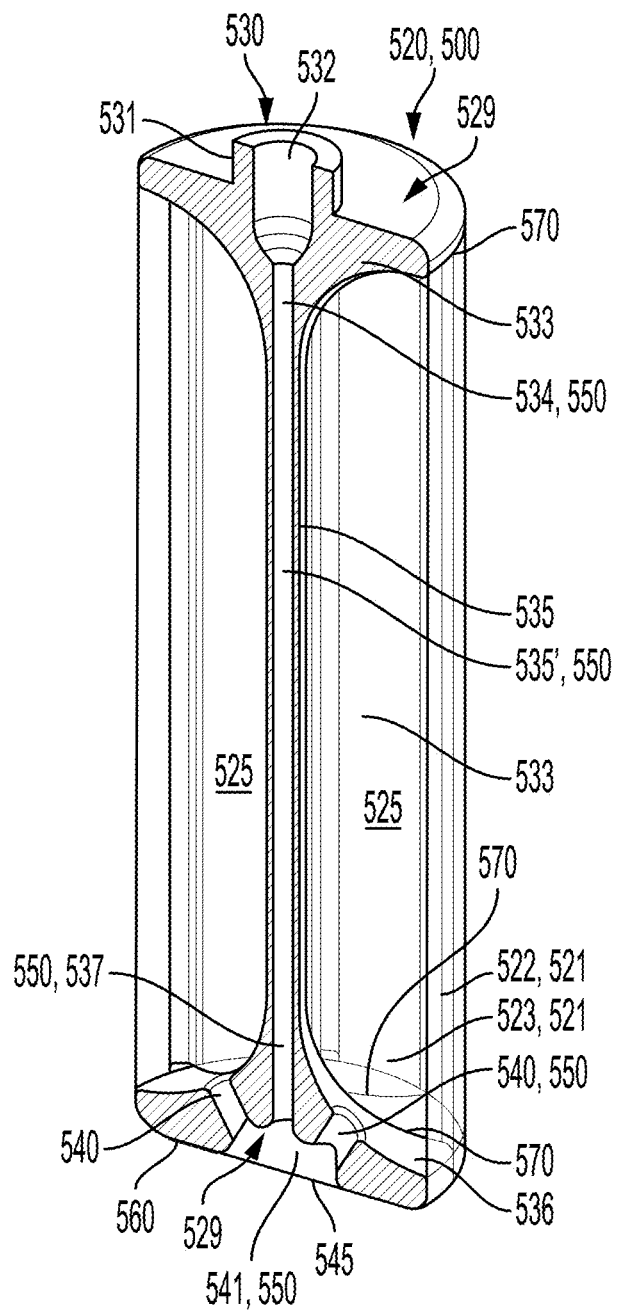
FIG. 5 is a perspective cross section view of a storage assembly or pod 520, according to principles of the disclosure.

The pouch assembly 300 is one example of a replaceable pouch or container assembly that can be used with the bottle apparatus 10. Other pouch assemblies can be used instead of the pouch assembly 300 as shown in FIG. 1. For example, the pouch assembly 500 of FIG. 5 can be utilized in lieu of the pouch assembly 300. Accordingly, FIG. 5 is a perspective cross section view of a storage assembly 520, according to principles of the disclosure.

In an arrangement of the disclosure, the pouch assembly 500 can be mounted or used in the bottle apparatus 10 of FIG. 1. For example, the pouch assembly 500 can include the same attachment assembly 310 as described above. Thus, the pouch assembly 500 can include the attachment assembly 310 and the storage assembly 520. Thus, the storage assembly 320 of FIG. 1 can be "switched out" for the storage assembly 520 of FIG. 5. More specifically, instead of the pouch 321 being attached onto the spacer tube 316, a connection tube 530 (of the storage assembly 520) can be attached onto the pouch collar or collar 317. Thus, the storage assembly 520 can be supported by the attachment assembly 310, which can be collectively supported within the bottle apparatus 10.

Figure 6:
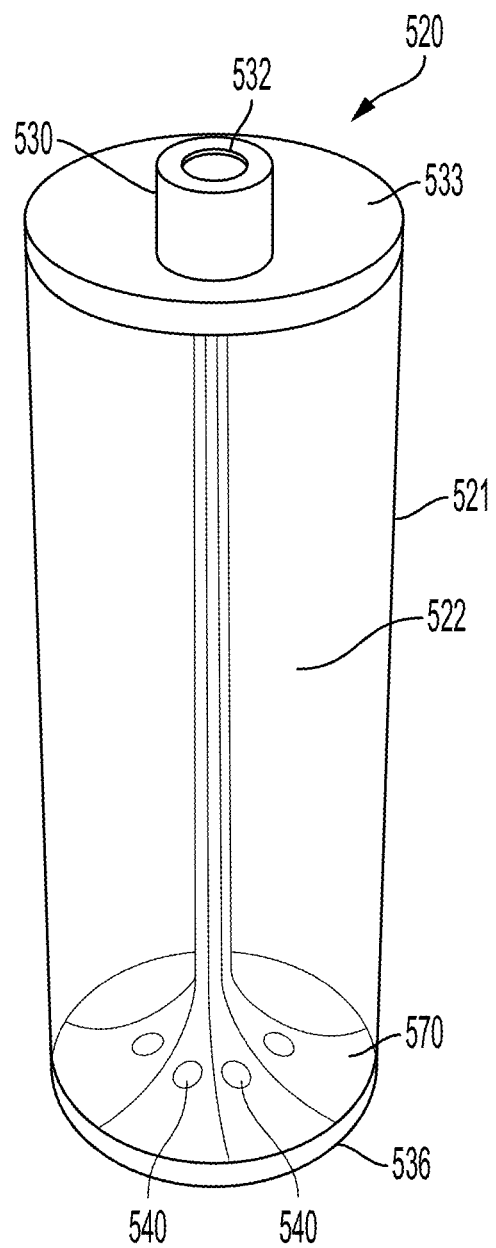
FIG. 6 is a perspective view of a storage assembly 520, according to principles of the disclosure.
Figure 7:
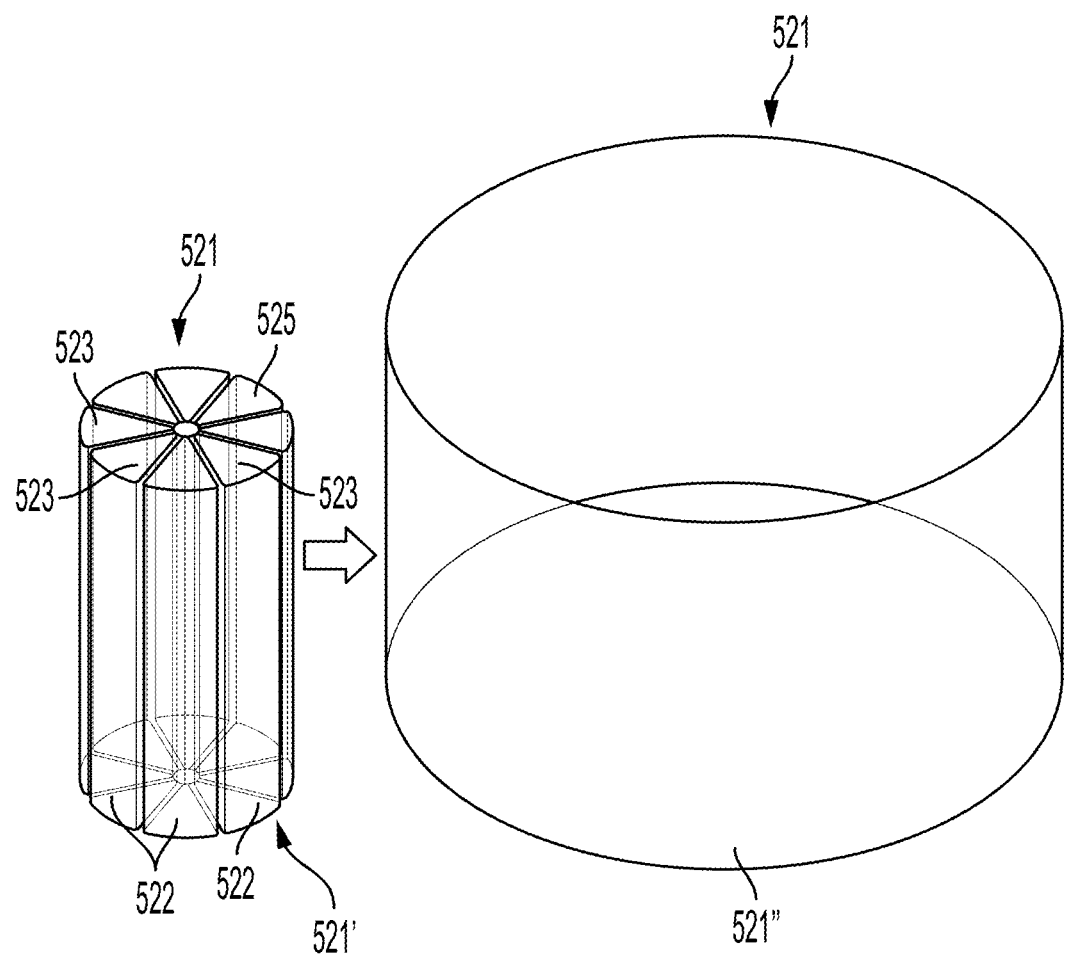
FIG. 7 is a schematic view showing a bag 521, of the storage assembly 520 in an initial folded state 521' and a subsequent expanded state 521", according to principles of the disclosure.
Figure 8:
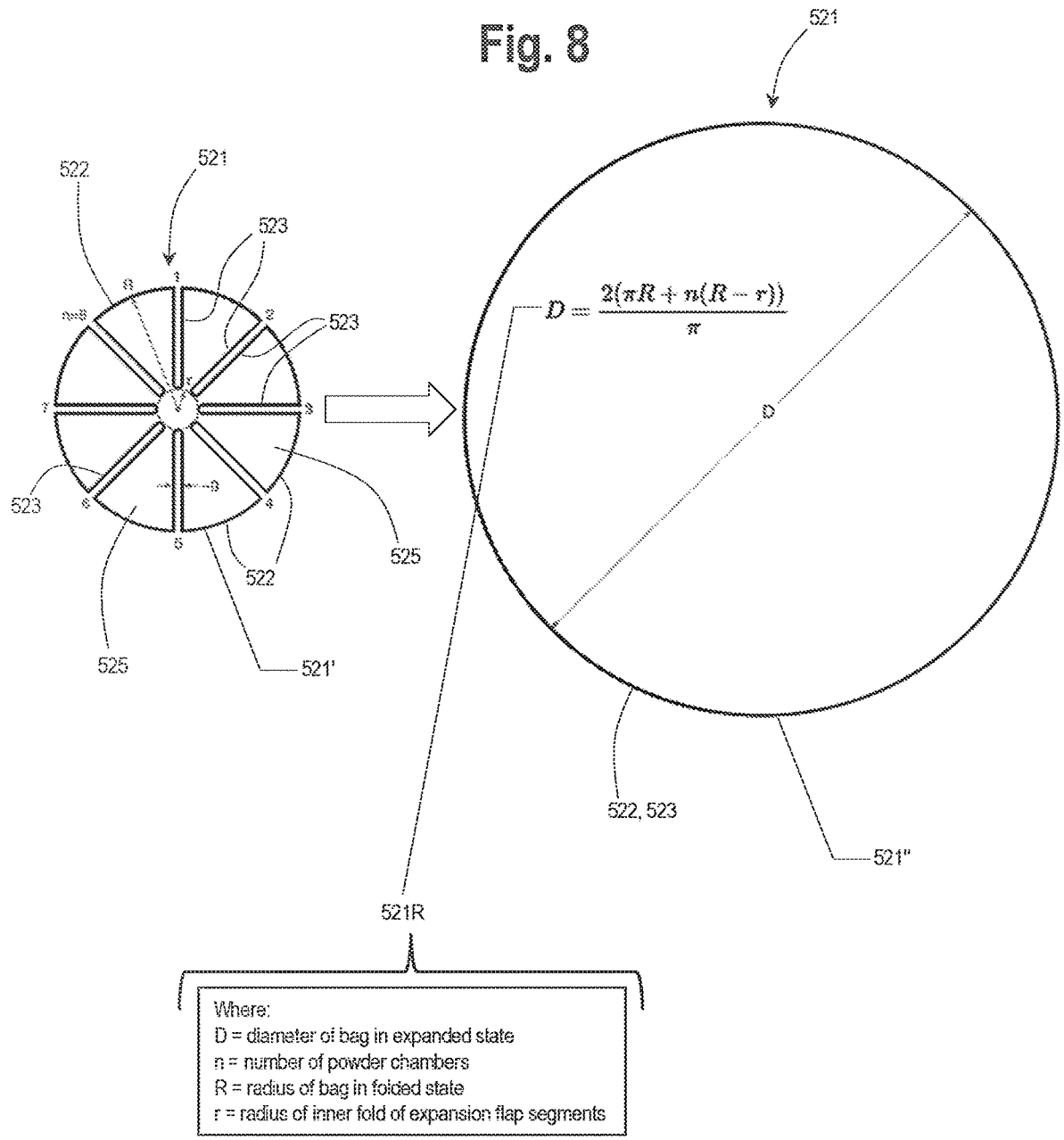
FIG. 8 is a further schematic view showing a bag 521, of the storage assembly 520 in an initial folded state 521' and a subsequent expanded state 521", according to principles of the disclosure.

Relatedly, FIG. 6 is a perspective view of a storage assembly 520. FIG. 7 is a schematic view showing a bag 521, of the storage assembly 520 in an initial folded state 521' and a subsequent expanded state 521", according to principles of the disclosure. FIG. 8 is a further schematic view showing a bag 521, of the storage assembly 520 in an initial folded state 521' and a subsequent expanded state 521", according to principles of the disclosure.

As described above, the storage assembly 520 can include a connection tube 530. The connection tube 530 can connect with the pouch collar 317. The connection tube 530 can include an outer surface (OD) 531. The connection tube 530 can be slid into the pouch collar 317 and frictionally secured or bonded to the pouch collar 317. The connection tube 530 can include a flow aperture 532 as shown in FIG. 5.

The storage assembly 520 can include an upper support member 533 and a lower support member 536. The storage assembly 520 can also include a flow tube 535. The flow tube 535 can serve to connect the upper support member 533 and the lower support member 536. The components 533, 536 and 535 can be integrally formed, such as through an injection molding process, for example. The components 533, 536 and 535 can collectively form a rigid portion 529.

The upper support member 533 can be described as an upper quill member 533, by virtue of its flared shape. Similarly, the lower support member 536 can be described as a lower quill member 536. Such flared shape of the upper support member and the lower support member can enhance flow of liquid within the storage assembly 520 and enhance the mixing of water with powder within the storage assembly 520. The flow tube or connection tube 530 can include a flow passage 535'. The flow passage 534, the flow passage 535', and the flow passage 537 can provide a first passage, second passage, and third passage respectively. Such flow passages can provide a continuous tubular structure as shown in FIG. 5.

The storage assembly 520 can include a distribution cavity 541. The distribution cavity 541 can distribute the flow of water or other fluid from the flow passage 537 to a plurality of distribution passages 540. That is, for example, water can flow down through the flow passages 534, 535', 537 and into the distribution cavity 541, and subsequently through the distribution passages 540 into powder chambers 525. In a folded state 521', the bag 521 can include a plurality of powder chambers 525. However, the bag 521 can transform from the folded state 521' into the expanded state 521". Such transformation is shown in FIG. 6 and in FIG. 7. The flow passage 534, flow passage 535', flow passage 537, distribution cavity 541, and distribution passages 540 can collectively form a flow passageway 550. Thus, water can be added, by a user, into the flow aperture 532 and flow through the flow passageway 550 into the one or more powder chambers 525. The distribution passages 540 can be angled as shown.

In accordance with at least some embodiments of the disclosure, the storage assembly 520 can include a seal membrane 545. The seal membrane 545 can be attached onto the lower support member 536 utilizing adhesive, for example. Other attachment mechanism can be used such as heat bonding. The storage assembly 520 can also include an RFID tag or electronic tag 560. The RFID tag 560 can include a variety of data regarding the storage assembly 520 and the contents of the storage assembly 520. The RFID tag 560 can contain an expiration date for the formula powder or other contents of the storage assembly 520. The RFID tag 560 can contain various other data such as potential allergens or contents that may be of concern to particular users or potential users. Relatedly, the control components 101 housed in the beverage apparatus 10 can include an RFID reader 180. The RFID reader 180 can communicate with the RFID tag 560 so as to input data from and output data to the RFID tag 560. The RFID reader 180 and the RFID tag 560 can utilize known technology. It is appreciated that other electronic tags and other electronic readers can be utilized in lieu of specifically RFID technology. It is appreciated that any of the storage assemblies, bags, pouches, or containers as described herein can include or be associated with an attached RFID tag that contains relevant information regarding contents of the storage assembly, etc.

Hereinafter, aspects of an illustrative use scenario of the storage assembly 520 or pod 520 will be described. In an initial step of production, the storage assembly 520 can be constructed as shown in FIG. 5, excepting that the seal membrane 545 can be left off. Powder or formula powder can then be injected into the powder chambers 525. For example, the powder chambers 525 can be seen in FIG. 7 and FIG. 8. In such example, the storage assembly 520 can be provided with 8 (eight) powder chambers 525. A distribution passage 540 can be provided for each of the powder chambers 525. For example, a powder filling machine can possess one or more nozzles that aim into the distribution passages 540. Such nozzles of the powder filling machine might fill all of the powder chambers 525 at the same time. Alternatively, a single nozzle can be provided on the powder filling machine and the powder chambers 525 filled in a sequential manner. In such filling process, the storage assembly 520 could be supported in a receiving chamber or other supportive structure. Such supportive structure could support and press up against outer bag segments 522, i.e. such that the powder chambers are not "popped out" in the fill process. While in the folded state 521', each of the powder chambers 525 can be filled with or substantially filled with a desired powder. Accordingly, the storage assembly 520, as illustratively shown in FIG. 6, can be filled with powder. Such yields a compact, solid powder filled assembly that is conducive to being packed and shipped in an efficient manner. FIG. 21 shows further features of a further embodiment.

Once the storage assembly 520 is filled with powder to a desired degree, the seal membrane 545 can be applied onto the lower flat portion of the lower support member 536. Thereafter, the RFID tag 560 can be applied onto the seal member 545. Alternatively, the seal membrane 545 and the RFID tag 560 can be a unit that is attached onto the lower support member 536. Accordingly, manufacturing of the storage assembly 520 can include filling of the powder chambers 525 and subsequent application of the seal membrane 545 and RFID tag 560. Subsequently, the storage assembly 520 can be attached onto the attachment assembly 310. The formed pouch assembly 500 can then be shipped to a user for use in a bottle apparatus 10.

In accordance with one embodiment of the disclosure, use by a user of the pouch assembly 500 will now be described. The user can remove the nipple assembly 60 and the attachment collar 65 by unscrewing the attachment collar 65 is described above. The user might then remove a depleted pouch assembly 500. Then, the user slides a new pouch assembly 500 into the internal volume 28 of the bottle apparatus 10. The shape and geometry of the storage assembly 520 allows the unit to be easily slipped into the internal volume 28. Then, in an embodiment, the user may gently shake the bottle apparatus 10 with the pouch assembly 500 contained therein. At this point in the use process, the nipple assembly 60 and attachment collar 65 have not yet been reattached to the housing assembly 20.

Upon the user shaking the bottle apparatus 10 and pouch assembly 500, the weight of the powder can effectively "popped out" the powder chambers 525. That is, the powder chambers 525 can be transformed from a folded state 521' into an expanded state 521". As a user shakes the assembly further, the powder chambers 525 will be further expanded or popped out. Then, the user can add water into the connection tube 530. The water can flow through the flow passageway 550, which is a collection or aggregate of a variety of flow passages as described above. Thus, the water can flow into the powder chambers 525 through the distribution passages 540. As the water flows into the powder chambers 525 very effective mixing can take place. For example, the water can flow up through or bubble up through the powder in the powder chambers 525. The user can add a predetermined amount of water so as to yield a desired fill level and a desired proportional mix of water to formula powder.

In one embodiment, a user might add water to the storage assembly 520 by injecting water directly into the connection tube 530. For example, a suitable or specialized funnel could be provided to the user. In another embodiment, the bottle apparatus 10 with pouch assembly 500 could be inserted into a fill unit or attached to a fill unit. Such fill unit could include a nozzle that inserts into the connection tube 530. The nozzle of the fill unit could seal and/or frictionally fit into the connection tube 530. Accordingly, the fill unit could effectively and efficiently fill the pouch assembly 500 with the desired amount of water. A suitable controller, of the fill unit, could control the amount of water added to the pouch assembly 500. For example, a fill unit could communicate with the RFID tag 560 so as to input data regarding attributes of the pouch assembly 500. One of the attributes could be how much water to add to the pouch assembly 500.

Accordingly, a user can manually fill the pouch assembly 500 with a predetermined and desired amount of water. Alternatively, the user can place or attach a fill unit to the pouch assembly 500 such that the fill unit fills the pouch assembly 500 with a predetermined and desired amount of water. Relatedly, it is appreciated that various examples set forth herein utilize water and/or powder for illustrative purposes. However, other types of liquid or additive could be utilized as desired. For example, instead of water, a juice could be added into the storage assembly 520 for consumption by an infant.

Once the pouch assembly 500 is filled with the desired amount of water, the user can gently shake the bottle apparatus 10 with pouch assembly 500 contained therein so as to further mix the powder with water, for example. Once water has been added to the bag 521, the nipple assembly can be placed atop the neck portion 21 and the attachment collar 65 threaded onto the neck portion 21. Accordingly, the bottle apparatus 10 is ready for use by a user. In other words, the bottle apparatus 10 is prepared with content for consumption by a baby, for example. In use, the baby can apply a suction force onto the nipple assembly 60. Such suction force can result in formula or other consumable liquid flowing out of the bag 521 via the flow passageway 550. The consumption can be monitored through operation of the position sensor 140, for example, as described above. Consumption can also be monitored by the flow measure device 168, as described above.

As described above, the storage assembly 520 can be transformed from a folded state 521' to a expanded state 521". Relatedly, the bag 521 (of the storage assembly 520) can include a plurality of outer bag segments 522 and expansion flap segments 523. As described above, a bag 521 as illustrated in FIGS. 5-8 can include eight (8) powder chambers 525, for example. Each of the powder chambers can include, in a folded state 521', two opposing expansion flap segments 523 in conjunction with an outer bag segment 522. When the powder chambers 525 are "popped out", the expansion flap segments 523 can essentially unfold so as to expand the effective diameter of the bag 521. Thus, the bag 521 can be transformed from a first diameter in the folded state 521' to a second, larger diameter in the expanded state 521". The relative diameters can be expressed by the relationship 521R as shown in FIG. 8. Accordingly, it is appreciated that the arrangement of the storage assembly 520 provides substantial expansion capability of the bag 521 transforming between a folded state and an expanded state. Such transformation allows the bag to be easily placed into the bottle apparatus 10 and then expanded so as to effectively utilize the entirety of the internal volume 28 of the bottle apparatus 10.

Hereinafter, further details will be described with regard to the particular manner in which the bag 521 can be connected to the "rigid" structure or rigid portion 529 of the storage assembly 520. Such rigid structure 529 can include the rigid members of the storage assembly 520 including the upper support member 533, the flow tube 535, and the lower support member 536. The support members can each include a plurality of attachment slits 570, as shown in FIG. 5, for example. The attachment slits 570 can accept and retain top and bottom ends of respective expansion flap segments 523. For example, the ends of the expansion flap segments 523 can be adhesively secured into the slits 570 so as to secure the top and bottom ends of the expansion flap segments 523.

Accordingly, as the bag 521 is transformed from the folded state to an expanded state, the top and bottom ends of the expansion flap segments 523 can remain secured into the slits 570. Accordingly, the integrity of the bag 521 will be retained, i.e. such that the contents of the bag 521 will not leak into or pass out of the tag 521 and into the internal volume 28. While the top and bottom ends of the expansion flap segments 523 will remain secured in the slits 570, the middle extent of the bag 521 will indeed be allowed to expand as shown in FIGS. 7 and 8. It should be appreciated that in the extent or portion of the bag 521 approaching the top and bottom of the bag, the ability of the bag to expand will be constrained by the attachment of the ends (of the bag 521) in the slits 570.

However, it is appreciated that other arrangements can be utilized. For example, the top and bottom of inner extents of adjacent expansion flap segments 523 could be bonded together so as to be sealed. Where the expansion flap segments 523 are bonded together, such portions can be not secured in attachment slits 570. Such alternative arrangement can provide additional expansion of the bag 521 at the upper and lower extents of the bag 521.

With further reference to FIG. 5, in an embodiment, the bag 521 itself can be open at both the top and bottom. With such arrangement, the top and bottom of the bag can be closed by virtue of attachment to the rigid portion 529 of the storage assembly 520. That is, the rigid portion 529 can include the upper support member 533, the flow tube 535, and the lower support member 536. The bag can provide axial force to maintain shape of the bag and keep the bag aligned. If the bag 521 is constructed to be opened at the top and bottom, such construct can allow different ports to be provided at the top and bottom. For example, there can be a water port and a powder port.

In some embodiments, the bag 521 can be open at the top and closed at the bottom. In such arrangement, the bag can wrap around and encompasses the bottom of the lower support member 536. In such embodiment, the expansion flap segments 523 can be slipped into or tucked into the slits 570, in the members 533, 536, using a mechanical device such as a plurality of metal plates or sliders (see FIG. 20). The bag can be adhesively attached or bonded to the upper support member 533. At the bottom, the bag 521 can be slipped into the respective slits 570, but not secured therein, i.e. the bag can be "bunched up." Upon powder, for example, being added to the storage assembly 520, the bag 521 expands or further expands. In some embodiments, the flow aperture 532 of the connection tube can be used for adding powder, adding water, and for consumption of the mixed beverage. In some embodiments, one or more bottom apertures can be used for adding powder, adding water, and for dispensing the beverage, i.e. through the lower support member 536.

As shown in FIG. 5, the arrangement includes the distribution cavity 541. In some embodiments, the distribution cavity 541 can be omitted. That is, the lower support member 536 can be closed off at the bottom, but while maintaining passageway at the bottom between the flow passage 537 and the various distribution passages 540.

However, in machining or injection molding the rigid portion 529, it may be needed to construct the device with the distribution cavity 541.

In an embodiment, the diameter of the bag at the top and bottom (when in the expanded state) can be larger relative to the diameter in a middle portion of the bag. Such arrangement can render a rounded or ball shaped bag 521 in the expanded state. Such arrangement can be helpful by providing a low-profile at the parts of the bag that are connected to the rigid portion 529, while providing increased volume along the middle of the bag.

Figure 20:
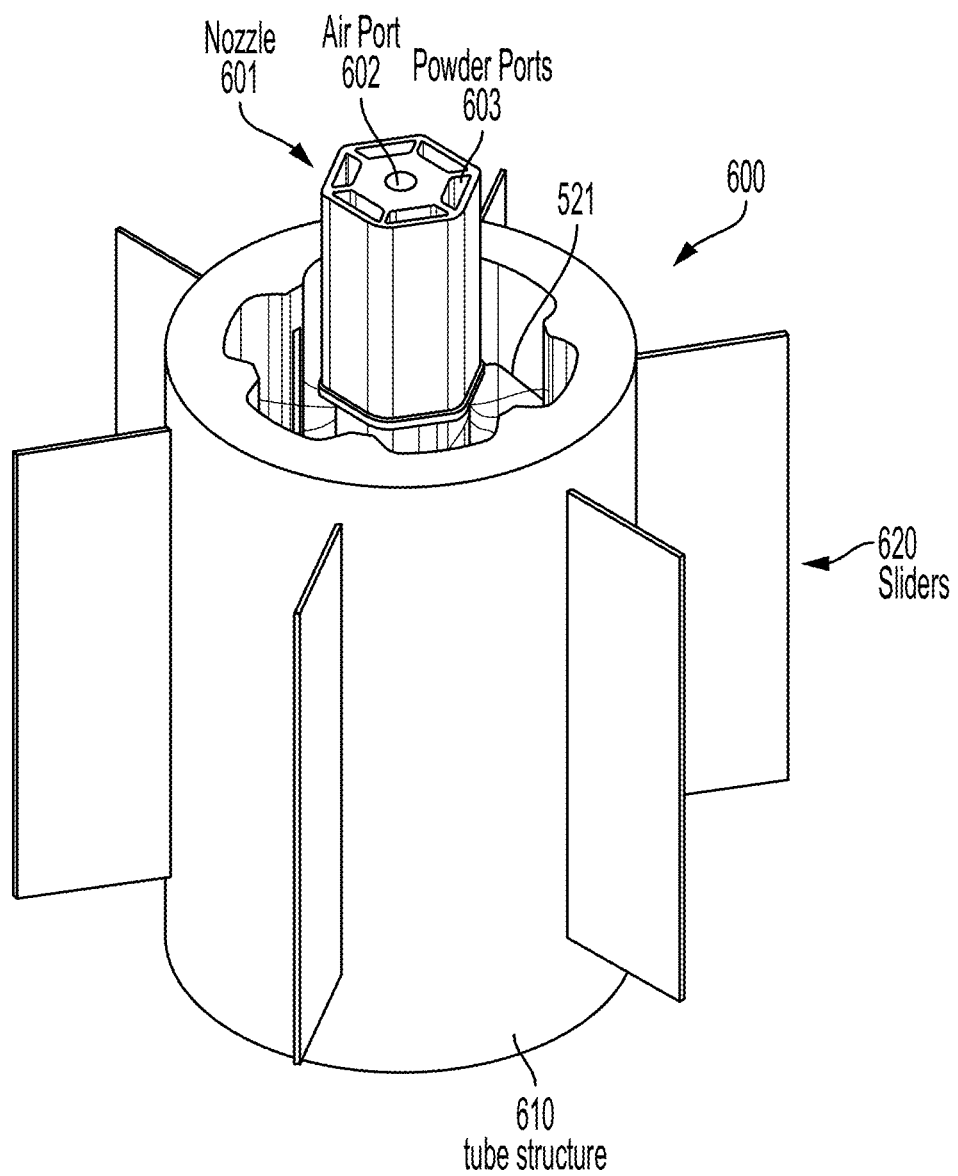
FIG. 20 is a perspective view of a manufacturing tool 600 with bag 521 therein, according to principles of the disclosure.

FIG. 20 is a perspective view of a manufacturing tool 600 with bag 521 therein, according to principles of the disclosure. FIG. 21 is a diagram showing a flow process for use of the manufacturing tool 600 in preparation of a storage assembly 520, according to principles of the disclosure.

In an embodiment, in manufacturing of the storage assembly 520, a manufacturing tool 600 can be provided with a tube structure 610 to retain the bag 521 in manufacturing. An inner diameter of the tube structure 610 can correspond to the diameter of the bag 521 when in the expanded state. The tube structure 610 can include concave vertical recesses, in the inner face, as shown in FIG. 20 that correspond with each of the powder chambers 525 of the bag 521.

As shown in FIG. 20 and FIG. 21 in particular, in manufacture, a new bag 521 can be inserted into the tube structure 610. A top neck of the bag 521 can be attached to the top of the rigid portion 529 prior to inserting such bag 521 into the tool 600. The new bag 521 can be inflated with a flow (or blast) of air through air port 602 in nozzle 601, or otherwise formed out, so as to be filled out within the tube structure 610 (See step 1 as shown in FIG. 21). Powder can then be added into the bag through powder ports 603 until a desired weight or amount of powder is achieved, i.e. a weight measurement mechanism can be utilized (See step 2 as shown in FIG. 21). The manufacturing tool 600 can include a radial "slider" 620 for each powder chamber 525 of the bag. The manufacturing tool with bag/powder can then be subject to vibration so as to fluidize the powder, i.e. such that the powder can easily flow. Hand-in-hand, the sliders can be mechanized so as to be radially drawn into or pushed into the rigid portion 529—until each of the sliders are in contact with or proximate to the rigid portion 529. Such process renders the powder filled powder chambers 525. In other words, each of the sliders are brought in radially toward the center of the tube structure in which the rigid portion 529 is positioned (See step 3 as shown in FIG. 21). As result, the bag 521 is tucked or slipped into the various slits 570. To provide the bag with eight powder chambers, eight radial sliders can be utilized. Then, a vacuum can be applied to suck the bag 521 in further and further pack the powder contained in the bag (See step 3 as shown in FIG. 21). Then the bag 521 can then be closed. For example, the bag can be closed with a cap (See step 4 as shown in FIG. 21). The sliders can then be withdrawn from the bag (See step 4 as shown in FIG. 21). A vacuum could be applied to the connection tube 530 in an embodiment.

Accordingly, a manufacturing tool 600 can be provided that includes a dynamic forming tool that can create a collapsed geometry using the radial sliders 620. A vacuum can be applied so as to enhance the forming and packing process of the powder within the bag 521. Vibration can be applied to the manufacturing tool with bag/powder therein so as to allow the powder to flow better in conjunction with the radial sliders converging onto the rigid portion 529, for example.

In use after manufacture, the pouch assembly 500 can be filled with water by injecting water through the flow aperture 532. The water can be ejected up through the distribution passages 540, around the bottom of the pouch assembly 500. Such arrangement can provide a waterjet type arrangement that provides for effective mixing of water and powder.

FIG. 9 is a schematic cross-section perspective view of a bottle apparatus 900, according to principles of the disclosure. The arrangement of FIG. 9 differs from the arrangement of FIG. 1 in that a housing assembly 901 can be separated into a bottle assembly 910 and a base assembly 950. In particular, the bottle assembly 910 can be threadably attached to the base assembly 950. The bottle assembly 910, in this embodiment, can include a nipple assembly 911 and a bottle portion 913. The nipple assembly 911 can be attached onto the bottle portion 913 via a collar assembly 912. Such attachment can be of similar or same construct as the bottle apparatus 10 of FIG. 1.

The bottle apparatus 900 of FIG. 9 can include an engine 970 as schematically shown. The engine 970 can include a variety of operating components. The engine 970 can include one or more of the components as described herein and/or as shown in FIGS. 1-3, for example. For example, the engine 970, as schematically shown in FIG. 9, can include a flow measure device 168. As described above, the flow measure device 168 can measure consumable liquid that flows out of the bottle apparatus 900. The engine 970 can also include a heater or water heater. The bottle assembly 910, the base assembly 950 and/or a tracking module or tracking pod 940 can include electrical communication devices that allow such components to communicate with each other.

For example, the bottle assembly 910 can include an RFID tag that can communicate with an RFID reader of the engine 970. For example, the tracking pod 940 can include an RFID tag that can communicate with an RFID reader of the engine 970.

The bottle apparatus 900 can include a tracking module 940. The tracking module 940 can include a variety of electrical components that are compatible or complementary to the electrical components provided in the engine 970. The tracking module 940 can include liquid level sensing, i.e. so as to sense a level or amount of liquid in the bottle assembly 910. For example, the tracking module 940 can include an optical level sensor. Such optical level sensor can output light and measure the amount of time that it takes for the light to be reflected back from an upper surface of liquid contained in the bottle assembly 910. In other words, the optical level sensor can utilize an emitted light and subsequent received light over a "time of flight" so as to determine a distance or level of liquid in the bottle assembly 910. Once the level of liquid is determined, the volume of liquid can be determined. That is, liquid level can be converted into liquid volume based on the known geometry of the bottle assembly 910. The tracking vessel can also include a temperature sensor so as to sense temperature of liquid in the internal volume 915. The tracking vessel can also include a heater so as to heat liquid in the internal volume 915. The tracking module or pod 940 can also include an orientation sensor so as to be able to determine orientation of the bottle apparatus 900. For example, such orientation sensor can be in the form of one or more accelerometers that can sense orientation.

As described above, any of the components described with reference to FIGS. 1 and/or 3 can be provided in the engine 970 and/or the tracking module or tracking pod 940, as may be desired. In particular, the controller can be disposed in the tracking module 940 and/or the engine 970.

The controller can communicate with a suitable user device, such as a cell phone 1000 of a user, as shown in FIG. 3. Also, the controller 110 of FIG. 3 can be provided with a communication portion that communicates with the user device 1000. The controller 110 can use instructions that are in the database 112 and/or in the user device 1000 so as to perform various operations of the bottle apparatus 10. For example, the user device 1000 can be used by a user to initiate operations of the bottle apparatus 10 or to set settings of the bottle apparatus 10. A suitable "application" can be loaded onto the user device 1000 so as to interface with the controller 110. The apparatus of FIG. 9 can also be provided with such features.

With further reference to FIGS. 1-3 and FIG. 9, it should be appreciated that some control components may require to be in direct attachment or communication with the internal volume 915. Such components can be positioned in the tracking module 940. For example, a liquid level sensor using an optical signal that is sent and received (so as to determine liquid level in the bottle assembly 910) may be required to be in the tracking module 940. In some embodiments, the tracking module 940 can be removed from the bottle assembly 910. With such an arrangement, an optical light sensor (to determine liquid level) can be utilized since the light can operate through a lower transparent portion of the bottle portion 913. In other embodiments of the disclosure, the tracking module 940 can be permanently attached onto the bottle portion 913. With such an arrangement, other operating components can be utilized. For example, if the tracking module 940 is permanently affixed to the bottle portion 913, then an ultrasonic sensor can be utilized so as to detect liquid level in the internal volume 915. That is, a sensor head of an ultrasonic sensor can be exposed to the internal volume 915. As result, the ultrasonic sensor can send and receive ultrasonic sound waves, for example, so as to determine liquid level in the internal volume 915. It is appreciated that separation of the bottle portion 913 from all electrical components of the bottle apparatus 900 can be beneficial so as to clean the bottle portion 913. For this reason, it may be desirable to construct the tracking module 940 and the engine 970 so as to be separable from the bottle portion 913.

As shown in FIG. 9, the bottle assembly 910 might not include a pouch or other container therein. Accordingly, consumable liquid can be contained within an internal volume 915 formed by walls 916 of the bottle portion 913. Alternatively, consumable liquid can be contained within a pouch, bag, sachet, or other container that is contained within the internal volume 915. Such an arrangement can be similar to the pouch 321 contained within the internal volume 28, as shown in FIG. 1.

As shown in FIG. 9, the bottle apparatus can include a bottle assembly 910 that is separable from a base assembly 950. As also discussed above, separation of the bottle assembly 910 from electrical components can be beneficial for cleaning of the bottle assembly 910. For example, it may be desired to clean the bottle assembly 910 in a dishwasher. Even though such two components, i.e. the bottle assembly 910 and the base assembly 950, are separable, structure can be provided so as to still afford capabilities as described with reference to FIG. 1 and FIG. 3, for example. In particular, structure of the bottle apparatus 910 can provide for operation of a flow meter assembly 50, with such flow meter assembly 50 located in the engine 970.

In further explanation of the feature of a flow meter assembly 50 in the engine 970, structure can be provided so as to afford flow capability between the bottle assembly 910 in the base assembly 950. That is, the bottle assembly 910 can include an engagement collar 920. The engagement collar 920 can include threads 922 on an inner diameter (ID) of the engagement collar 920. The bottle assembly 910 can also include a one-way valve assembly 923 or valve assembly 923. The valve assembly 923 can be in the form of or include an umbrella valve, for example. The umbrella valve can be in fluid communication with a flow aperture or flow cavity 924.

Relatedly, the base assembly 950 can include an engagement stem 960. The engagement stem 960 can include threads 961 on an outer diameter (OD) of the engagement stem 960. The threads 961 can mate with or engage with the threads 922. Accordingly, the engagement stem 960 can be secured within the engagement collar 920 so as to afford fluid communication between the engine 970 and the bottle portion 913. It should be appreciated that suitable gaskets or O-rings can be utilized so as to provide a sealed attachment between the base assembly 950 and the bottle assembly 910. FIG. 9 illustrates gasket or O-ring 964.

As shown in FIG. 9, the base assembly 950 can also include a valve assembly 962. The valve assembly 962 can be in the form of or include an umbrella valve 962. Accordingly, as consumable liquid is consumed from the internal volume 915, air can flow from the engine 970, through the schematically represented flow aperture 963, through the valve 962, through the flow aperture 924, and through the valve assembly 923. Accordingly, the arrangement of FIG. 9 can include the same flow meter assembly functionality, including flow meter assembly 50, as is provided in the arrangement of FIG. 1 and FIG. 3, for example. Other components and functionality can be provided in the arrangement of FIG. 9 since fluid flow is afforded between such two components.

As shown in FIG. 9, the base assembly 950 can include a receiving platform 966. The receiving platform 966 can be an annular platform that is curved or concave so as to engage with the tracking module 940. That is, shape of the receiving platform 966 can correspond with shape of the lower surface of the tracking module 940. As result, the tracking module can effectively and securely nest into the base assembly 950. Also, the tracking module 940 can be received into a tracking module cavity 914 of the bottle assembly 910. Shape of the tracking module cavity 914 can correspond to shape of an upper surface of the tracking module 940.

The base assembly 950 can include cavity 990 as schematically shown in FIG. 9. The cavity 990 can be formed by both the base assembly 950 and an end assembly 980. The end assembly 980 can be threaded onto or otherwise secured onto the engine 970. The cavity can be utilized to contain various electronic components as otherwise described herein. Also, the cavity 990 can provide a physical cavity in which to store items. The end assembly 980 can be unscrewed or otherwise disengaged from the engine 970 so as to access the cavity 990. For example, the cavity 990 could be utilized to store a pacifier or other item.

In an embodiment, the engine 970, as schematically represented in FIG. 9, can also include a container assembly or pod that contains an additive to be dispensed into the internal volume 915 through the valves 962, 923. That is, the pod can be disposed in or a part of the engine 970. For example, the engine 970 of FIG. 9 can include the dispense assembly including the body assembly 711 as shown in FIG. 15B. The pod 770 of FIG. 15B can be inserted into the engine 970 of FIG. 9. The dispense nozzle 721 of FIG. 15B can include or be associated with the valves 962, 923 of FIG. 9. The flow aperture 963 of FIG. 9 can be constituted by or connected to the dispense nozzle 721 of FIG. 15B. In at least one embodiment, a plurality of the dispense assemblies of FIG. 15B can be included in the engine 970 of FIG. 9. Each of such plurality of dispense assemblies can be paired with a respective valve assembly 923, 962 and flow aperture 924.

In a further embodiment, the engine 970 of FIG. 9 can include a tubular pod that includes a dispense aperture (on one end) and a plunger slidably positioned within the tubular pod. As the plunger slides, powder or other additive contained in the tubular pod can be ejected out through the dispense aperture of the pod. The dispense aperture can be or include a valve. The engine 970 can include a mechanized plunger engagement device (or use pneumatic or air pressure) that pushes the plunger within the tubular pod. Accordingly, additive such as powder or concentrate can be ejected from the engine 970 into the internal volume 915 of the bottle apparatus 900.

Relatedly, an apparatus of the invention can provide for additive, such as formula or concentrate, to be transferred from a pod into water or other liquid, such as with the apparatus of FIG. 9. On the other hand, an apparatus of the invention can provide for water or other liquid to be added into the pod, such as in the apparatus of FIG. 1. That is, in the arrangement of FIG. 1, the pod might be described as the drinking vessel—instead of dispensing a pod into the drinking vessel as shown in FIG. 9. That is, in the arrangement of FIG. 1, powder can be in the pouch assembly 300, and then water added into the bottle apparatus 10. Also, in the arrangement of FIG. 15B integrated with the apparatus of FIG. 9, water can be injected into the pod—and then the contents of the pod along with the water can be injected into the drinking vessel, which a user would then drink from.

The arrangement of FIG. 15B, including the dispense assembly and pod of FIG. 15B, can be used in a variety of environments and in a variety of apparatuses. The arrangement of FIG. 15B might be used in a countertop unit. The arrangement of FIG. 15B might be used in a portable unit such as is shown in FIG. 9.

Figure 10:
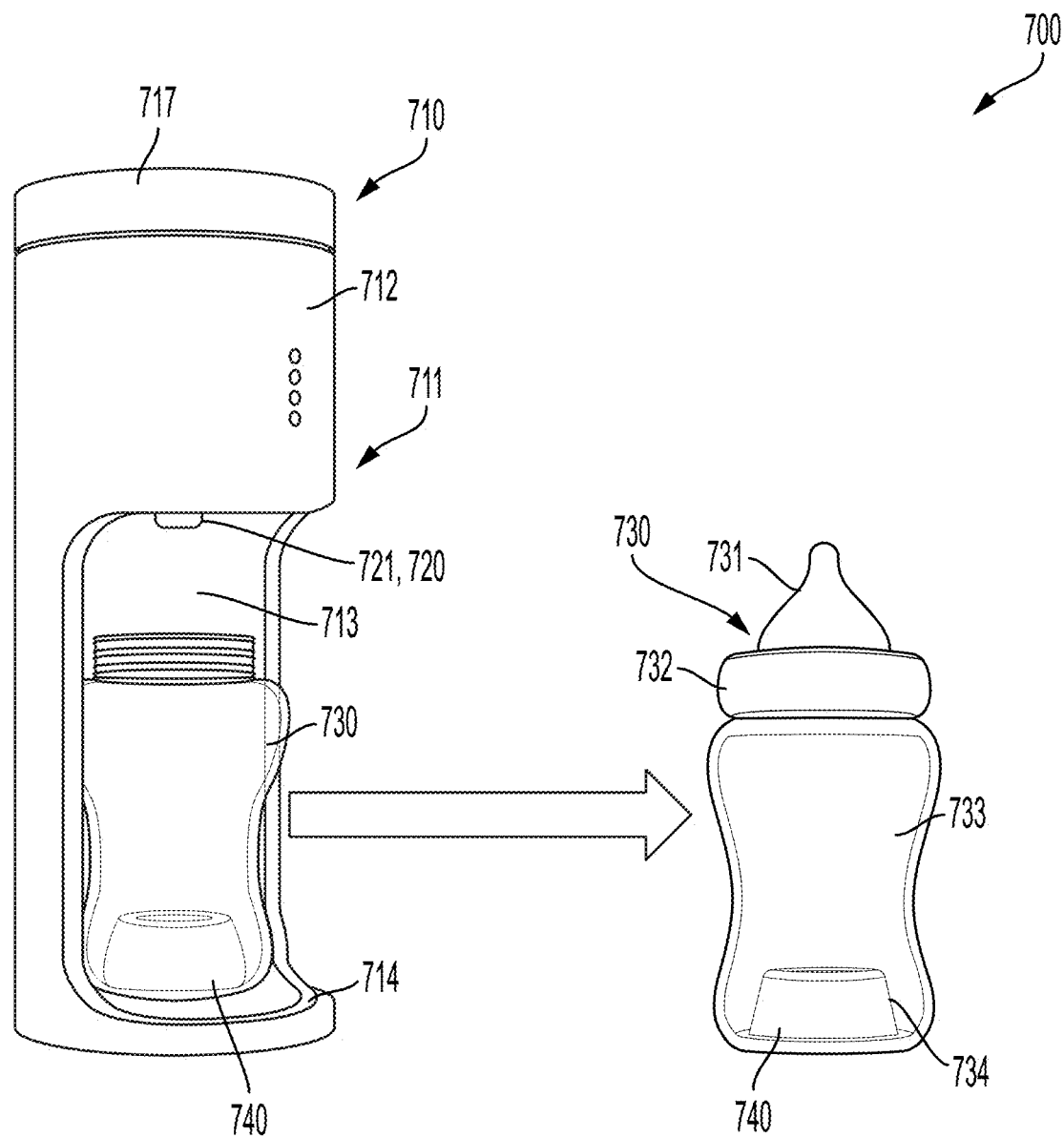
FIG. 10 is a front perspective view of a beverage system 700, according to principles of the disclosure.
Figure 11:
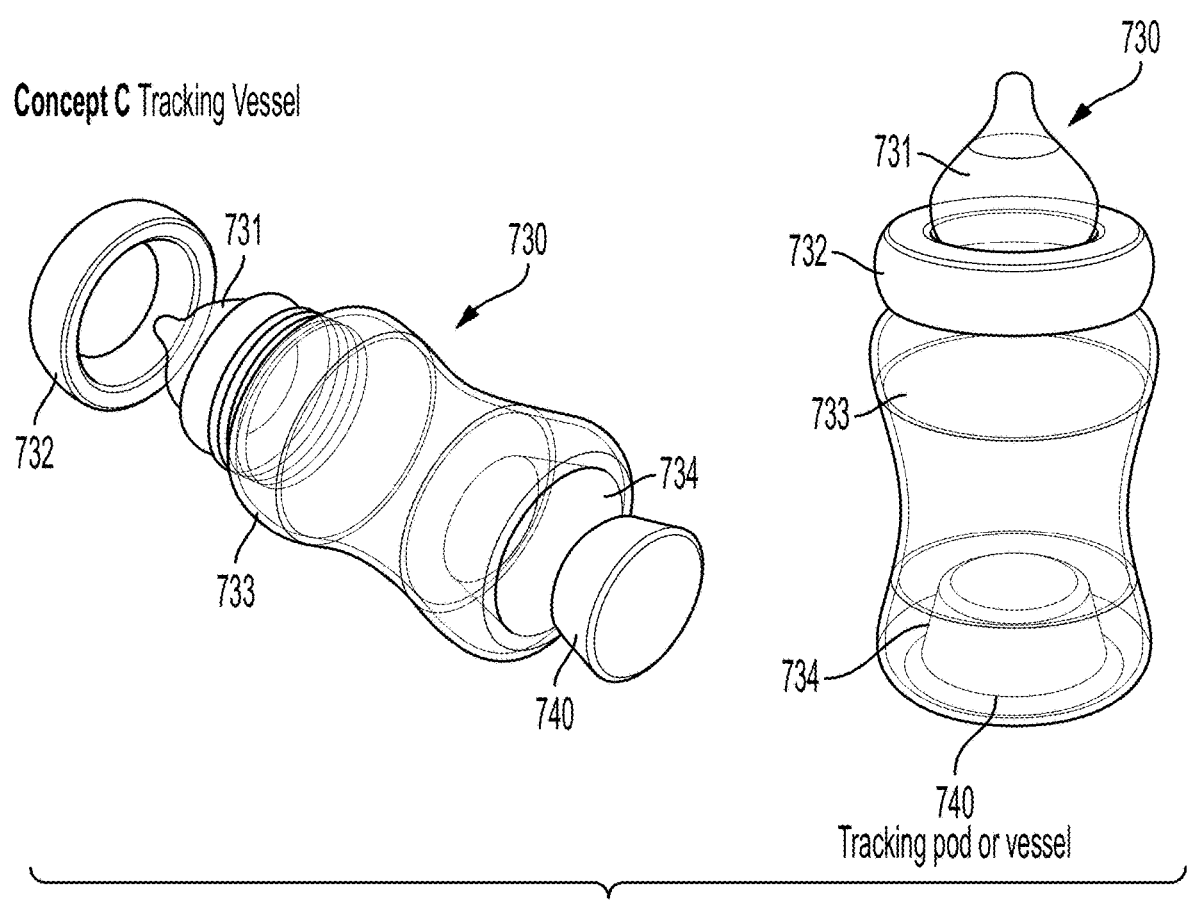
FIG. 11 are further perspective views of the bottle apparatus 730, according to principles of the disclosure.

FIG. 10 is a front perspective view of a beverage system 700, according to principles of the disclosure. FIG. 11 are further perspective views of the bottle apparatus 730. In particular, FIG. 11 shows an exploded view of a first bottle apparatus 730 and a front perspective view of an assembled bottle apparatus 730, according to principles of the disclosure. The beverage system 700 can include a dispense apparatus 710, as shown in FIG. 10, for example. The dispense apparatus 710 can include a body assembly 711. The body assembly 711 can include a user interface 712. The user interface 712 can show various aspects of operation of the dispense apparatus 710. Operation of the dispense apparatus 710 can be performed utilizing a button arrangement on the dispense apparatus 710. Operation of the dispense apparatus 710 can be performed by the dispense apparatus 710 in communication with a user device such as a cell phone—and an application on the cell phone configured to control the dispense apparatus 710. The dispense apparatus 710 can include a receiving cavity for a bottle or battle apparatus 730. A base portion 714 can be provided so as to support the battle 730. The dispense apparatus 710 can further include a cap portion 717. As described below, the cap portion 717 can cover and protect one or more pods 770 that are contained within the dispense apparatus 710. Illustratively, such a pod is shown in FIG. 15.

The dispense apparatus 710 can include a dispense assembly 720. The dispense assembly 720 can be positioned within and/or supported by the body assembly 711. The dispense assembly 720 can include a dispense nozzle 721 as illustrated in FIG. 10. Further details of the dispense assembly 720 and the pod 770 are described below with reference to FIG. 15. The dispense apparatus 710 can be powered by AC power, such as via a cord plugged into an outlet. The dispense apparatus 710 can be battery-powered so as to be portable. Any of the devices described herein can be provided with a suitable power source such as DC power, battery power, AC power, and other types or sources of power. For example, the bottle apparatus 10 of FIG. 1 can be battery-powered, and such battery be rechargeable utilizing AC current. Known battery and recharging arrangements can be utilized so as to power any of the devices described herein.

FIG. 10 shows a bottle apparatus 730 positioned within the receiving cavity 713 of the dispense apparatus 710. The bottle in the bottle apparatus 730 is without a top, i.e. without a nipple assembly. Accordingly, the bottle apparatus 730 can be positioned within the dispense apparatus 710 so as to dispense formula or other liquid beverage into the bottle apparatus 730. Further details are described below with reference to FIG. 15.

FIG. 10 also shows a bottle apparatus 730 that is fully assembled. That is, the bottle apparatus 730 includes a nipple assembly 731, and a collar assembly 732 which are mounted upon a bottle portion 733. Each of the bottle apparatuses 730, as shown in FIG. 10, can include or be associated with a tracking pod or tracking module 740. The tracking module can include any of the functionality described above with reference to the tracking module 940 of FIG. 9 or FIG. 3, for example. Accordingly, the tracking pod 740 can include a controller, a level sensing mechanism, a temperature sensing mechanism, an accelerometer so as to detect orientation of the bottle apparatus 730, a water heater so as to heat liquid within the bottle apparatus 730, an RFID tag that can be identified by the dispense apparatus 710, and other components, elements, or functionality as described herein, for example. For example, the dispense apparatus 710 can include an RFID reader that communicates with an RFID tag on the tracking pod 740. Such RFID tag on the tracking pod 740 might include a size of the bottle apparatus 730. Other data could be stored on an RFID tag of the tracking pod 740. For example, preferences of a particular user could be stored on an RFID tag of the tracking pod 740. Dispensing as performed by the dispense apparatus 710 could then be adjusted based on the preferences of the user. The dispense apparatus 710 can include a suitable controller so as to control operations of the dispense apparatus 710.

As shown in FIG. 10, the bottle apparatus 730 can include a tracking pod cavity 734. The tracking pod cavity can accommodate and house the tracking pod 740. The tracking pod 740 can be permanently affixed into the cavity 734. The tracking pod 740 can be removable from the cavity 734. It can be desired to remove the tracking pod 740 from the cavity 734 so as to clean the bottle apparatus 730.

Figure 12:
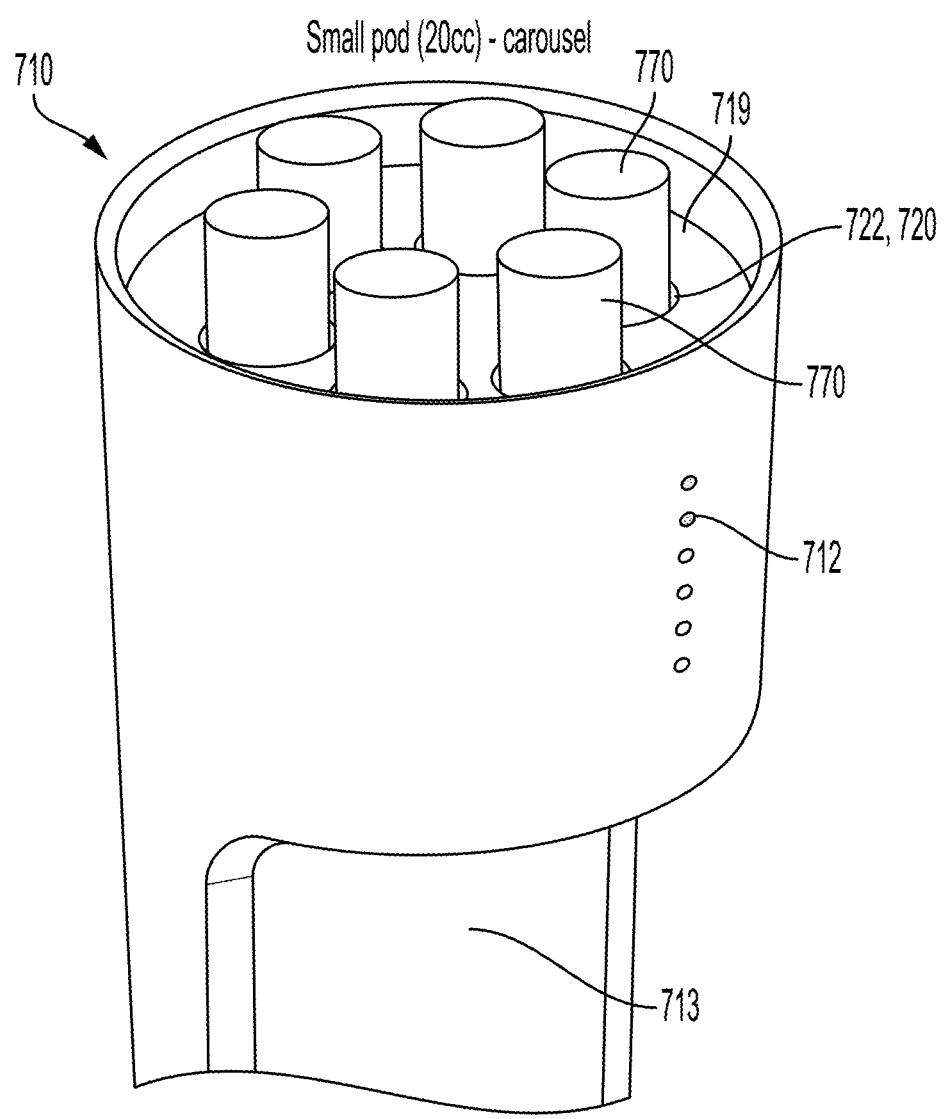
FIG. 12 is a top perspective view of a dispense apparatus 710 the same as or similar to the dispense apparatus 710 of FIG. 10, according to principles of the disclosure.

FIG. 12 is a top perspective view of a dispense apparatus 710 the same as or similar to the dispense apparatus 710 of FIG. 10, according to principles of the disclosure. The dispense apparatus 710 can accommodate a plurality of pods 770. Each of the pods 770 can be received into a respective receiving chamber 722. The receiving chambers 722 can be part of a dispense assembly 720 that is located inside of the dispense apparatus 710B. The receiving chambers 722 can be mounted or part of a carousel 719. The carousel 719 can be rotated so as to position a desired pod 770 above dispense nozzle 721. The carousel 719 can be manually rotated by a user. The carousel 719 can be mechanized so as to be rotatable under control and operation of a suitable controller.

For example, the carousel 719 can be rotatable by a suitable motor and gear arrangement. Further details are described below with reference to FIG. 15.

Figure 13:
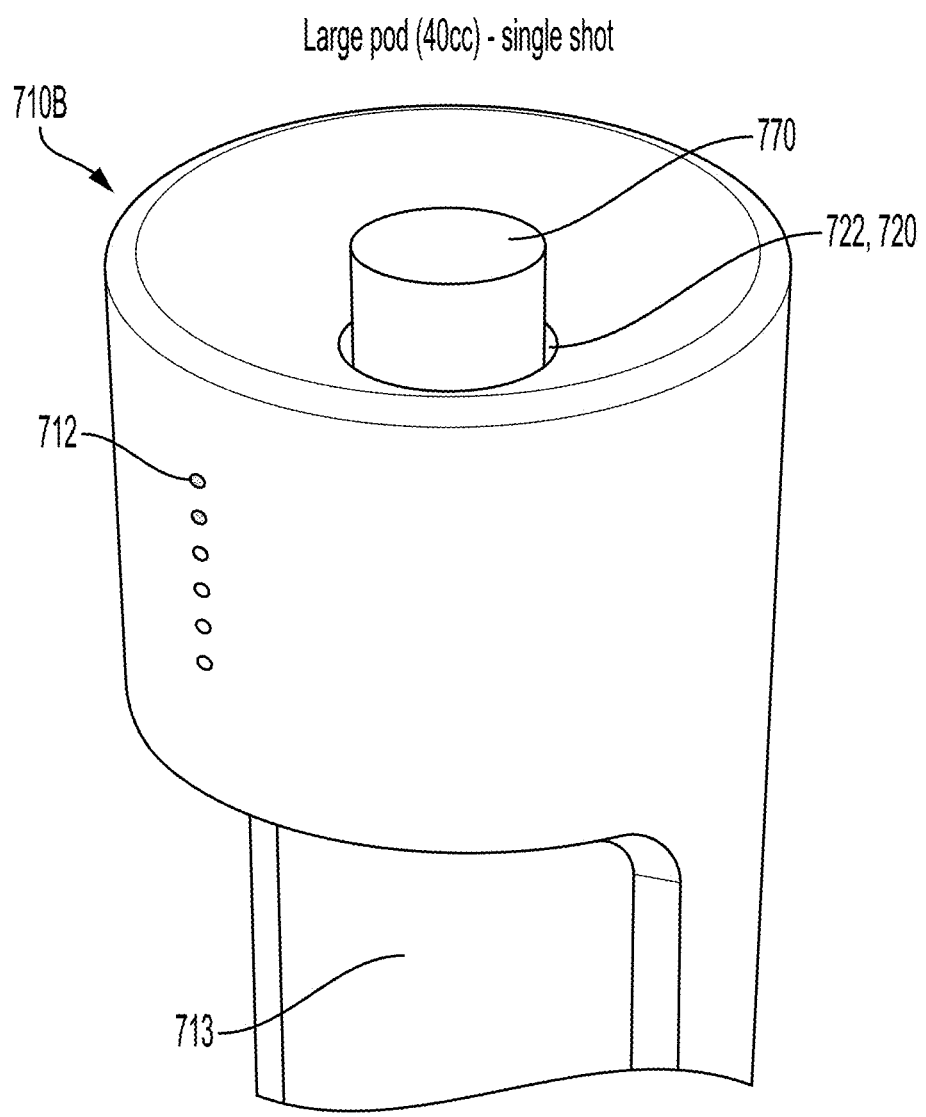
FIG. 13 is a top perspective view of a dispense apparatus 710B the can be the same as or similar to the dispense apparatus 710 of FIG. 10, according to principles of the disclosure.

FIG. 13 is a top perspective view of a dispense apparatus 710B and can be the same as or similar to the dispense apparatus 710 of FIG. 10, according to principles of the disclosure. The dispense apparatus 710B can accommodate a single pod 770. The single pod 770 can be received into a receiving chamber 722. The receiving chamber 722 can be part of a dispense assembly 720 that is located inside of the dispense apparatus 710B.

Figure 14:
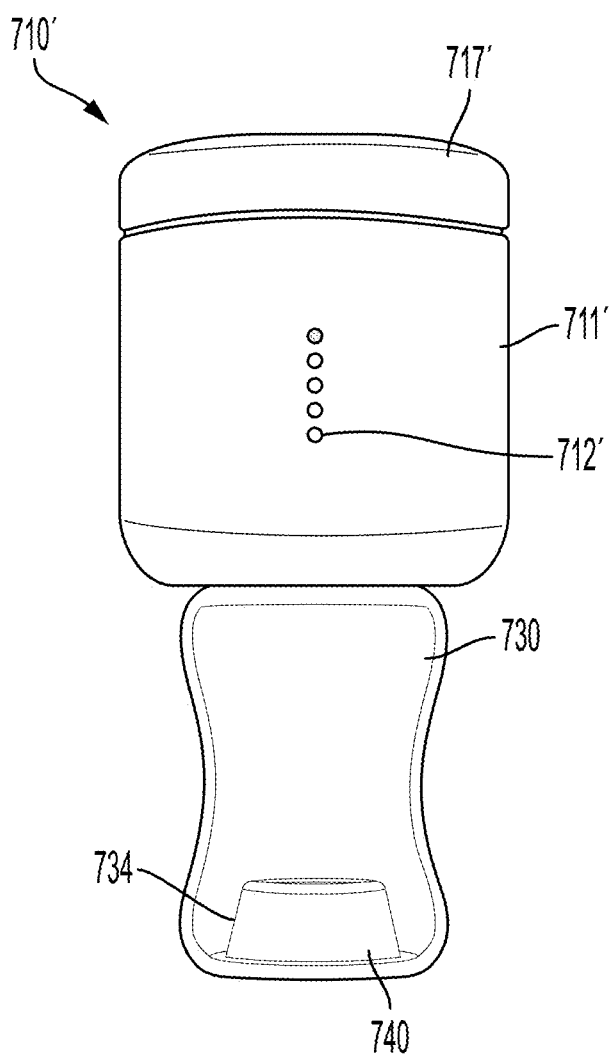
FIG. 14 is a front perspective view of a further dispense apparatus 710', according to principles of the disclosure.

FIG. 14 is a front perspective view of a further dispense apparatus 710', according to principles of the disclosure. The dispense apparatus 710' can possess the same or similar functionality as the dispense apparatus 710. However, the dispense apparatus 710' can attach or screw-on to a bottle or bottle apparatus 730. The dispense apparatus 710' can include a lid or cap portion 717'. The dispense apparatus 710' can include a body assembly 711' and a user interface 712'. A pod 770 and dispense assembly 720 can be located within the dispense apparatus 710'. Further details are described below.

Figure 15A:
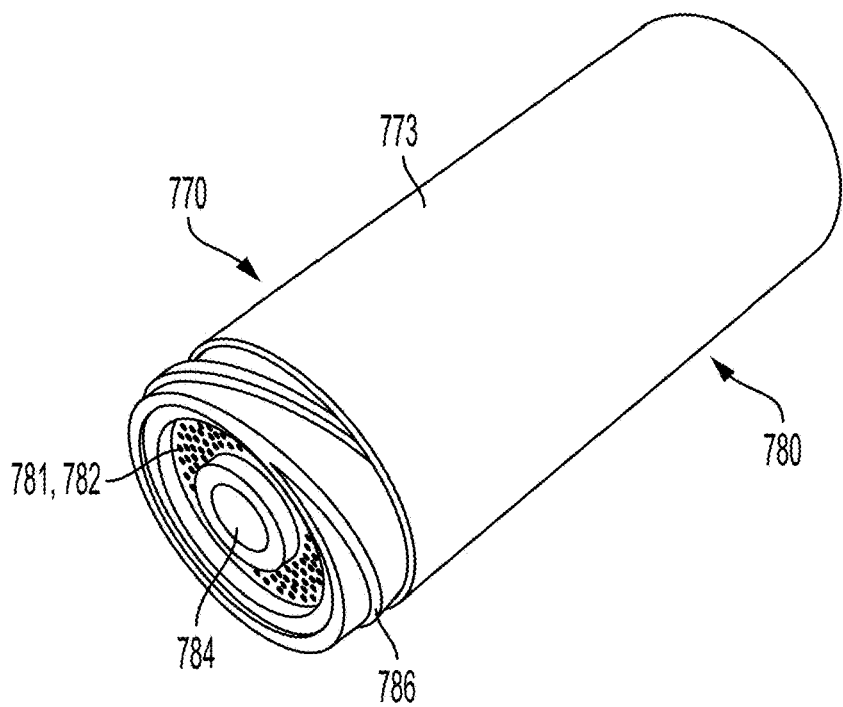
FIG. 15A is a side perspective view of a pod 770, according to principles of the disclosure.
Figure 15B:
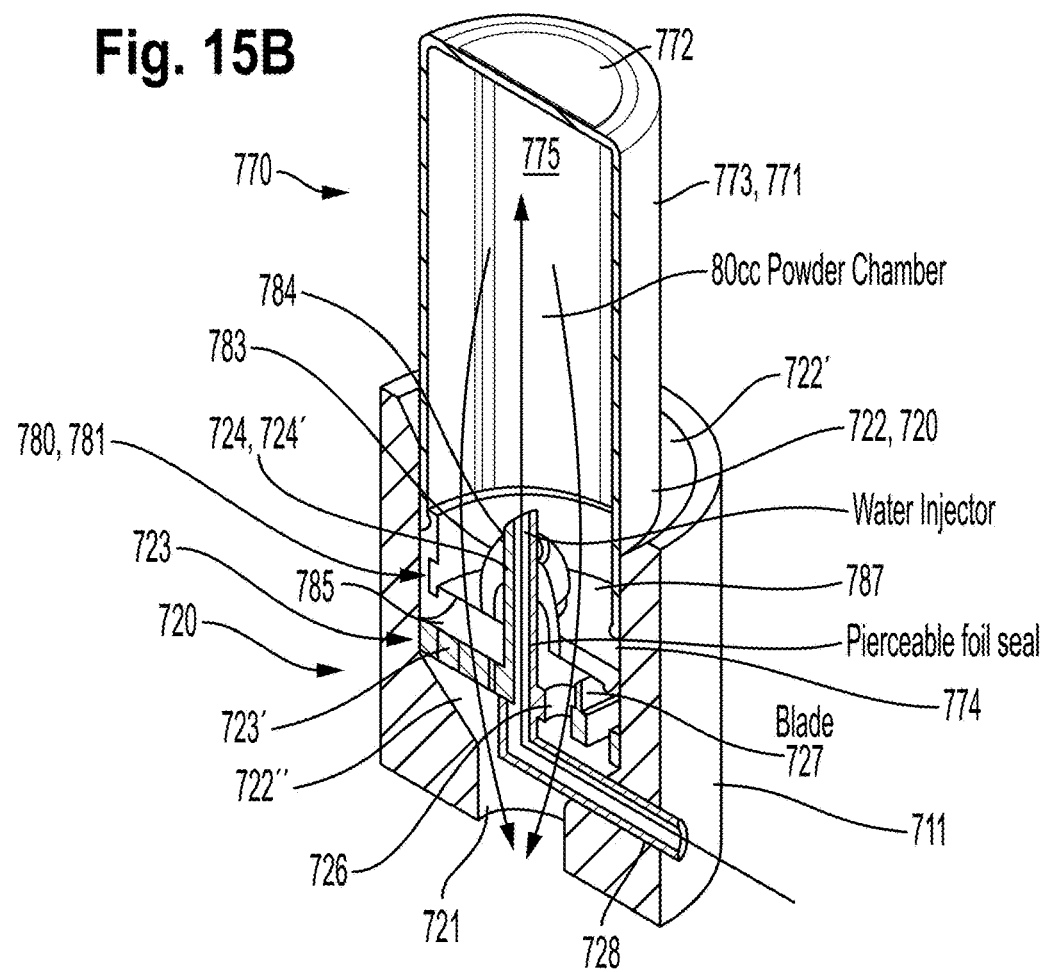
FIG. 15B is a cross-sectional view of a pod 770 received into a dispensing assembly 720, according to principles of the disclosure.

FIG. 15A is a perspective view of a pod 770, according to principles of the disclosure. FIG. 15B is a cross-sectional view of a pod 770 received into a dispensing assembly 720. For example, the dispensing assembly 720 could be disposed in any of the dispense apparatuses as shown in FIG. 10 and FIGS. 12-14.

The dispense assembly 720 can include a dispense nozzle 721. The dispense assembly 720 can also include a receiving chamber 722. The receiving chamber 722 can include an upper chamfer surface 722'. The upper chamfer surface 722' can assist a user in guiding the pod 770 into the receiving chamber 722.

The dispensing assembly 720 can also include a pod engagement assembly 723. The pod engagement assembly 723 can include a supporting platform 723' that engages with the receiving chamber 722. The supporting platform 723' can be integrated with and/or attached to a lower portion of the receiving chamber 722. The receiving chamber 722 can also include a lower chamfer surface 722". The lower chamfer surface 722" can both support the pod engagement assembly 723 and provide an angled surface conducive to flow of liquid out of the pod engagement assembly 723.

The dispense assembly 720 can include a flow cannula or flow tube 724. The flow tube 724 can function as a water injector. The flow tube 724 can include a passageway 724' that extends through a length of the flow tube 724. The flow tube 724 can be connected to and in fluid communication with a water inflow conduit 728. The water inflow conduit 728 can be connected to a source of water, for example. The water inflow conduit can be connected to a pumped water source and water flow into the water inflow conduit 728 can be selectively controlled by a pump, valve, and controller.

The dispense assembly 720 can also include one or more outflow apertures 726. The outflow apertures 726 can include perforations or slits through the supporting platform 723'. The dispense assembly 720 can also include one or more blades 727. As described below, the one or more blades 727 can perforate a frangible seal 785 of the pod 770.

The pod 770 can be slid into the dispense assembly 720. Powder formula or other additive can be stored within the pod 770. By virtue of operation of the dispense assembly 720, such powder formula or other additive can be mixed with water or other liquid that is flowed through the pod 770.

The pod 770 can include a housing 771. The housing 771 can define a chamber 775. The powder formula or other additive can be stored within the chamber 775. The housing 771 can include a closed end cap. The housing 771 can also include an outer cylindrical or cylinder housing member 773. The outer cylinder housing member 773 can include connection threads as shown in FIG. 15B.

The pod 770 can also include a flow end cap assembly 780. The flow end cap assembly 780 can include connection threads 786. The connection threads 786 can engage with connection threads 774 so as to attach the flow end cap assembly 780 with the outer cylinder housing member 773. The flow end cap assembly 780 can include a flow control platform 781. The flow control platform 781 can be positioned in an end of the pod 770 opposite to the closed end cap 772. The flow control platform 781 can include an inflow stem 783. The inflow stem 783 can include an inflow aperture 784. The inflow aperture 784 can receive and seal with the flow tube 724. Accordingly, water or other liquid can be flowed into the pod 770.

The pod 770 can also include a perforated region 782. The perforated region 782 can be an annular region of the flow control platform 781 that is positioned about the inflow stem 783. The perforated region 782 can include one or more perforations or outflow apertures 787. As shown in FIGS. 15A and 15B, a substantial number of small perforations 787 can be provided in the flow control platform 781.

The pod 770 can also include the frangible seal 785. The frangible seal 785 can be in the form of or include a pierceable foil seal. The pod 770 can be pushed down and into the receiving chamber 722. At a point in such movement downward, the flow tube or flow cannula 724 will puncture the seal or foil 785. Then, the flow tube 724 will pass into the inflow aperture 784. A suitable fit and/or gaskets can be provided so as to preclude leakage between the inflow aperture 784 and the flow tube 724. At a further point in the insertion of the pod 770 into the receiving chamber 722, the one or more blades 727 will also perforate the seal or foil 785. As a result, the various outflow apertures 787 will be exposed or opened up. After the pod 770 is fully inserted into the receiving chamber 722, water or other liquid can be pumped into the pod 770 via the flow tube 724 and the water inflow conduit 728. As shown by the arrows in FIG. 15B, the water can flow into the pod 770 and mix with the contents of the pod. For example, the water can mix with the formula powder in the pod 770. The flow can further continue, after mixing, out the outflow apertures or perforations 787. The mixed fluid or liquid can then pass through the outflow apertures 727 and out through the dispense nozzle 721. Accordingly, formula or other mixed content can be dispensed into a battle apparatus 730 such as is shown in FIG. 10, for example.

Figure 17:
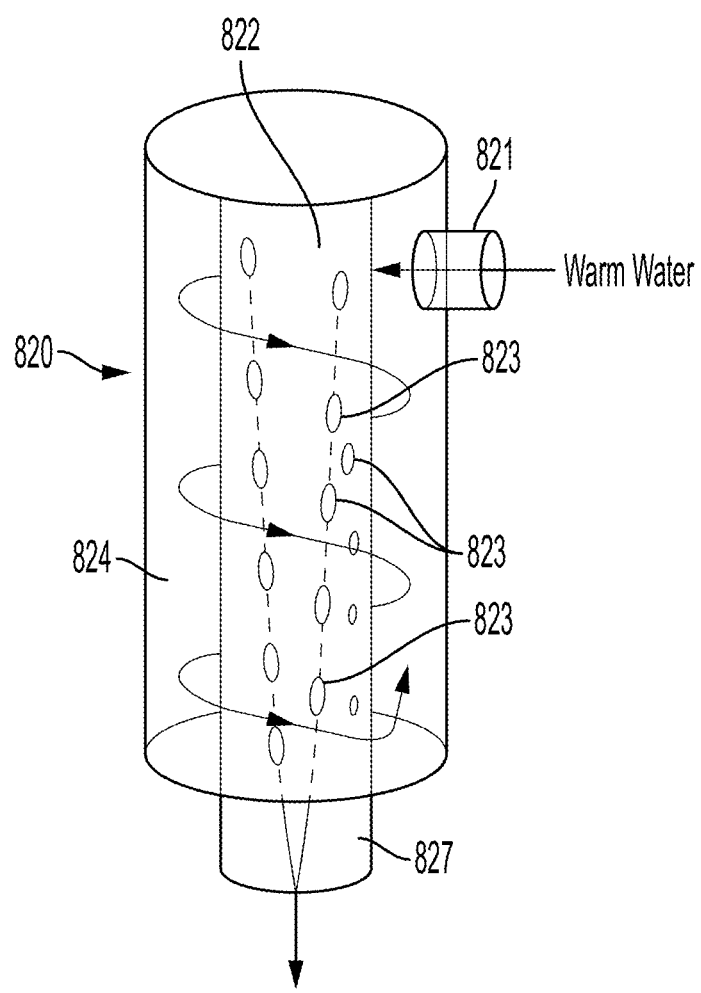
FIG. 17 is a schematic perspective view of a further pod 820, according to principles of the disclosure.
Figure 18:
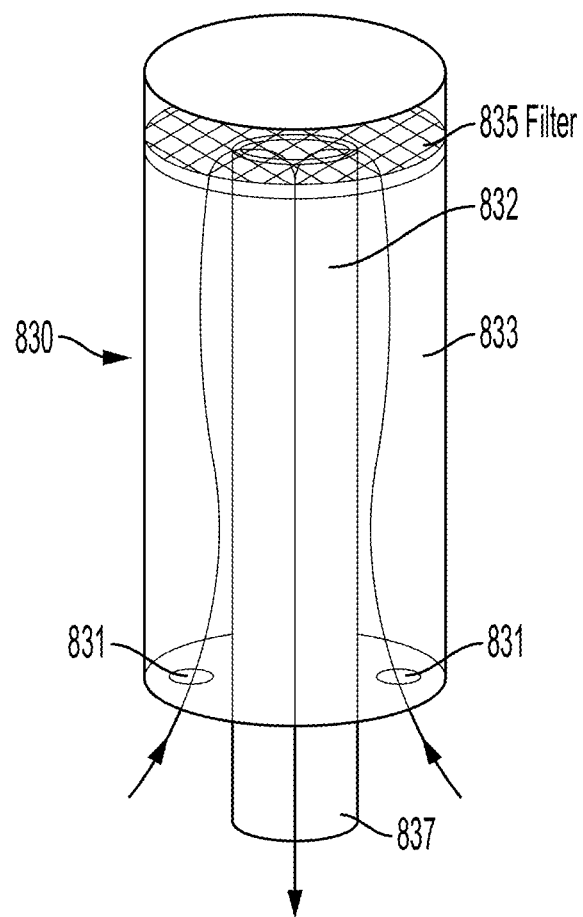
FIG. 18 is a schematic perspective view of a further pod 830, according to principles of the disclosure.
Figure 19:
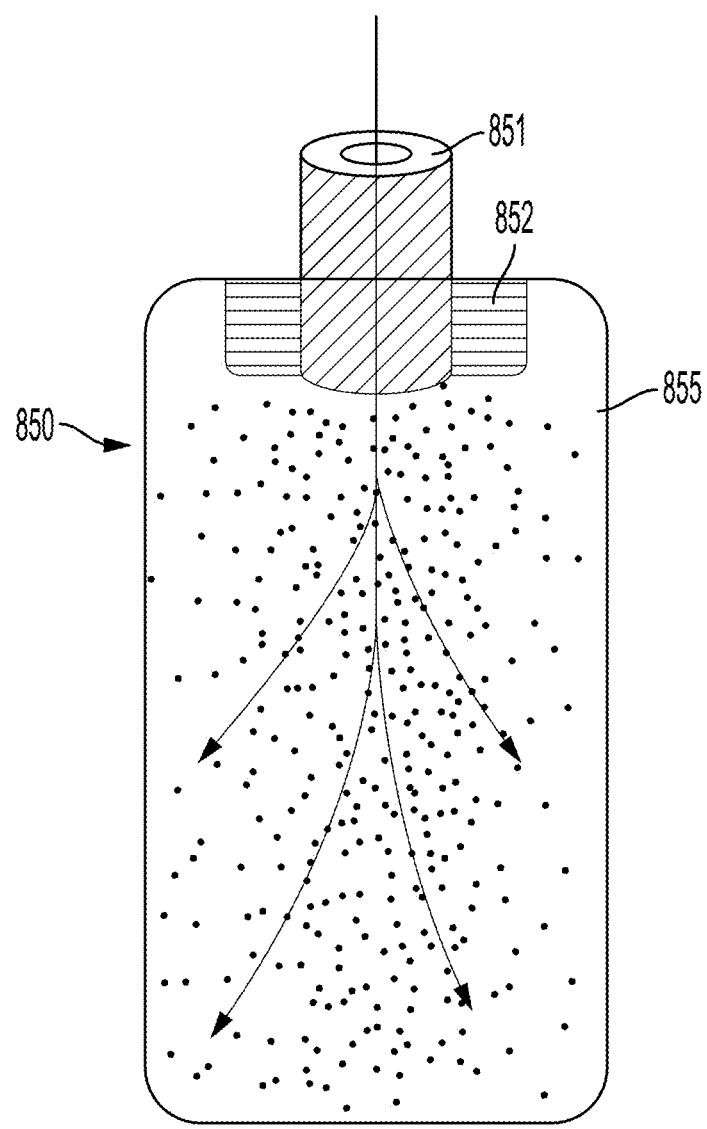
FIG. 19 is a schematic perspective view of a further pod 840, according to principles of the disclosure.

FIG. 16 is a schematic perspective view of a further pod 810, in accordance with at least some embodiments of the disclosure. FIG. 17 is a schematic perspective view of a further pod 820. FIG. 18 is a schematic perspective view of a further pod 830. FIG. 19 is a schematic perspective view of a further pod 850.

The assemblies of FIGS. 16-19 provide different arrangements to provide mixing of a liquid with an additive. For example, such arrangements can provide for mixing of water with a powder so as to generate a baby formula. In the processing of the disclosure, an active or passive mixing element can be provided so as to mix powder with water, for example. A passive mixing element can include a screen. An active mixing element might include a moving stirrer or blade. As shown, water flow through the pods of FIGS. 16-19 can be provided in different ways by the different arrangements. Mixing elements can be positioned at different points and in different arrangements relative to the flow path of water. Accordingly, the assemblies of FIGS. 16-19 can provide some type of agitation process or some type of agitation mechanism. Additionally, a filter element or screen element can be provided that prevents clumps of powder and that breaks up clumps of powder so as to effectively dissolve or integrate into the water. The mixture of water and powder can thus be effectively mixed. The mixture of water and powder can then be output. For example, any of the pods of FIGS. 15A, 15B, and FIGS. 16-19 can be used in the apparatuses of FIGS. 9-14 as may be desired.

In the pod 810 of FIG. 16, powder for a baby formula can be in the pod 810. Warm water can be injected into the top of the pod. The water can circulate through the powder in the pod as shown. The mixture can then be output through a filter or screen 801. The mixed formula can then be output from the pod 810 through an output 802.

In the pod 820 of FIG. 17, powder for a baby formula can be in the pod 820. Warm water can be injected into an input port 821. A mixing tube 822 can be positioned in the interior of the pod 820. The formula can be outside of the mixing tube 822. Accordingly, the warm water coming in the input port 821 can mix with the powder. The mixing tube 822 can be provided with apertures 823 in a spiral manner or spiral sequence. By the arrangement of the apertures 823, a vortex flow pattern can be attained as illustrated in FIG. 17. The apertures 823 can serve to break up any clumps of powder and integrate the powder into the warm water as the mixture flows from the outer annular compartment 824 into the interior of the mixing tube 822. From the interior of the mixing tube 822, the mixture of water and powder can flow out of an outlet port 827.

In the pod 830 of FIG. 18, warm water can be flowed into the pod 830 from inlet ports 831. The pod 830 can be provided with an annular mixing chamber 833 that is formed about a mixing tube 832. The annular mixing chamber 833 can be provided with powder for a baby formula, for example. From the inlet ports 831, the water can flow into the annular mixing chamber 833 and mix with the powder. The mixture of powder and water can then flow through a filter or screen 835. The mixture can then flow into a top inlet of the mixing tube 832. The mixture can then flow down through the mixing tube 832 and exit through an outlet port 837.

In the pod 850 of FIG. 19, warm water can be flowed into the pod 850 through a port 851. Powder can be contained in the pod 850. The pod 850 can include a bag structure or pouch 855. As the water flows in, a screen 852 can be provided so as to disperse the water as the water flows in. The screen 852 can be in the form of a filter, grill, or some other dispersion device. The mixture can then be output from the pod 850 through the port 851. As the mixture is output from the port 851, the screen 852 can further accomplish mixing of powder with water.

Hereinafter, further aspects of the disclosure will be described. In the arrangement of FIG. 9, conductive or communication connections can be provided in the tracking module 940 and engine 970. For example, conductive matching plates (that are electrically connected to components in the tracking module) can be matched to or mated to conductive matching plates that are electrically connected to components in the engine 970. As a result, when the tracking module is placed upon the engine, the two components can communicate and/or be powered. For example, the tracking module 940 could be powered by the engine 970 through the mated connections.

In various apparatuses as described herein, a nipple or nipple assembly is described as an outflow element. For example, the apparatuses of FIGS. 1 and 9 include a nipple assembly. It should be appreciated that such outflow element could be replaced with another outflow element as desired. For example, the nipple assembly of FIG. 1 could be replaced with some other type of outflow mechanism, such as a cylindrical spout.

Hereinafter, further embodiments of the disclosure will be described relating to a bottle that includes a pod, with the pod containing powder, for example. The powder can be baby formula or some other substance to be mixed with water or other liquid. Any of a variety of powders or other substances can be mixed with any of a variety of liquids, in accordance with embodiments of the disclosure.

Figure 22:
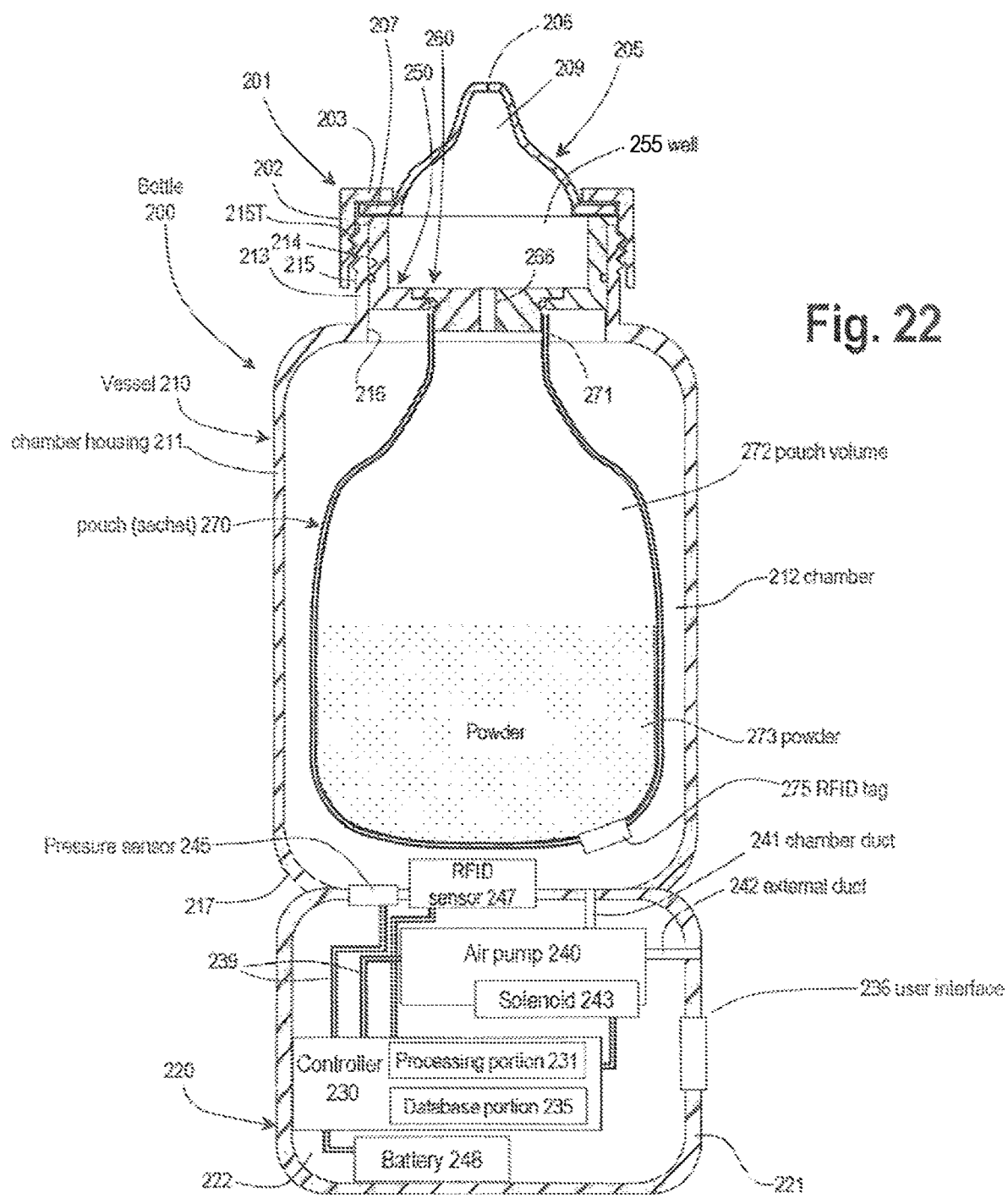
FIG. 22 is schematic cross section view of a bottle, according to principles of the disclosure.

FIG. 22 shows a bottle 200 according to principles of the disclosure. The bottle 200 can include a vessel or chamber portion 210 and a base portion 220. The vessel 210 can be mounted atop the base portion 220. The vessel 210 can be removable from the base portion 220, such as via a threaded arrangement. The vessel 210 can be integrally formed with the base portion 220. The bottle is adapted to receive a pod 260. The pod 260 can include a pouch or sachet 270, which contains a powder 273, i.e. formula powder, for example. Once the pod 260 is secured within the bottle, water can be added in manner as described below. The water can be added so as to mix with the powder 273.

The bottle 200 provides a variety of advantages. The bottle 200 provides detection of water in a well or fill basin 255, which is disposed so as to be input into the bottle via an inlet or fill passage 266. The bottle 200 provides for minimization of undissolved gas in the powder or formula 273 in the pouch or sachet 270. The bottle 200 also provides for mixing of the water and formula powder.

The processing provided by the bottle 200 can include various steps. The processing can be performed by a controller 230. The controller 230 can control various components of the bottle 200. In operation, water can be initially poured (by a user) into the well or fill basin 255. The well 255 can be formed collectively by a pod support assembly 250 and the pod or pouch assembly 260. As shown in FIG. 22, the well 255 can be connected and drain out through an inlet or fill passage 266. Water in the well 255 can be detected through sensing and/or by user input, such as via user interface or user interface portion 236.

Once water is detected in the well 255, a pump 240 can be activated or run. The pump 240 can be an air pump. The pump 240 can be run "forward", pulling air out of the vessel 210, opening the pouch or sachet 270, and drawing the water from the inlet 266 into the pouch 270. Eventually, the water or fill water in the well 255 is depleted, resulting in air being pulled into the pouch 270. Such change can be observed by a pressure sensor 245. That is, the transition between pulling in water via the inlet 266 to pulling in air via the inlet 266 results in a pressure change, which can be described as a "step" change in pressure. This step change can be detected by the pressure sensor 245. That is, the pressure sensor 245 detects the decrease in flow restriction when air is pulled into the pouch 270 instead of water, i.e., upon the depletion of water in the well 255.

Then, the controller 230 can run the pump 240 in "reverse", pushing air back into the vessel 210, and squeezing out any small amount of air that was previously pulled into the pouch 270. Eventually, the pouch 270 has no undissolved gas, and baby formula is pushed back out of the water inlet 266. As result, the pressure sensor 245 detects the increase in flow restriction when the formula is pushed out of the sachet or pouch 270. In other words, the pressure sensor 245 experiences an additional step change. Based on this additional step change, the controller can determine that formula is being pushed out of the pouch 270 and, as result, stop the pump 240. The controller can then further monitor to determine if additional water has been added into the well 255. If it is determined that additional water has been added into the well 255, such water can be input into the pouch 270 in manner as described above. Various additional processing and features are described below.

Hereinafter, further features of the bottle 200 will be described with reference to FIG. 22.

As described above, the bottle 200 includes a vessel 210 and a base portion 220. The components 210, 220 can be removably attached to each other (such as utilizing threaded arrangement) or can be integrally formed with each other, as is illustrated in FIG. 22.

The vessel 210 can include a chamber housing or housing 211. The housing 211 can contain or define a chamber 212. The chamber 212 can be described as an internal volume or an interior volume. The pouch 270 can be retained in such chamber 212.

The bottle 200 can include a neck 213. The neck 213 can extend upwardly from the housing 211. The neck 213 can be described as a part of the housing 211. The neck 213 can surround and define a bottle opening or opening 216. The neck can include an inner surface 214 and an outer surface 215. The outer surface 215 can include threads 215T. The threads 215T can be provided to engage with a collar assembly 201. The collar assembly 201 can provide for attachment to a nipple 205.

The housing 211 can include a lower flange 217. The lower flange 217 can provide attachment to the base portion 220. The lower flange 217 and the base portion 220 can be integrally formed. In other embodiments, as described below, a lower flange can be provided that is threaded so as to provide for attachment to the base portion 220.

As shown in FIG. 22, the base portion 220 can include a base housing 221. The base housing 221 can include an inner cavity 222. The inner cavity 222 can house or contain a variety of processing components.

The base housing 221 can include the controller 230 that is housed, at least in part, in the inner cavity 222. In some embodiments, processing components of the controller 230 can be housed exterior to the base housing 221, while being in communication with the controller 230. The controller 230 can include a processor portion or processing portion 231. The processing portion 231 can include a general processing portion. The processing portion 231 can also include more specialized processing portions to handle specialized processing of the bottle 200, as are described below. The controller can also include a database portion 235. The database portion 235 can contain instructions. The processing portion 231 can use the instructions so as to perform the various features and functionality as described herein.

The base portion 220 can also include a user interface 236. The user interface 236 can include any of a wide variety of devices or arrangements so as to provide communication to and from the user. The user interface 236 can include lights 236L, which can be in the form of LED lights, for example. The user interface 236 can also include buttons, switches, and other mechanisms or devices. The user interface 236 can also include or interface with a user device such as a cell phone or smart phone. Accordingly, a user can be able to control operation of the bottle 200 via the user interface 236 and/or a user device (e.g. cell phone) that is in communication with the user device 236 and/or the controller 230.

The base portion 220 can also include wires or other communication pathways 239. The wires 239 can connect the various components of the base portion 220 to the controller 230. The wires 239 can provide for the transmission of communication between components and for the communication of power to the components. That is, the wires 239 can provide for electrical power to flow from the controller 230 to the various components of the base portion 220, as needed.

The base portion 220 can include a pump or air pump 240. The pump 240 can pump air out of the chamber 212. The pump 240 can pump air into the chamber 212. The pump 240 can be controlled by the controller 230. The pump 240 can be any of a variety of pumps. The pump 240 can be controlled by the controller 230 so as to run for a predetermined amount of time so as to pump a desired amount of air or volume of air. The pump can be controlled by the controller 230 so as to move a predetermined amount of air based on number of cycles, number of rotations, or some other operating attributes of the pump upon which volume of air moved can be determined. The pump 240 can include gate valve, globe valve, check valve, plug valve, ball valve, butterfly valve, needle valve, pinch valve, pressure relief valve, choke valve, diaphragm, spool valve, poppet valve, direct acting valve, solenoid valve, pilot operated valve, two-way valve, three-way valve, four way valve, and/or a combination of such valves or other valves. The pump 240 can be motorized using a motor.

In accordance with some embodiments of the disclosure, the pump 240 can be reversible so as to selectively pump air out of the chamber 212 or to pump air into the chamber 212. As shown in FIG. 22, a solenoid valve 243 can be provided. In such arrangement, the controller 230 can control the solenoid valve so as to selectively change whether the pump 240 pumps air into the chamber 212 or pumps air out of the chamber 212. That is, in such arrangement, the pump 240 can run in the same direction—with position of a solenoid valve (as controlled by the controller 230) dictating whether air is pumped out of the chamber 212 or whether air is pumped into the chamber 212. It is appreciated that suitable piping or tubing arrangements can be provided in such arrangement. Relatedly, the pump 240 and/or the solenoid valve 243 can be connected to a chamber duct 241 and an external duct 242. The ducts 241, 242 can be any suitable opening, passageway, pipe, tube, conduit, or other similar structure or arrangement. The chamber duct 241 can connect the pump 240 and/or the solenoid valve 243 with the chamber 212. The external duct 242 can connect the pump 240 and/or solenoid valve 243 with the ambient.

The base portion 220 can also include one or more batteries 248. The battery 248 can be connected to the controller 230 so as to power the controller 230. The battery 248 can power the various components of the bottle 200. The battery 248 can be rechargeable via connecting the battery 248 to an external power source, for example.

The base portion 220 can include an RFID sensor 247. The RFID sensor 247 can be powered by and can be in communication with the controller 230. The RFID sensor 247 can sense and communicate with an RFID tag 275 on the pod 260. For example, the RFID tag 275 can be attached to the pouch 270 or some other structure of the pod 260. The RFID sensor 247 can communicate with the RFID tag 275 so as to exchange a variety of data with the RFID tag 275. For example, the RFID tag 275 can contain data or information regarding the contents of the pouch 270, the expiration date of the contents, the amount of powder or formula powder in the pouch 270, the size of the pouch 270, and/or any other attribute of the pouch 270 or powder contained in the pouch 270. Additionally, in some embodiments, the vessel 210 can be provided with an RFID tag, which contains various data regarding the particular vessel 210. For example, the RFID tag in the vessel 210 can contain the size or other attribute of the vessel 210. The ability of the controller 230 to input data from the RFID tag 275 and/or an RFID tag mounted on the chamber housing 211, for example, can provide the controller with various operational information so as to enhance operation and functionality of the bottle 200.

The base portion 220 can also include the pressure sensor 245, as described above. The pressure sensor 245 can measure pressure in the chamber 212. As otherwise described herein, the pressure sensor 245 can measure changes or "steps" in pressure so as to determine state, status, or condition of the bottle 200. Accordingly, operations and functionality can be performed based on such information. The pressure sensor 245 can be any of a variety of mechanisms so as to measure pressure. The pressure sensor 245 can be any of a variety of mechanisms that reacts proportionally to a force applied. For example, the pressure sensor 245 can be a resistive pressure sensor, a capacitive pressure sensor, a piezoelectric pressure sensor, an optical pressure sensor, a MEMS (Micro Electro-Mechanical System) sensor, or any other pressure sensor that can sense pressure in the chamber 212 and output a signal, representative of the sense pressure, to the controller 230.

As shown in FIG. 22, the bottle 200 can include a collar assembly 201. The collar assembly 201 can "screw-on" to the neck 213 so as to be attached onto the neck 213. The collar assembly 201 can serve to attach a nipple 205 onto the top of the bottle. The nipple 205 can be in the form of a molded elastomeric material or any other material and/or shape that is conducive for a baby. The nipple 205 can include an opening 206. The opening 206 can be a circular opening or can be a slit or multiple slits, for example. The collar assembly 201 can include a sidewall 202 and a top flange 203. The sidewall 202 can be in the form of a ring that extends downwardly from an outer peripheral edge of the top flange 203. The top flange 203 can include an inner aperture through which the nipple 205 extends. The nipple or nipple assembly 205 can include a lower collar 207. The lower collar 207 can be "sandwiched" between a pouch support 250 and the top flange 203 (of the collar assembly 201). As shown in FIG. 22, the pouch support 250 (and more specifically a bottle engagement flange 254 of the pouch support 250) can be sandwiched between the lower collar 207 and an upper portion or edge of the neck 213. Accordingly, the nipple or nipple assembly 205 can be secured onto the top of the bottle 200. A cap or top can be positioned atop the bottle 200 so as to cover the nipple assembly 205.

Figure 23:
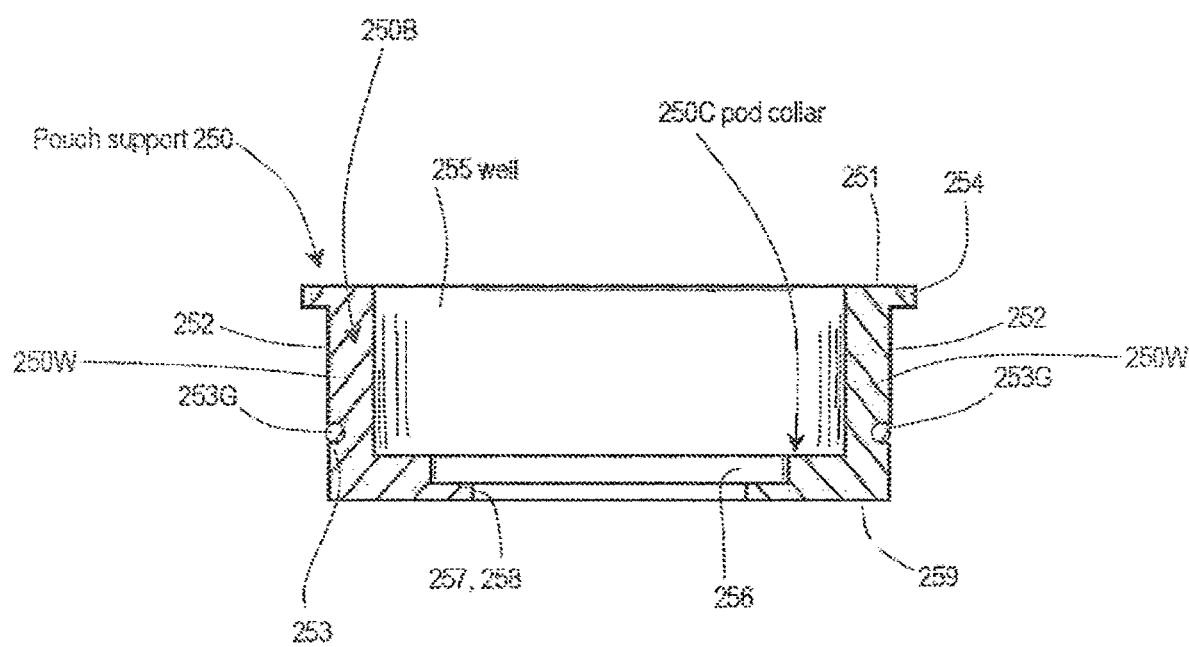
FIG. 23 is a cross-sectional view of the pouch support 250 the same as or similar to the pouch support 250 shown in FIG. 22, according to principles of the disclosure.

As shown in FIG. 22, the bottle can include the pouch support 250, which can also be described as a pod support assembly 250. FIG. 23 is a cross-sectional view of the pouch support 250 the same as or similar to the pouch support 250 shown in FIG. 22.

The pouch support 250 serves to support a pod 260. That is, the pouch support 250 can be supported on and/or within the neck 213. In turn, the pouch support 250 can support a pod 260. The pod 260 can also be described as a pouch assembly 260. The pouch support 250 can include a body portion 250B, as shown in FIG. 23. The body portion 250B can be open at the top so as to provide a well or fill basin 255.

The pouch support 250 can include a top surface 251. The top surface 251 can be annular in shape and surround the well 255. The top surface 251 can engage with the lower collar 207 (of the nipple), as shown in FIG. 22. The pouch support 250 can include an outer surface 252. A bottle engagement flange 254 can extend outwardly from the outer surface 252. The bottle engagement flange 254 can be annular in shape, surround the well 255, and be concentric with the well 255. The bottle engagement flange 254 in conjunction with the outer surface 252 can support the pouch support 250 on or within the neck 213.

An outer diameter provided by the surface or outer surface 252 can be slightly smaller than the inner diameter provided by the inner surface 214, as shown in FIG. 22. Accordingly, a "snug" fit can be provided between the pouch support 250 and the neck 213. Relatedly, the outer surface 252 can be provided with a gasket groove 253 with gasket 253G. Such arrangement can provide a seal between the pouch support 250 and the neck 213. One or more gaskets can be provided. The neck 213 could also be provided with a gasket with associated gasket groove.

The pouch support 250 also includes a pod collar 250C that is annular in shape and that provides a part of a bottom of the pouch support 250. The pod collar 250C can be described as extending inwardly from vertical walls 250W of the body portion 250B. The pod collar 250C can include a bottom recess 256. The bottom recess 256 can be sized and adapted to receive a pod 260. More specifically, the bottom recess 256 can be sized and adapted to engage with a support flange 264 of the pod 260. The pod collar can also include a pod opening 257. As shown in FIG. 22, a pod 260 can be inserted through the pod opening 257. The pod opening 257 can include an inner diameter 258. The inner diameter 258 can be sized and adapted to engage with a pouch top 262. The pouch top 262 can include the support flange 264. The pouch support 250 can also include a bottom surface 259.

Figure 24:
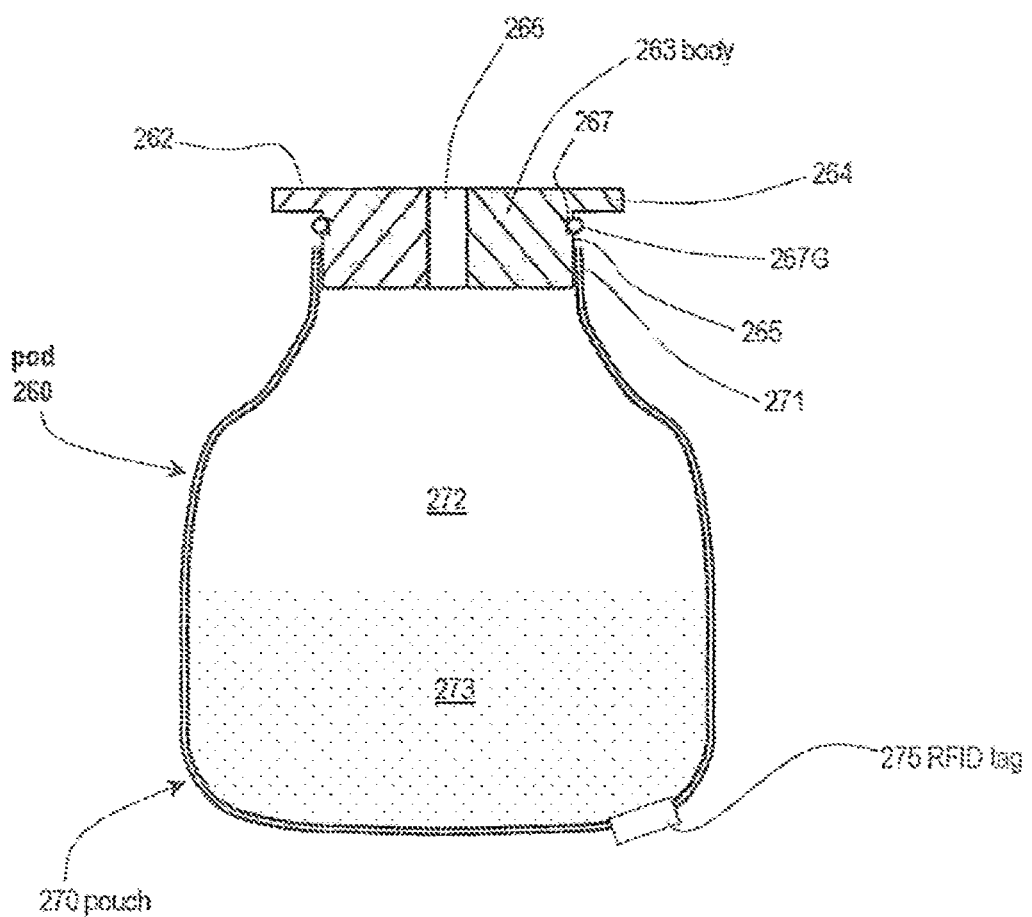
FIG. 24 is a cross-sectional view of the pod 260 the same as or similar to the pod shown in FIG. 22, according to principles of the disclosure.

Various features of the pod or pouch assembly 260 are described above. FIG. 24 is a cross-sectional diagram of pod 260. The pod 260 can include a pouch top 262. The pouch top can include body portion 263. An inlet or fill passage 266 can extend through the pouch top 262, as shown. The support flange 264 can extend outwardly from the body portion 263. The body portion 263 can include an outer surface 265. The outer surface 265 can include a gasket groove 267 with gasket 267G. The gasket 267G can engage with the inner diameter 258 of the pouch support 250, so as to provide a sealing arrangement between the pod 260 and the pouch support 250.

As shown in FIG. 24, the pod 260 can include pouch or sachet 270. The pouch 270 can include a neck 271, which forms an upper extent and opening of the pouch 270. The neck 271 can be secured about and attached to the outer surface 265 of the body portion 263. The neck 271 can be secured to the body portion 263 using various mechanical or other mechanisms, such as friction fit, adhesive bonding, heat bonding, or other arrangement. For example, a rubber gasket type strap could be extended about the neck 271, so as to secure the neck 271 onto the body portion 263. It is appreciated that any material pod 260 should be safe so as to be compatible with use of the pod 260 as containing a consumable material.

The pouch 270 in conjunction with the pouch top 262 can form a pouch internal volume 272. The pouch internal volume 272 is variable in volume. That is, the pouch 270 can be constructed of suitable material, such as polymeric or plastic material, so as to hold content of the pouch 270. Initially, the content can be powder or formula powder. Accordingly, in an initial state, the pouch 270 can be small so as to be insertable through the pod opening 257 of the pouch support 250. However, once in the arrangement of FIG. 22, water can be drawn into the pouch internal volume 272 so as to mix with the powder 273.

As described above, the pod 260 can include an RFID tag 275. The RFID tag 275 can include various information regarding the pod 260. The data or information on the RFID tag 275 can be communicated to the controller 230 via the RFID sensor 247. The RFID sensor 247 can be any device that can communicate information from and to the RFID tag 275.

The pouch 270 can be any variety of shapes and sizes, as may be desired. For example, the pouch 270 can be in a flattened or low-profile state initially, when only powder is contained in the pouch 270. Then, upon water added to the pouch 270, the pouch can expand so as to be in a shape as shown in FIG. 24, for example. However, size, shape, geometry, and dimension of the pouch 270 can vary as desired. It may be that some geometries of pouches are more conducive to a particular powder or other content—as compared to other geometries of pouches.

It is appreciated that any of a variety of arrangements can be provided so as to provide a sealing arrangement between the pouch support 250 and the neck 213, as well as between the pouch support 250 and the pouch top 262. Any number of grooves, gaskets and/or other sealing mechanisms can be utilized. Such sealing mechanisms and the "fit" between the components 213, 250, and 260 can provide a friction fit between such components. In other words, the components 213, 250 and 260 can resist disassembly. In operation, some degree of pressure may be generated within the chamber 212. Thus, the fit of the components 213, 250 and 260 can be such that the components do not "pop" apart when pressure is created (within the chamber 212) that is above ambient pressure.

Figure 25:
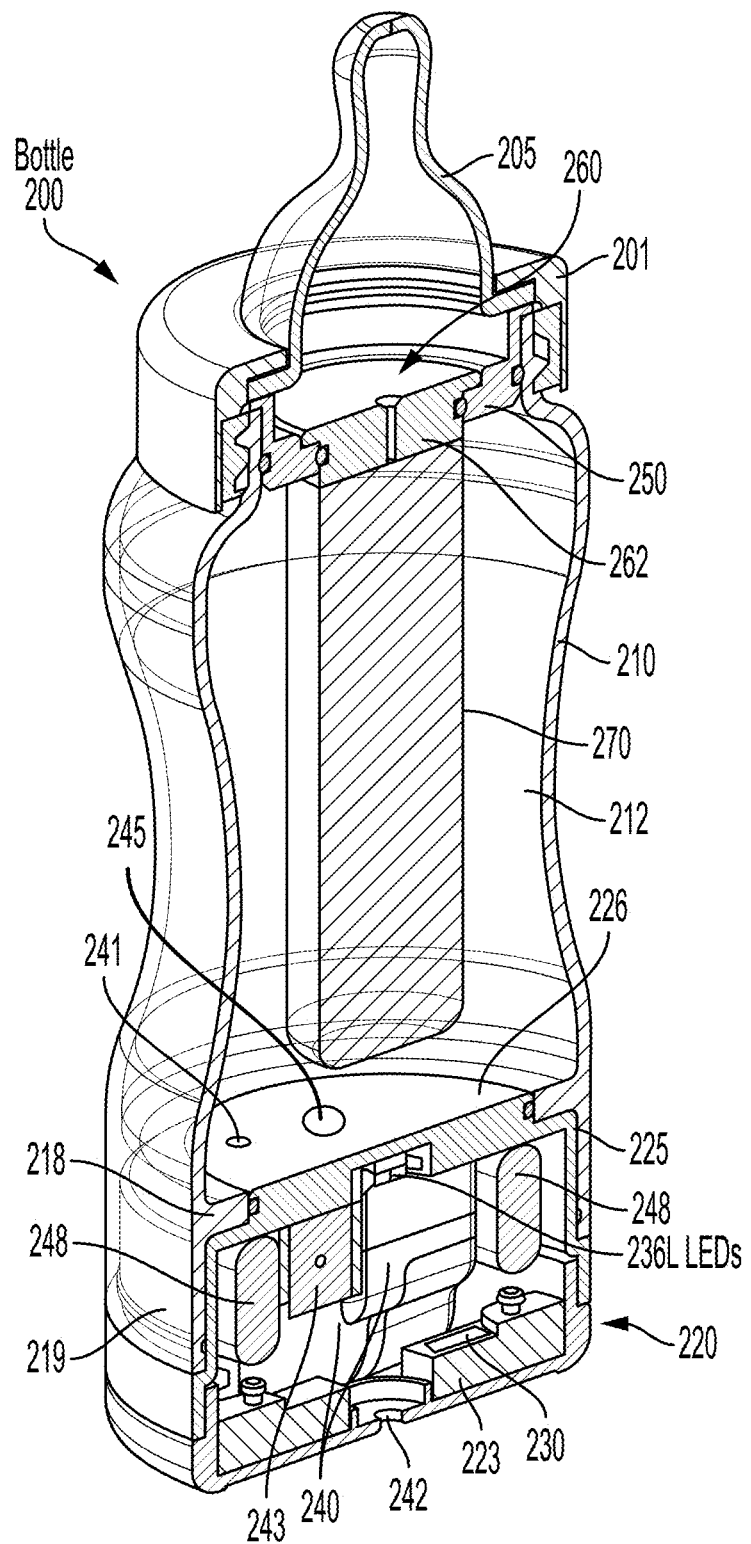
FIG. 25 is a perspective, schematic cross section view of a bottle 200', according to principles of the disclosure.

FIG. 25 is a perspective, schematic cross section view of a bottle 200', according to principles of the disclosure. The bottle 200' can include structure that is similar to the construct of the bottle of FIGS. 22-24. The bottle 200' can include a nipple 205 and a collar assembly 201. The bottle can also include a pod or pouch assembly 260, as described above, that includes a pouch top 262 and a pouch or sachet 270. The bottle 200' can include vessel 210.

In the arrangement of FIG. 25, the vessel 210 can include a lower flange 218, which seats with a base portion 220. The vessel 210 can include an attachment collar 219. The attachment collar 219 can be threadably or friction fit, for example, onto the base portion 220. The base portion 220 can include an engagement structure 225, which includes an engagement cone 226. The engagement structure 225 can serve to attach the base 220 onto the vessel 210. As otherwise described herein, the base or base portion 220 can support vessels 210 of different sizes.

The base portion 220 can include a controller support 223 that supports controller 230. The controller 230 can be in the form of components mounted on a circuit board, such as the controller support 223. The base portion can include pump 240. The pump 240 can include a motor and a pumping mechanism. As otherwise described herein, a solenoid valve 243 can be provided. The solenoid valve 243 can switch the flow paths so that a single pump can produce both positive and negative pressure in the vessel—essentially connecting the vessel to either the inlet 241 or outlet 242 of the pump. The base portion 220 can include one or more batteries 248.

The batteries can power the controller 230 and other components of the bottle 200'. The bottle 200' can also include pressure sensor 245. The pressure sensor 245 can be in communication with the controller and sense pressure in the chamber 212.

Figure 26:
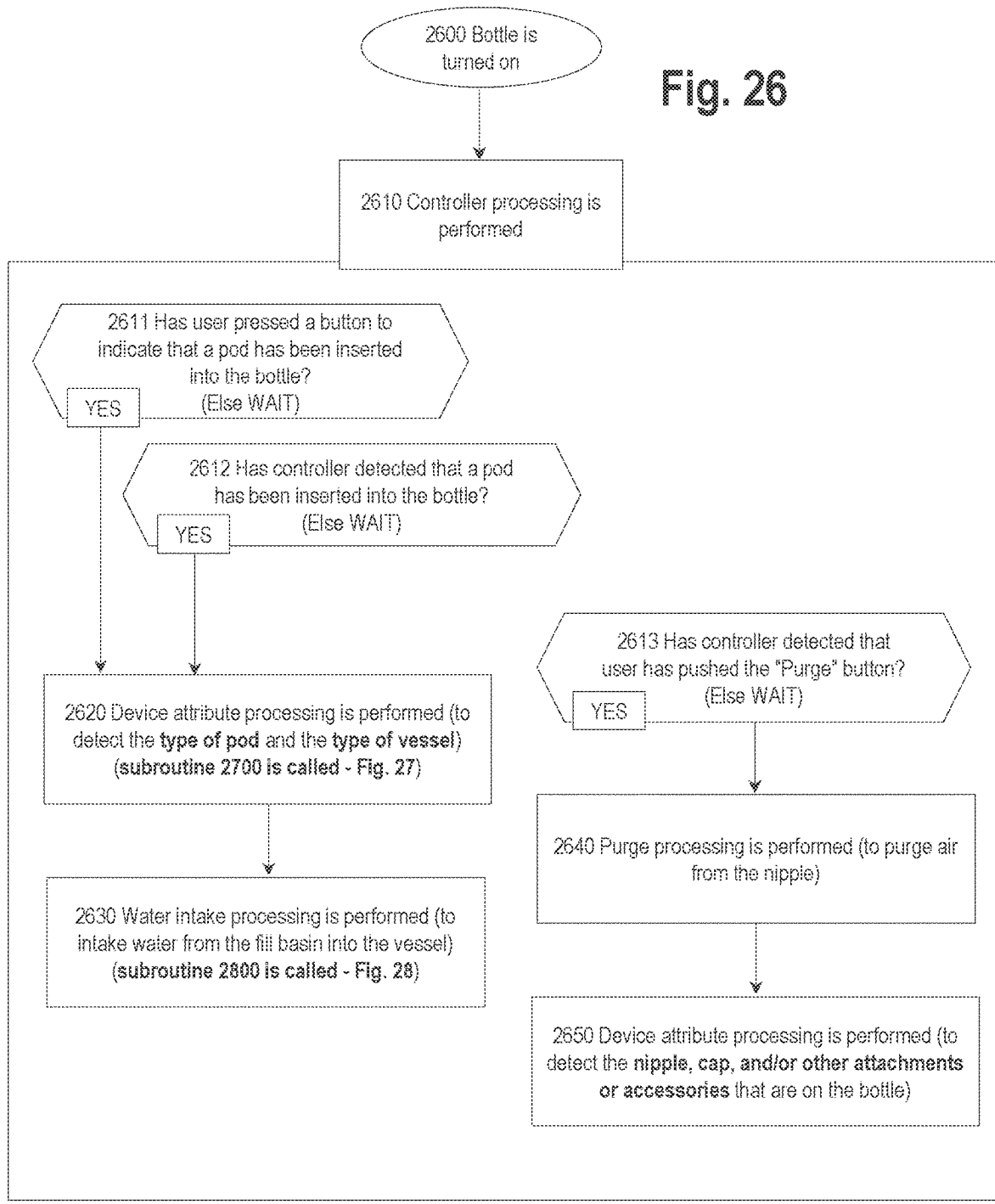
FIG. 26 is a high-level flowchart showing processing that can be performed by the bottle of FIG. 22 or FIG. 25, for example, according to principles of the disclosure.

FIG. 26 is a high-level flowchart showing processing that can be performed by the bottle of FIG. 22 or FIG. 25, for example. As shown, the processing starts in step 2600 when the bottle is turned on. Then, the process passes to step 2610. In step 2610, controller processing is performed. Such processing can be performed by the controller 230. The controller processing 2610 can include various processing that is triggered by particular events.

Figure 29:
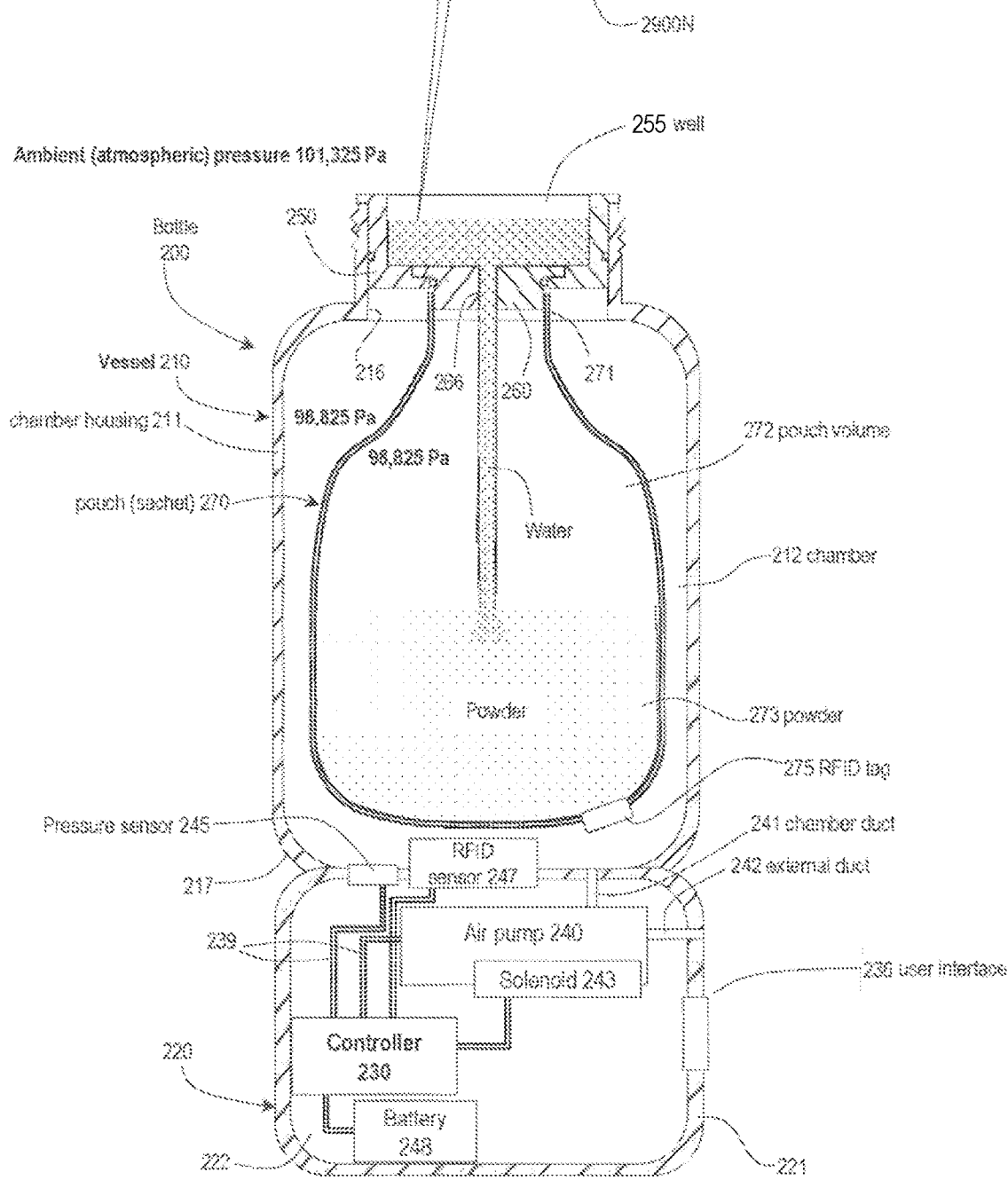
FIG. 29 is a schematic cross-sectional diagram of a bottle the same as or similar to the bottle 200 of FIG. 22, with water in the well of the bottle, according to principles of the disclosure.

Illustratively, with reference to FIG. 22 and FIG. 25, operation of the bottle 200 can include, as a first step, a user inserting a pod 260 into the bottle 200. The pod 260 may have been purchased at a store or ordered online, for example. The pod 260 can contain powder or powder formula as packaged in the pod by a manufacturer. The user can insert the pouch support 250 into the neck 213 of the bottle 200. Then, the user can insert or "feed" the pouch 270 through the pod opening 257. The pod 260 can then be positioned or "seated" in the pouch support 250. Accordingly, the arrangement shown in FIG. 22 can be provided, excepting the collar assembly 201 and the nipple 205 would not be attached. That is, the user would have access to the well 255 so as to be able to add water, or other liquid such as milk, into the well 255. Such arrangement is shown in FIG. 29. Accordingly, once the physical arrangement of FIG. 29 is attained by the user, various steps of FIG. 26 can be performed.

With reference to FIG. 26, in step 2611, the controller can determine whether the user has pressed a button to indicate that a pod 260 has been inserted into the bottle 200. If the button has not been pressed, then the controller can continue to wait. It should be appreciated that the disclosure is not limited to pressing a button, as described in step 2611. Any suitable input may be programmed into the controller instead of the press of a button.

If it is determined in step 2611 that the user has pressed the button indicating that a pod has been inserted, then the processing passes to step 2620.

Alternatively, in step 2612, the controller 230 performs processing to determine if the pod has been inserted into the bottle. If the controller cannot determine that a pod has been inserted in the bottle, then the controller can continue to wait. For example, the controller can detect that a pod has been inserted into the bottle by identifying the presence of RFID tag 275, on the pouch 270 or on other structure of the pod 260. More specifically, the RFID sensor 247 can detect the presence of the RFID tag 275. The RFID sensor 247 can input data from the RFID tag 275. The RFID sensor 247 can then output, to the controller 230, the data from the RFID tag 275 and an indication that a pod 260 has been identified. Accordingly, if a pod has been detected, then the processing passes from 2612 onto step 2620.

In step 2620, device attribute processing can be performed. Device attribute processing can be performed to detect the type of pod in the bottle and/or the type of vessel 210. In the case that the vessel is integrally formed with the base, then it should be appreciated that the vessel would always be the same. However, in an arrangement such as FIG. 25, different vessels can be "switched out" while using the same base. Accordingly, the processing of step 2620 allows the controller to determine which vessel is being used. To perform the processing of step 2620, subroutine 2700 is called or invoked by the controller 230, as described below with reference to FIG. 27.

After step 2620, the process passes onto step 2630. In step 2630, water intake processing is performed. In such processing, the controller 230 controls the pump 240 to intake water from the fill basin or well 255 into the pouch 270. To perform the processing of step 2630, subroutine 2800 is called or invoked by the controller 230, as described with reference to FIG. 28. Accordingly, the processing of step 2620 can be called upon by either step 2611 or step 2612. The controller processing 2610 of FIG. 26 can also include step 2613. In step 2613, the controller determines whether the user has pushed the "purge" button. For example, such a purge button might be provided on the user interface portion 236. Such processing is not limited to a button, but could include other user interface functionality. If no button has been detected in step 2613, then the controller continues to wait. If yes, i.e. the controller has detected that the user has pushed the purge button in step 2613, then the processing passes onto step 2640. In step 2640, purge processing is performed. Such processing is provided to purge air from the nipple 205. In such processing, formula can be pushed out of the fill passage 266 so as to fill the space within the nipple 205 with formula. Further details are described below.

After step 2640, the process passes onto step 2650. In step 2650, device attribute processing is performed. Such processing is performed to detect attachments or accessories that are on the bottle. Such attachments can include the particular nipple that the user has placed on the bottle, if there is a cap that has been fitted over the nipple, and/or other attachments, accoutrements, or accessories that have been attached to the bottle. More specifically, the device attribute processing can determine a volume of the internal space of the bottle 200. Based on the determination of volume of the internal space, the controller can then determine which nipple or type of nipple has been placed upon the bottle. Such functionality, in at least one embodiment of the disclosure, can be dependent upon different nipples having different volume. Once a particular type of nipple has been determined by the controller, then subsequent processing can be performed that is attuned to that particular nipple. For example, different nipples can have different "restriction", which can affect use of the bottle by a baby. Consumption monitoring and/or functionality performed by the bottle in conjunction with consumption of the contents, by a baby, can be attuned to the particular type of nipple or other accessory that is on the bottle. Further details are described below As described above, FIG. 27 is a flowchart showing in further detail device attribute processing is performed, as called upon from the processing of FIG. 26, according to principles of the disclosure. As shown, the process starts in step 2700 and passes onto step 2701.

In step 2701, the controller determines the pressure in the vessel 210 using the pressure sensor 245. Then, in step 2702, the controller injects a predetermined, known amount of air into the chamber 212. Such injection of air, given the volume of the chamber 212 is maintained constant, will result in a pressure increase in the chamber 212 as by the pressure sensor 245.

Then, in step 2703, the controller again determines the pressure in the vessel 210, using the pressure sensor 245. Then, the process passes onto step 2703'. In step 2703', the controller performs processing to determine the volume of the chamber excluding the volume consumed by the pouch 270. Such processing can be performed using Boyle's Law concepts, including the relationship $P_1V_1=P_2V_2$. Such relationship reflects that, as volume increases, the pressure of a gas in a space decreases in proportion. In similar manner, as volume decreases, the pressure of the gas increases. Accordingly, if a predetermined amount of gas is injected into the chamber 212, the pressure of the gas will increase. The amount that the pressure will increase is dependent upon the volume of the chamber 212. That is, given the same amount of injected gas, that is injected into the chamber 212, a larger chamber volume will experience a smaller pressure increase, as compared with a smaller chamber volume. This flows from the fact that the same amount of injected gas will have lesser impact on the larger chamber, i.e. less pressure increase.

Accordingly, with pressure before injection, pressure after injection, and the amount of air injected into the chamber 212 all known, the volume of the chamber 212 can be calculated from the relationship $P_1V_1=P_2V_2$.

In accordance with some embodiments of the disclosure, a mapping table can be established to be used by the controller 230. In establishment of the mapping table, an internal volume of the chamber 212 can be determined for every vessel 210 and for every pod 260, and for every combination thereof. The predetermined, known amount of air can then be injected into every possible combination of vessel and pod. Pressure change can then be observed by the pressure sensor 245. With the amount of injected air held steady, each vessel size, for example, will have a unique pressure increase. This unique pressure increase can be used to uniquely identify which vessel is mounted on the base portion 220. For example, a four ounce vessel will have a unique pressure increase, as compared to an eight ounce vessel. Further, it is noted that the eight ounce vessel will have a smaller increase than the four ounce vessel, i.e. because the set amount of injected air will have less of an effect on the pressure in the eight ounce vessel. Accordingly, once the mapping table is established—such data can be used by the controller 230. Thus, when the controller observes a particular pressure increase, upon injecting the known amount of air, the controller can determine which vessel is mounted on the base portion 220. Accordingly, in some embodiments of the disclosure, a mapping table (that maps pressure change to volume) can be used in lieu of the processing of step 2703'. Accordingly, such alternative processing can also be used to determine volume of the chamber 212.

Figure 27:
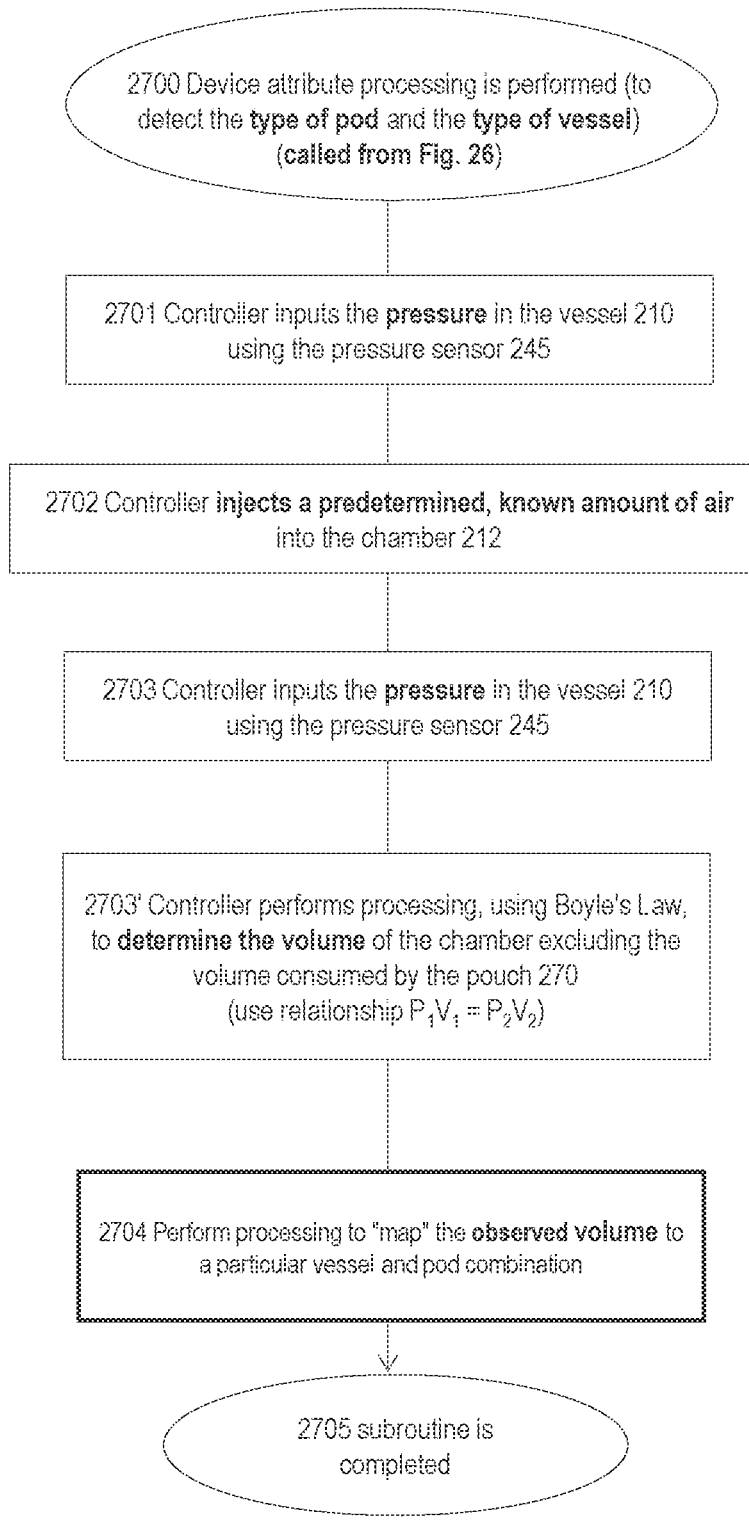
FIG. 27 is a flowchart showing in further detail "device attribute processing" is performed, subroutine 2700 as called upon from the processing of FIG. 26, according to principles of the disclosure.

After step 2703' of FIG. 27, the process passes onto step 2704. In step 2704, processing is performed to map the observed volume to a particular vessel and pod combination. Such processing assumes the each vessel and pod combination has a different volume. That is, in the situation that a first vessel and pod combination has the same internal volume as a second vessel and pod combination, then the processing of FIG. 27 may be unable to distinguish between such first and second combinations, i.e. since they have the same volume.

After step 2704, the process passes onto step 2705. In step 2705, the subroutine is completed.

Figure 28:
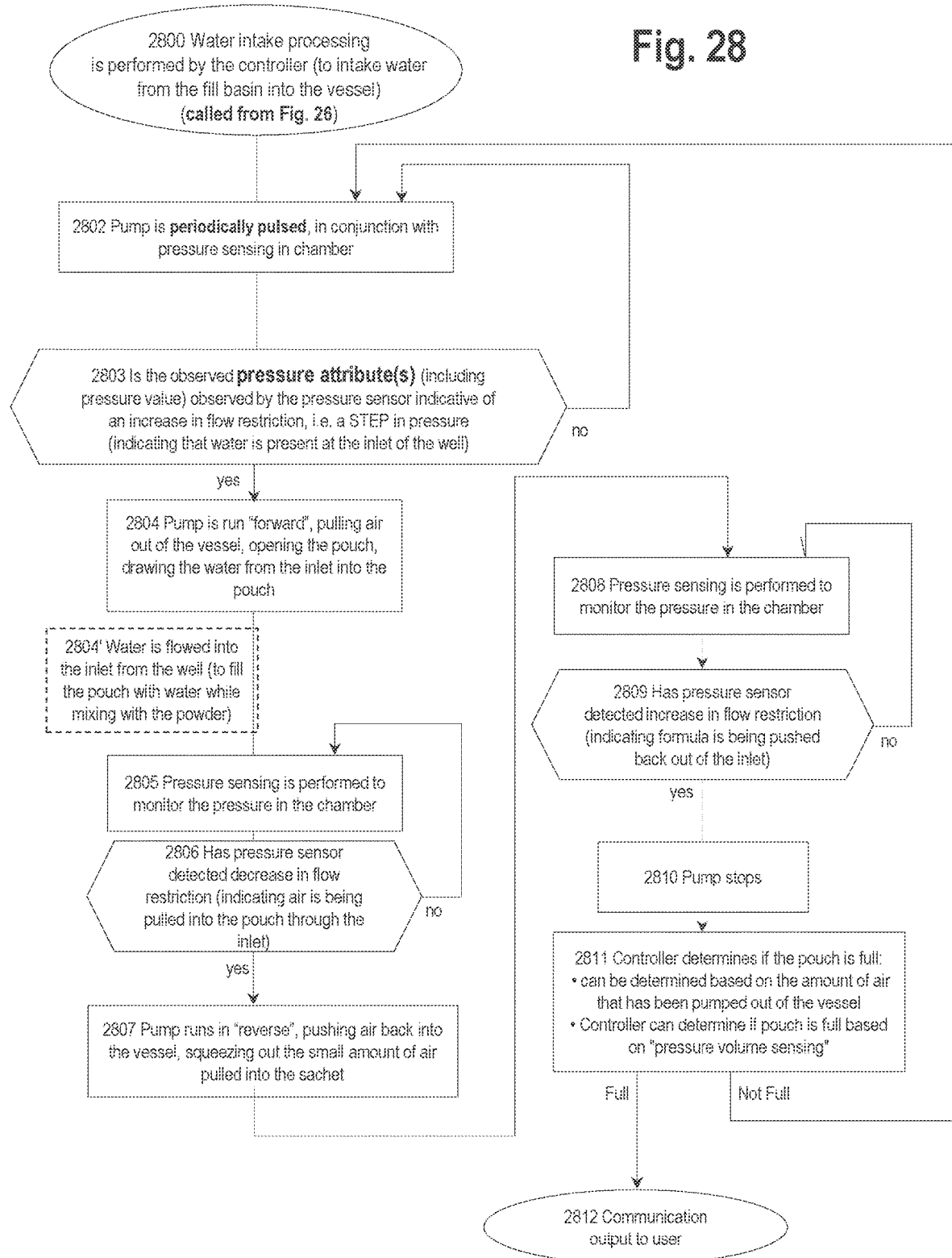
FIG. 28 is a flowchart showing details of the "water intake processing is performed by the controller", subroutine 2800 as called from the processing of FIG. 26, according to principles of the disclosure.

FIG. 28 is a flowchart showing details of the "water intake processing is performed by the controller" subroutine 2800 as called from FIG. 26, according to principles of the disclosure. As shown, the process starts in step 2800 and passes onto step 2802. In step 2802, the pump 240 is periodically pulsed (or in other words oscillated back and forth in direction of the pump) in conjunction with pressure sensing in the chamber. For example, the pump 240 can be periodically pulsed, in conjunction with pressure sensing in the chamber, every half second, every tenth of a second, every hundredth of the second, every thousandth of a second, or at some other time interval as desired.

The processing of FIG. 28 can be performed with the pod support 250 and the pod 260 mounted on the vessel 210. In a first situation, no water is present in the well 255, with reference to FIG. 22. In a second situation, there is water present in the well 255. When the pump 240 is pulsed with an amount of air or a small amount of air being injected into the chamber 212, the resulting observed pressure by the pressure sensor 245 will be different in such first situation vis-a-vis the second situation. Such difference relates to the viscosity between air and water. With a given pump of air into the chamber 212, if only air is present in the inlet 266, the resulting pressure (from a pulsed pump of the pump 240) can be observed to be less then if water is in the inlet 266. The processing of FIG. 28 uses this dynamic.

Accordingly, immediately after or in combination with the processing of step 2802, the controller performs step 2803. In step 2803, the controller determines if the observed pressure attribute(s) observed by the pressure sensor is indicative of an increase in flow restriction, i.e., a step in pressure. In particular, such pressure attribute can include the pressure value that can be measured by the pressure sensor 245. If, upon a pulse of air into the chamber 212, an observed pressure is greater at a point in time—the controller can understand such change to be indicative that water has been added into the well 255. If no in step 2803, then the process returns to step 2802, and the pump continues to periodically pulse so as to monitor for a step change in pressure, which is indicative that water has been added to the well 255.

On the other hand, if an increase in flow restriction is determined in step 2803, i.e. yes, then the process passes onto step 2804. In step 2004, the pump is run "forward", pulling air out of the vessel, opening the pouch, and drawing the water from the inlet into the pouch. In other words, as reflected at 2804', water is flowed into the inlet 266 from the well 255 so as to fill the pouch with water while mixing with the powder already in the pouch.

In conjunction with the controller running the pump "forward" to pull air out of the vessel, the processing of step 2805 is performed. In step 2805, pressure sensing is performed to monitor the pressure in the chamber. Upon pressure being input periodically in step 2805, the controller performs step 2806. In step 2806, the controller determines that the pressure sensor has detected a decrease in flow restriction (indicating that air is being pulled into the pouch through the inlet 266). If no in step 2806, the process loops back to step 2805 until a yes is determined in step 2806.

Upon a yes determination in step 2806, the process passes onto step 2807. In step 2807, the pump runs in "reverse". Such reverse operation of the pump pushes air back into the vessel, squeezing out a small amount of air that was pulled into the sachet or pouch 270. That is, it is appreciated that in the time it takes for the controller to determine that air is being pulled in through the inlet 266, as opposed to water, some air is likely pulled into the pouch 270. Accordingly, the processing of step 2807 serves to expel such input air.

After step 2807, the process passes onto step 2808. In step 2808, pressure sensing is performed to monitor pressure in the chamber. Then, in step 2809, the controller determines if the pressure sensor has detected an increase in flow restriction, which indicates that formula is being pushed back out of the inlet 266. If no in step 2809, then the process loops back to step 2808 with further pressure sensing.

On the other hand, if a yes is determined in step 2809, then the process passes onto step 2810. In step 2810, the pump stops. Then, the process passes onto step 2811.

In step 2811, the controller determines if the pouch is full. That is, the controller determines if sufficient water has been input through the inlet 266 so as to sufficiently fill the pouch 270. The controller can determine if the pouch is full based on the amount of air that has been pumped out of the vessel, i.e. out of the chamber 212. That is, such can be determined based on rotations or cycles of the pump 240 and knowledge of the amount of air that each rotation or cycle pumps, taking into account both air that has been added into the chamber 212 and air that has been pumped out the chamber 212.

In one embodiment, the controller can determine if the pouch is full simply based on the runtime of the pump 240, and in particular the runtime of step 2804. In at least one embodiment, the controller can determine if the pouch is full based on "pressure volume sensing" as described above with reference to FIG. 27. That is, the controller can inject, be the pump 240, a known amount of air into the chamber 212. Based on the pressure increase, the controller can determine the volume in the chamber that is not occupied by the pouch 270. Once such a volume in the chamber drops below a predetermined threshold, the controller can infer that the pouch is full with powder/water.

If the controller determines in step 2811 that pouch is not full, then the processing passes back to step 2802. In such step 2802, the pump is again periodically pulsed in conjunction with pressure sensing. Once the controller observes a step change in pressure, indicative of water being drawn into the inlet 266, then the process again passes to step 2803. Processing then continues as described above.

On the other hand, if it is determined in step 2811 that the pouch is full, then the process passes onto step 2812. In step 2812, a communication is output the user indicating that the pouch is full. For example, such communication might be in the form of a light of a certain color, such as for example a green LED light 236L.

Hereinafter, further aspects of the purge processing of step 2640 will be described. Such relates to a situation in which the pouch is full of formula, including water and formula powder, and the user has placed the collar assembly 201 with the nipple 205 onto the bottle 200. In such a situation, it is desirable to dispel the air in the nipple 205. Accordingly, in the processing of step 2640 of FIG. 26, the controller can control the pump 240 to pump air into the chamber 212. As result, formula is forced out of the inlet 266 into the nipple cavity 209, i.e. the volume within the nipple 205. Pumping will continue while sensing pressure as some predetermined interval. For example, pressure could be sensed every half second, every tenth of a second, every hundredth of the second, every thousandth of a second, or at some other time interval as desired. During such pumping, air will flow out of the opening 206 of the nipple 205. However, at a point, formula will start to flow out of the opening 206. The formula will not flow out as easily as the air. That is, the system of the bottle 200 will experience a restriction change which will result in a step change in pressure observed by the pressure sensor 245 (as the controller controls the pump 240 to pulsate, i.e. to pump small amounts of air into the chamber 212). Accordingly, once the step change is observed, the controller can deem that the nipple cavity 209 is full of formula. Accordingly, the pump is stopped.

Hereinafter, further aspects of the device attribute processing of step 2650 will be described. As reflected in step 2650 of FIG. 26, processing can be performed to detect the particular physical arrangement of the bottle 200, including accessories and attachments. To explain, for example, two different nipples can be provided for use in the bottle 200. The different nipples have different volumes, as well as different flow rates out of their respective openings 206. The distinct volumes of the nipples can be used to identify which nipple is physically present on the bottle 200. That is, in processing similar to the processing of step 2620, the controller can control the pump to pump a predetermined amount of air into the chamber 212. Each nipple can have a unique volume as well is a unique restriction to the opening 206. Accordingly, when air is pumped into the chamber 212, such can result in a unique step change that can be observed by the pressure sensor 245.

Additionally, in a given arrangement, pressure volume sensing can be utilized using Boyle's law concepts. That is, the pump 240 can be run for a predetermined amount of time. Such can result in a certain volumetric change to the system. Pressure can be measured both before and after the air is pumped into the system. The resulting pressure change can be used to determine the volume of the system, in manner similar to that described above with reference to step 2620. Such processing can be used to determine any number of arrangements, so long as such arrangements have a unique volume. That is, the controller can determine the volume of the current physical arrangement, and based on that volume map into what physical components are understood to be present in the current physical arrangement. Once the physical components are known, various processing and functionality can be implemented that is unique to the particular physical components. For example, one nipple may have a faster flow rate than in another nipple. Based on such understanding, the controller can vary processing that is applied to a particular nipple.

Accordingly, FIG. 27 is illustrative of pressure volume sensing that can be performed with different physical arrangements of a bottle. FIG. 28 is illustrative of step change processing that can be performed with different physical arrangements of a bottle. Such respective processing can be utilized in combination or separately.

FIG. 29 is a schematic cross-sectional diagram of a bottle the same as or similar to the bottle 200 of FIG. 22, with water in the well of the bottle. In FIG. 29, the collar assembly and nipple have been removed from the bottle. In the arrangement of FIG. 29 as reflected at 2900N, water has been poured into the well 255 and is draining into the pouch 270, through the inlet 266. In this illustrative example, the flow rate is 1 liter/minute (L/min). Such flow rate can be dictated by the run rate of the pump 240. In this example, the pressure drop is 2500 Pa between the ambient pressure and pressure in the chamber 212. To explain further, the pump 240 pulls the water through the inlet 266 at 1 L/min. Due to the viscosity of the water and the rate at which the water flows through the inlet 266, at the pressure applied by the pump 240, a pressure differential is created between inside the chamber 212 and the ambient. In this example, that pressure drop is 2500 Pa. The ambient or atmospheric pressure is illustrated as 101,325 Pa. The pressure in the chamber 212 is illustratively 98,825 Pa. In this example, the diameter of the inlet or orifice 266 is 3 mm.

The same 3 mm orifice may experience a 3.13 pressure drop at 1 L/min of airflow. The ratio of the pressure drop between such two fluids, i.e. water and air, can be attributed to a ratio of their respective densities. The difference in pressure drop between whether water is being pulled through the inlet 266 or air is being pulled through the inlet 266 results in the step change that can be observed by the controller. Accordingly, the controller, as described above, can determine when water is being pulled through the inlet 266 versus when air is being pulled through the inlet 266.

Features as disclosed herein may be described in context of particular units or dimensions. It is appreciated that alternative units or dimensions can be used as desired. Additionally, conversion can be performed between units or dimensions as may be desired.

In various processing described herein, variables can be used in various processes. Such processes can include routines, subroutines, and steps, for example. The various variables can be passed between processes as may be needed in accord with the instructions provided to the particular processor. The one or more processors can be described as a processor as described above or as an apparatus computer processor (ACP). The various variables can be global variables that are available to the various processes, such as between a calling process and a subroutine, for example.

An apparatus controller 110 of the disclosure can include an apparatus computer processor (ACP) 111, i.e. the processor 111. Other processors are described herein. The ACP 111 or other processor may also be described as an apparatus processing portion (APP) 111 or similar language. The ACP 111 can include or be in the form of a central processing unit (CPU).

In this disclosure, quotation marks, such as with "pod", have been used to enhance readability and/or to parse out a term or phrase for clarity.

All documents referenced herein are hereby incorporated by reference in their entirety.

The terms dispersion, dispensing, dispense, and other similar terms have been used herein to convey manipulation of a liquid or other material.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It is appreciated that the various components of embodiments of the disclosure may be made from any of a variety of materials including, for example, plastic, plastic resin, nylon, Delrin, composite material, foam, rubber, wood, metal, and/or ceramic, for example, or any other material as may be desired.

A variety of production techniques may be used to make the apparatuses as described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

As otherwise described herein, it is appreciated that a feature of one embodiment of the disclosure as described herein may be used in conjunction with features of one or more other embodiments as may be desired.

As used herein, "data" and "information" have been used interchangeably.

Any motorized structure or other mechanical structure as described herein may utilize gears, linkages, sprocket with chain, or other known mechanical arrangement so as to transfer requisite motion and/or energy.

Hereinafter, further aspects of implementation of the systems and methods of the disclosure will be described.

As described herein, at least some embodiments of the system of the disclosure and various processes, of embodiments, are described as being performed by one or more computer processors, i.e. processors, such as processor 111 in controller 110, processor 231 in controller 230 and/or other processor or controller, for example, as described above. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be described as a program, software program, code or simply software.

As noted above, the processing machine, which may be constituted, for example, by the particular system and/or systems described above, can execute the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, or apparatus that is capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

A set of instructions can be used, in the processing as described herein, on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of apparatus of the disclosure may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in practice of the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of an apparatus of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure. Accordingly, the foregoing disclosure is not intended to be construed or to limit the present disclosure or otherwise to exclude any other such embodiments, adaptations, variations, modifications and equivalent arrangements.

What is claimed is:

1. A bottle apparatus comprising:
   a neck portion;
   a vessel having an upper end and a lower end, the vessel defining a chamber, and the neck portion attached to the upper end of the vessel;
   a base portion attached to the lower end of the vessel;
   a pouch support attached to the neck portion;
   a pod mounted within and supported by the pouch support, the pod including a pouch top and a pouch mounted onto the pouch top, and the pouch top including an inlet, and the pouch support and the pouch top collectively forming a well such that water or other liquid can be deposited into the well and flow into the pouch through the inlet;
   a controller that includes a processing portion and a database, and the database including instructions that are executed by the processing portion;
   a pump for pumping air into and pumping air out of the chamber, the pump controlled by the controller; and
   a pressure sensor for measuring pressure in the chamber, and the pressure sensor in communication with the controller.

2. The bottle apparatus of claim 1, wherein the pod further includes an RFID tag that is mounted to the pouch, and an RFID sensor positioned in the base portion and in data communication with the RFID tag.

3. The bottle apparatus of claim 1, wherein the controller, pump, and pressure sensor are disposed in the base portion.

4. The bottle apparatus of claim 1, wherein the controller is configured to perform step change processing, and the step change processing determines pressure in the chamber in conjunction with operation of the pump.

5. The bottle apparatus of claim 1, further including a battery to power the controller.

6. The bottle apparatus of claim 1, wherein the pouch support is frictionally engaged with the pouch top.

7. The bottle apparatus of claim 6, further including a gasket between the pouch support and the pouch top.

8. The bottle apparatus of claim 1, wherein the pouch support includes a bottle engagement flange, and the bottle engagement flange extends over the neck portion, such that the bottle engagement flange supports the pouch support.

* * * * *

UNITED STATES PATENT AND TRADEMARK OFFICE
CERTIFICATE OF CORRECTION

PATENT NO. : 11,903,516 B1
APPLICATION NO. : 17/404928
DATED : February 20, 2024
INVENTOR(S) : Mark Lyons et al.

It is certified that error appears in the above-identified patent and that said Letters Patent is hereby corrected as shown below:

In the Specification

At Column 5, Line 30 after "portion" insert -- 30 --

At Column 12, Line 13 after "assembly" insert -- 80 --

At Column 12, Line 54 after "collar" insert -- 65 --

At Column 13, Line 19 after "assembly" (second occurrence) insert -- 20 --

At Column 17, Line 25 after "assembly" insert -- 60 --

Signed and Sealed this
Ninth Day of April, 2024

Katherine Kelly Vidal
*Director of the United States Patent and Trademark Office*